United States Patent [19]

Skeen et al.

[11] Patent Number: 5,557,798
[45] Date of Patent: *Sep. 17, 1996

[54] APPARATUS AND METHOD FOR PROVIDING DECOUPLING OF DATA EXCHANGE DETAILS FOR PROVIDING HIGH PERFORMANCE COMMUNICATION BETWEEN SOFTWARE PROCESSES

[75] Inventors: Marion D. Skeen, Palo Alto; Mark Bowles, Woodside, both of Calif.

[73] Assignee: Tibco, Inc., Palo Alto, Calif.

[*] Notice: The term of this patent shall not extend beyond the expiration date of Pat. No. 5,257,369.

[21] Appl. No.: 632,551

[22] Filed: Dec. 21, 1990

Related U.S. Application Data

[63] Continuation-in-part of Ser. No. 601,117, Oct. 22, 1990, Pat. No. 5,257,369, which is a continuation-in-part of Ser. No. 386,584, Jul. 27, 1989, Pat. No. 5,187,787.

[51] Int. Cl.⁶ .................... G06F 15/16; G06F 13/00
[52] U.S. Cl. ............... 395/650; 364/280; 364/284; 364/284.3; 364/281.3; 364/DIG. 1
[58] Field of Search ............... 395/650, 700

[56] References Cited

U.S. PATENT DOCUMENTS

| 4,463,093 | 12/1982 | Davis et al. | 364/200 |
|---|---|---|---|
| 4,688,170 | 8/1987 | Waite et al. | 364/200 |
| 4,718,005 | 1/1988 | Feigenbaum et al. | 364/200 |
| 4,751,635 | 6/1988 | Kret . | |
| 4,815,030 | 3/1989 | Cross et al. | 364/900 |
| 4,815,988 | 3/1989 | Trottier et al. | 364/200 |
| 4,823,122 | 4/1989 | Mann et al. | 340/825.28 |
| 4,851,988 | 7/1989 | Trottier et al. | 364/200 |

(List continued on next page.)

FOREIGN PATENT DOCUMENTS

| 41417/89 | 9/1989 | Australia | G06F 15/16 |
|---|---|---|---|
| 41416/89 | 9/1989 | Australia | G06F 13/42 |
| 4141789 | 12/1989 | Australia | G06F 15/16 |
| 4141689 | 12/1989 | Australia | G06F 13/42 |
| 79455/91 | 6/1991 | Australia | G06F 15/16 |
| 0108233 | 5/1984 | European Pat. Off. | G06F 15/16 |
| 0130375 | 1/1985 | European Pat. Off. | G06F 15/40 |
| 0167725 | 1/1986 | European Pat. Off. | G06F 5/00 |
| 0216535 | 8/1986 | European Pat. Off. | G06F 15/16 |
| 0258867 | 3/1988 | European Pat. Off. | G06F 9/46 |
| 0387462 | 9/1990 | European Pat. Off. | G06G 15/21 |
| 57-92954 | of 1980 | Japan . | |
| 63-50140 | of 1986 | Japan . | |
| 63-214045 | of 1987 | Japan . | |
| 63-174159 | of 1987 | Japan . | |
| 2191069 | 12/1987 | United Kingdom | G09G 1/00 |
| 2205018 | 11/1988 | United Kingdom | G06F 15/40 |

OTHER PUBLICATIONS

*ISIS and the Meta Project;* K. Birman and K. Marzullo; published in Sun Technology, Summer 1989.

*News Need Not be Slow;* G. Collyer and H. Spencer; published in Winter 1987 USENIX Technical Conference; Winter 1987.

(List continued on next page.)

Primary Examiner—Kevin A. Kriess
Attorney, Agent, or Firm—Ronald Fish; Falk, Vestal & Fish

[57] ABSTRACT

A communication interface for decoupling one software application from another software application such communications between applications are facilitated and applications may be developed in modularized fashion. The communication interface is comprised of two libraries of programs. One library manages self-describing forms which contain actual data to be exchanged as well as type information regarding data format and class definition that contain semantic information. Another library manages communications and includes a subject mapper to receive subscription requests regarding a particular subject and map them to particular communication disciplines and to particular services supplying this information. A number of communication disciplines also cooperate with the subject mapper or directly with client applications to manage communications with various other applications using the communication protocols used by those other applications.

56 Claims, 20 Drawing Sheets

U.S. PATENT DOCUMENTS

| | | | |
|---|---|---|---|
| 4,914,583 | 4/1990 | Weisshaar et al. | 364/200 |
| 4,937,784 | 6/1990 | Masai et al. | 364/900 |
| 4,975,830 | 12/1990 | Gerpheide et al. | 364/200 |
| 4,975,904 | 12/1990 | Mann et al. | 370/85.1 |
| 4,975,905 | 12/1990 | Mann et al. | 370/85.1 |
| 4,992,972 | 2/1991 | Brooks et al. | 364/900 |
| 4,999,771 | 3/1991 | Ralph et al. | 364/200 |
| 5,058,108 | 10/1991 | Mann et al. | 370/85.1 |
| 5,062,037 | 10/1991 | Shorter et al. | 364/200 |
| 5,073,852 | 12/1991 | Siegel et al. | 395/700 |
| 5,101,406 | 3/1992 | Messenger | 370/94.1 |
| 5,187,787 | 2/1993 | Skeen et al. | 395/600 |
| 5,257,369 | 10/1993 | Skeen et al. | 395/650 |

OTHER PUBLICATIONS

*The USENET System;* H. Henderson; 1987.

*Integration Mechanisms in the FIELD Environment;* S. Reiss; Technical Report No. CS-88-18, publsihed by Department of Computer Science, Brown University, Oct. 1988.

*A Retrospective and Evaluation of the Amoeba Distributed Operating System;* A. Tanenbaum, R. vanRenesse, H. vanStaveren, and S. Mullender, published in 1988.

*Exploiting Virtual Synchrony in Distributed Systems;* K. Birman and T. Joseph; Proceedings of the Eleventh ACM Symposium on Operating System Principles; {ACM Press}, New York, N.Y., Nov. 1987; also published as a special issue of Operating Systems Review, a quarterly publication of the ACM.

TIB Reference Manual, "The Teknekron Information Bus ™: Programmer's Reference Manual," Version 1.1, Sep. 7, 1989, pp. 1–46.

"BASIS Application Programming Interface (AIP)," pp. 1–82.

"BASIS Objectives, Environments, Concepts Functions, Value for Business Partners and Customers," IBM Confidential.

DataTrade R1, "Lans Lans/Wans," Aug. 23, 1990, pp. 1–4.

DataTrade R1, "Lans DT R1 Software Components," Aug. 23, 1990, pp. 1–7.

DataTrade R1, "Lans DT R1 Networkf Architecture," Aug. 23, 1990, pp. 1–14.

DataTrade R1, "Lans Broadcast Concepts," Aug. 23, 1990, pp. 1–9.

DataTrade R1, "Lans Broadcast Performance," Aug. 23, 1990, pp. 1–3.

DataTrade R1, "Lans Point–Point Concepts," Aug. 23, 1990, pp. 1–4.

DataTrade R1, "Lans Security," Aug. 23, 1990, pp. 1–4.

DataTrade R1, "API Overview," Jun. 6, 1990, pp. 1–11.

DataTrade R1, "API Datatrade API Verbs," Jun. 6, 1990, pp. 1–14.

DataTrade R1, "DataTrade Using DataTrade: APs," Aug. 23, 1990, pp. 1–14.

"Delivering Integrated Solutions," 6 pages.

Digital, "RAMS Message Bus for VAX/VMS," May 11, 1990, pp. 1–3.

Howard Kilman and Glen Macko, "An Architectural Perspective of a Common Distributed Heterogeneous Message Bus," 1987, pp. 171–184.

Glen Macko, "Developing a Message Bus for Integrating VMS High Speed Task to Task Communications," Fall 1986, pp. 339–347.

Steven G. Judd, "A Practical Approach to Developing Client–Server Applications Among VAX/VMS, CICS/VS, and IMS/VS LU6.2 Applications Made Easy," Spring 1990, pp. 95–112.

Product Insight, "Don't Miss the Lates Message Bus, VAX-PAMSV2.5," Jun. 1989, pp. 18–21.

Digital Equipment Corporation, "Digital Packaged Application Software Description PASD PASD Name: VAX–PAMS PASD: US.002.02," Version 2.5, Dec. 5, 1989, pp. 1–8.

Digital Equipment Corporation, "PAMS Basic Call Set PAMS Message BUS Efficient Task–to–Task Communication," Jul. 1989, pp. 1–25.

Digital Equipment Corporation, "Package Application Software Description for ULTRIX–PAMS," Version 1.2, Dec. 5, 1989, pp. 1–7.

Digital Equipment Corporation, "Package Application Software Description for PC–PAMS," Version 1.2, Dec. 5, 1989, pp. 1–7.

Digital Equipment Corporation, "PAMS Self–Maintenance Service Description," Apr. 3, 1990, pp. 1–3.

Digital Equipment Corporation, "LU6.2 PAMS Self–Maintenance Service Description," Apr. 3, 1990, pp. 1–3.

Digital Equipment Corporation, "PAMS Installation and Orientation Service Description," Jan. 31, 1989, pp. 1–3.

Digital Equipment Corporation, "PAMS LU6.2 Installation and Orientation Service Description," Apr. 19, 1990, pp. 1–3.

Digital Equipment Corporation, "Package Application Software Description for PAMS LU6.2," Version 2.1, Apr. 19, 1990, pp. 1–18.

Carriera and Galernter, "Linda In Context", Communications of the ACM, Apr. 1989, vol. 32, No. 4, pp. 444–458.

IBM DataTrade System introduced Mar. 13, 1990.

Digital Equipment Corporation PAM, Jul. 1991.

Goldman Sachs Development Effort (see Information Disclosure Statement filed with this form, entry #5).

Salomon Brothers Actvities (see Information Disclosure Statement filed with this form, entry #6).

The Metamorphosis of Information Management; David Gelernter; Scientific American, Aug. 1989; pp. 66–73.

Schroeder et al., *Experience with Grapevine:The Growth of a Distributed System*, ACM Transactions on Computer Systems, vol. 2, No. 1, Feb. 1984, pp. 3–23.

Cheriton, *Distributed Process Groups in the U Kernel, ACM Transactions on Computer Systems*, vol. 3, No. 2, May 1985, pp. 77–107.

Birman, et al., *ISIS Systems Manual*, Mar. 1988.

"A Stub Generator for Multilanguage RPC in Heterogeneous Environments", P. Gibbons, IEEE Trans. on Software Engineering vol. SE–13, No. 1, Jan. 1987.

Source Code for the Isis file tk–news.c dated May 1990, Feb. 24, 1988 and Dec. 14, 1987.

CCITT Standard X.208.

CCITT Standard X.209.

"Man" pages for Sun Release 4.1, Nov., 1987.

Tanenbaum, Computer Networks (2nd Edition), copyright 1988 by Prentice–Hall, Inc., pp. 475 through 490.

Birman, et al, "The Isis System Manual," 1988, pp. 188–191, Isis Distributed News.

Birman & Joseph, Reliable Communication in the Presence of failures, 1987, ACM Transactions on Computer Systems, vol. 5, No. 1, pp. 47–76.

Birman, et al. Isis Documentation: Releasel, 1987, Dept Comp Science, Cornell University p. 30.

Birman, "Exploiting Virtual Synchrony in Distributed Systems" Operating Systems Review, vol. 21, No. 5, Proceeding of 11th ACM Symosium on Operating Systems Principles, Nov. 1987.

Lum, Shu & Housel, "A General Methodology for data Conversionand Restructurnig": Sep. 1986 issue Data Conversion, vol. 20, No. 5.

IBM Corp, Technical Disclosure Bulletin, Oct. 1985, G06F15/20 F3C.

Gordon, "Providing Multiple-Channel Communication Using the Experimental Digital Switch." 1982 IEEE Transactions on Communications, vol. COM-30, No. 6.

Hughes, *A Multicast Interface for UNIX 4.3, Software Practice and Experience, vol. 18(1), 15–27 Jan. 1988.*

Frank, et al., *Multicast Communication on Network Computers,* IEEE, Article published in IEEE Software, May 1985, pp. 49–61.

Skeen, et al., *Reliable Message Diffusion,* Draft Oct. 9, 1987.

Oskiewicz, et al., *ISA Project, A Model for Interface Groups,* 1990.

Birman, et al., *Reliable Communicaton in the Presence of Failures,* ACM Transactions on Computer systems, vol. 5, No. 1, Feb. 1987, pp. 47–76.

French, et al., *The Zephyr Programmer's Manual,* Apr. 5, 1989.

DellaFerra, et al., *The Zephyr Notification Service,* Usenet Conference Feb. 1988.

DellaFerra, et al., *Project Athena Technical Plan,* Section E.4.1, Zephyr Notification Service, Jun. 5, 1989.

Bellville, *Zephyr on Athena,* Sep. 10, 1991, Version 3.

EXAMPLE FORM CLASS DEFINITIONS

PLAYER _ NAME: CLASS 1000
    RATING: FLOATING _ POINT CLASS II
    AGE: INTEGER CLASS 12
    LAST _ NAME: STRING _ 20 _ ASCII CLASS 10
    FIRST_ NAME: STRING _ 20 _ ASCII CLASS 10

FIGURE 2

PLAYER _ ADDRESS: CLASS 1001
    STREET: STRING _ 20 _ ASCII CLASS 10
    CITY:    STRING _ 20 _ ASCII CLASS 10
    STATE: STRING _ 20 _ ASCII CLASS 10

FIGURE 3

TOURNAMENT _ ENTRY: CLASS 1002
TOURNAMENT _ NAME: STRING _ 20 _ ASCII CLASS 10
PLAYER: PLAYER _ NAME CLASS 1000
ADDRESS: PLAYER _ ADDRESS CLASS 1001

FIGURE 4

STRING _ 20 _ ASCII: CLASS 10
    STRING _ 20 ASCII
INTEGER: CLASS 12
    INTEGER _ 3
FLOATING - POINT : CLASS 11
    FLOATING _ POINT _ 1/1

FIGURE 5

INSTANCE OF FORM OF CLASS TOURNAMENT _ ENTRY
CLASS 1002 AS STORED IN MEMORY

38 — [1002] [3] — 40
42 — [10] [U.S. OPEN] — 48
44 — [1000] [4] — 50
52 — [11] [3.5] — 60
54 — [12] [40] — 62
56 — [10] [BLACKETT] — 64
58 — [10] [BUZZ] — 66
46 — [1001] [3] — 68
70 — [10] [100 UNIVERSITY] — 76
72 — [10] [PALO ALTO] — 78
74 — [10] [CALIFORNIA] — 80

FORMAT OPERATION

DEC TO
ETHERNET™

| FROM | TO |
|------|----|
| 11 | 15 |
| 12 | 22 |
| 10 | 25 |
| ⋮ | ⋮ |

FIGURE 9

ETHERNET™
TO IBM

| FROM | TO |
|------|----|
| 15 | 31 |
| 22 | 33 |
| 25 | 42 |
| ⋮ | ⋮ |

FIGURE 10

GENERAL CONVERSION
PRODECURES TABLE

| FROM | TO | CONVERSION PROGRAM |
|------|----|--------------------|
| 11 | 15 | FLOAT I _ ETHER |
| 12 | 22 | INTEGER I _ ETHER |
| 10 | 25 | ASCII _ ETHER |
| 15 | 31 | ETHER _ FLOAT 2 |
| 33 | 22 | ETHER _ INTEGER |
| 42 | 25 | ETHER _ EBCDIC |
| ⋮ | ⋮ | ⋮ |

FIGURE 11

PERSON_CLASS: CLASS 1021

LAST: STRING_20 ASCII

FIRST: STRING_20 ASCII

CLASS DEFINITION

CLASS DESCRIPTOR STORED
IN RAM AS A FORM

APPARATUS AND METHOD FOR PROVIDING DECOUPLING OF DATA EXCHANGE DETAILS FOR PROVIDING HIGH PERFORMANCE COMMUNICATION BETWEEN SOFTWARE PROCESSES

This is a continuation-in-part application of a U.S. patent application entitled "Apparatus and Method for Providing Decoupling of Data Exchange Details for Providing High Performance Communications Between Software Processes", U.S. Ser. No. 07/601,117, now U.S. Pat. No. 5,257,369, filed Oct. 22, 1990 which is a continuation-in-part application of U.S. Ser. No. 07/386,584, now U.S. Pat. No. 5,187,787 filed Jul. 27, 1989.

BACKGROUND OF THE INVENTION

The invention pertains to the field of decoupled information exchange between software processes running on different or even the same computer where the software processes may use different formats for data representation and organization or may use the same formats and organization but said formats and organization may later be changed without requiring any reprogramming. Also, the software processes use "semantic" or field-name information in such a way that each process can understand and use data it has received from any foreign software process, regardless of semantic or field name differences. The semantic information is decoupled from data representation and organization information.

With the proliferation of different types of computers and software programs and the ever-present need for different types of computers running different types of software programs to exchange data, there has arisen a need for a system by which such exchanges of data can occur. Typically, data that must be exchanged between software modules that are foreign to each other comprises text, data and graphics. However, there occasionally arises the need to exchange digitized voice or digitized image data or other more exotic forms of information. These different types of data are called "primitives." A software program can manipulate only the primitives that it is programmed to understand and manipulate. Other types of primitives, when introduced as data into a software program, will cause errors.

"Foreign," as the term is used herein, means that the software modules or host computers involved in the exchange "speak different languages." For example, the Motorola and Intel microprocessor widely used in personal computers and work stations use different data representations in that in one family of microprocessors the most significant byte of multibyte words is placed first while in the other family of processors the most significant byte is placed last. Further, in IBM computers text letters are coded in EBCDIC code while in almost all other computers text letters are coded in ASCII code. Also, there are several different ways of representing numbers including integer, floating point, etc. Further, foreign software modules use different ways of organizing data and use different semantic information, i.e., what each field in a data record is named and what it means.

The use of various formats for data representation and organization means that translations either to a common language or from the language of one computer or process to the language of another computer or process must be made before meaningful communication can take place. Further, many software modules between which communication is to take place reside on different computers that are physically distant from each other and connected only local area networks, wide area networks, gateways, satellites, etc. These various networks have their own widely diverse protocols for communication. Also, at least in the world of financial services, the various sources of raw data such as Dow Jones News or Telerate™ use different data formats and communication protocols which must be understood and followed to receive data from these sources.

In complex data situations such as financial data regarding equities, bonds, money markets, etc., it is often useful to have nesting of data. That is, data regarding a particular subject is often organized as a data record having multiple "fields," each field pertaining to a different aspect of the subject. It is often useful to allow a particular field to have subfields and a particular subfield to have its own subfields and so on for as many levels as necessary. For purposes of discussion herein, this type of data organization is called "nesting." The names of the fields and what they mean relative to the subject will be called the "semantic information" for purposes of discussion herein. The actual data representation for a particular field, i.e., floating point, integer, alphanumeric, etc., and the organization of the data record in terms of how many fields it has, which are primitive fields which contain only data, and which are nested fields which contain subfields, is called the "format" or "type" information for purposes of discussion herein. A field which contains only data (and has no nested subfields) will be called a "primitive field," and a field which contains other fields will be called a "constructed field" herein.

There are two basic types of operations that can occur in exchanges of data between software modules. The first type of operation is called a "format operation" and involves conversion of the format of one data record (hereafter data records may sometimes be called "a forms") to another format. An example of such a format operation might be conversion of data records with floating point and EBCDIC fields to data records having the packed representation needed for transmission over an ETHERNET™ local area network. At the receiving process end another format operation for conversion from the ETHERNET™ packet format to integer and ASCII fields at the receiving process or software module might occur. Another type of operation will be called herein a "semantic-dependent operation" because it requires access to the semantic information as well as to the type or format information about a form to do some work on the form such as to supply a particular field of that form, e.g., today's IBM stock price or yesterday's IBM low price, to some software module that is requesting same.

Still further, in today's environment, there are often multiple sources of different types of data and/or multiple sources of the same type of data where the sources overlap in coverage but use different formats and different communication protocols (or even overlap with the same format and the same communication protocol). It is useful for a software module (software modules may hereafter be sometimes referred to as "applications") to be able to obtain information regarding a particular subject without knowing the network address of the service that provides information of that type and without knowing the details of the particular communication protocol needed to communicate with that information source.

A need has arisen therefore for a communication system which can provide an interface between diverse software modules, processes and computers for reliable, meaningful exchanges of data while "decoupling" these software modules and computers. "Decoupling" means that the software module programmer can access information from other computers or software processes without knowing where the other software modules and computers are in a network, the format that forms and data take on the foreign software, what communication protocols are necessary to communicate with the foreign software modules or computers, or what communication protocols are used to transit any networks between the source process and the destination process; and without knowing which of a multiple of sources of raw data can supply the requested data. Further, "decoupling," as the term is used herein, means that data can be requested at one time and supplied at another and that one process may obtain desired data from the instances of forms created with foreign format and foreign semantic data through the exercise by a communication interface of appropriate semantic operations to extract the requested data from the foreign forms with the extraction process being transparent to the requesting process.

Various systems exist in the prior art to allow information exchange between foreign software modules with various degrees of decoupling. One such type of system is any electronic mail software which implements Electronic Document Exchange Standards including CCITT's X.409 standard. Electronic mail software decouples applications in the sense that format or type data is included within each instance of a data record or form. However, there are no provisions for recording or processing of semantic information. Semantic operations such as extraction or translation of data based upon the name or meaning of the desired field in the foreign data structure is therefore impossible. Semantic-Dependent Operations are very important if successful communication is to occur. Further, there is no provision in Electronic Mail Software by which subject-based addressing can be implemented wherein the requesting application simply asks for information by subject without knowing the address of the source of information of that type. Further, such software cannot access a service or network for which a communication protocol has not already been established.

Relational Database Software and Data Dictionaries are another example of software systems in the prior art for allowing foreign processes to share data. The shortcoming of this class of software is that such programs can handle only "flat" tables, records and fields within records but not nested records within records. Further, the above-noted shortcoming in Electronic Mail Software also exists in Relational Database Software.

SUMMARY OF THE INVENTION

According to the teachings of the invention, there is provided a method and apparatus for providing a structure to interface foreign processes and computers while providing a degree of decoupling heretofore unknown.

The data communication interface software system according to the teachings of the invention consists essentially of several libraries of programs organized into two major components, a communication component and a data-exchange component. Interface, as the term is used herein the context of the invention, means a collection of functions which may be invoked by the application to do useful work in communicating with a foreign process or a foreign computer or both. Invoking functions of the interface may be by subroutine calls from the application or from another component in the communications interface according to the invention.

In the preferred embodiment, the functions of the interface are carried out by the various subroutines in the libraries of subroutines which together comprise the interface. Of course, those skilled in the art will appreciate that separate programs or modules may be used instead of subroutines and may actually be preferable in some cases.

Data format decoupling is provided such that a first process using data records or forms having a first format can communicate with a second process which has data records having a second, different format without the need for the first process to know or be able to deal with the format used by the second process. This form of decoupling is implemented via the data-exchange component of the communication interface software system.

The data-exchange component of the communication interface according to the teachings of the invention includes a forms-manager module and a forms-class manager module. The forms-manager module handles the creation, storage, recall and destruction of instances of forms and calls to the various functions of the forms-class manager. The latter handles the creation, storage, recall, interpretation, and destruction of forms-class descriptors which are data records which record the format and semantic information that pertain to particular classes of forms. The forms-class manager can also receive requests from the application or another component of the communication interface to get a particular field of an instance of a form when identified by the name or meaning of the field, retrieve the appropriate form instance, and and deliver the requested data in the appropriate field. The forms-class manager can also locate the class definition of an unknown class of forms by looking in a known repository of such class definitions or by requesting the class definition from the forms-class manager linked to the foreign process which created the new class of form. Semantic data, such as field names, is decoupled from data representation and organization in the sense that semantic information contains no information regarding data representation or organization. The communication interface of the invention implements data decoupling in the semantic sense and in the data format sense. In the semantic sense, decoupling is implemented by virtue of the ability to carry out semantic-dependent operations. These operations allow any process coupled to the communications interface to exchange data with any other process which has data organized either the same or in a different manner by using the same field names for data which means the same thing in the preferred embodiment. In an alternative embodiment semantic-dependent operations implement an aliasing or synonym conversion facility whereby incoming data fields having different names but which mean a certain thing are either relabeled with field names understood by the requesting process or are used as if they had been so relabeled.

The interface according to the teachings of the invention has a process architecture organized in 3 layers.

Architectural decoupling is provided by an information layer such that a requesting process can request data regarding a particular subject without knowing the network address of the server or process where the data may be found. This form of decoupling is provided by a subject-based addressing system within the information layer of the communication component of the interface.

Subject-based addressing is implemented by the communication component of the communication interface of the invention by subject mapping. The communication component receives "subscribe" requests from an application which specifies the subject upon which data is requested. A subject-mapper module in the information layer receives the request from the application and then looks up the subject in a database, table or the like. The database stores "service records" which indicate the various server processes that supply data on various subjects. The appropriate service record identifying the particular server process that can supply data of the requested type and the communication protocol (hereafter sometimes called the service discipline) to use in communicating with the identified server process is returned to the subject-mapper module.

The subject mapper has access to a plurality of communications library programs or subroutines on the second layer of the process architecture called the service layer. The routines on the service layer are called "service disciplines." Each service discipline encapsulates a predefined communication protocol which is specific to a server process. The subject mapper then invokes the appropriate service discipline identified in the service record.

The service discipline is given the subject by the subject mapper and proceeds to establish communications with the appropriate server process. Thereafter, instances of forms containing data regarding the subject are sent by the server process to the requesting process via the service discipline which established the communication.

Service protocol decoupling is provided by the service layer.

Temporal decoupling is implemented in some service disciplines directed to page-oriented server processes such as Telerate™ by access to real-time data bases which store updates to pages to which subscriptions are outstanding.

A third layer of the distributed communication component is called the communication layer and provides configuration decoupling. This layer includes a DCC library of programs that receives requests to establish data links to a particular server and determines the best communication protocol to use for the link unless the protocol is already established by the request. The communication layer also includes protocol engines to encapsulate various communication protocols such as point-to-point, broadcast, reliable broadcast and the Intelligent Multicast™ protocol. Some of the functionality of the communication layer augments the functionality of the standard transport protocols of the operating system and provides value added services.

One of these value added services is the reliable broadcast protocol. This protocol engine adds sequence numbers to packets of packetized messages on the transmit side and verifies that all packets have been received on the receive side. Packets are stored for retransmission on the transmit side. On the receive side, if all packets did not come in or some are garbled, a request is sent for retransmission. The bad or missing packets are then resent. When all packets have been successfully received, an acknowledgment message is sent. This causes the transmit side protocol engine to flush the packets out of the retransmit buffer to make room for packets of the next message.

Another value added service is the Intelligent Multicast Protocol. This protocol involves the service discipline examining the subject of a message to be sent and determining how many subscribers there are for this message subject. If the number of subscribers is below a threshold set by determining costs of point-to-point versus broadcast transmission, the message is sent point-to-point. Otherwise the message is sent by the reliable broadcast protocol.

BRIEF DESCRIPTION OF THE DRAWINGS

FIG. 2 is an example of a form-class definition of the constructed variety.

FIG. 3 is an example of another constructed form-class definition.

FIG. 4 is an example of a constructed form-class definition containing fields that are themselves constructed forms. Hence, this is an example of nesting.

FIG. 5 is an example of three primitive form classes.

FIG. 9 is a target format-specific table for use in format operations.

FIG. 10 is another target format-specific table for use in format operations.

FIG. 11 is an example of a general conversion table for use in format operations.

DETAILED DESCRIPTION OF THE PREFERRED AND ALTERNATIVE EMBODIMENTS

Since the following description is highly technical, it can best be understood by an understanding of the terms used in the digital network telecommunication art defined in the appended glossary. The reader is urged to read the glossary at the end of the specification herein first.

Figure 1:
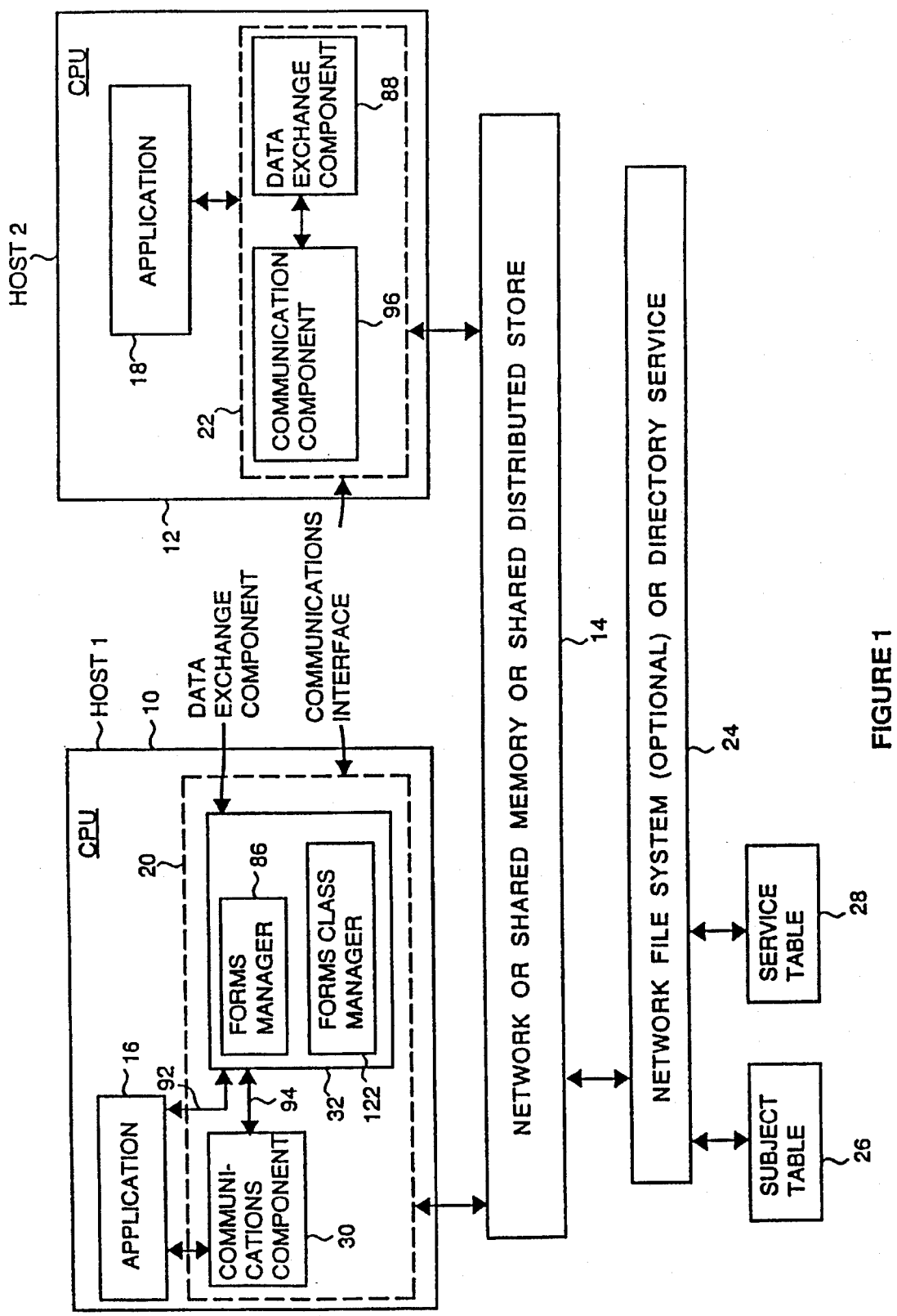
FIG. 1 is a block diagram illustrating the relationships of the various software modules of the communication interface of one embodiment of the invention to client applications and the network.

Referring to FIG. 1 there is shown a block diagram of a typical system in which the communications interface of the invention could be incorporated, although a wide variety of system architectures can benefit from the teachings of the invention. The communication interface of the invention may be sometimes hereafter referred to as the TIB™ or Teknekron Information Bus in the specification of an alternative embodiment given below. The reader is urged at this point to study the glossary of terms included in this specification to obtain a basic understanding of some of the more important terms used herein to describe the invention. The teachings of the invention are incorporated in several libraries of computer programs which, taken together, provide a communication interface having many functional capabilities which facilitate modularity in client application development and changes in network communication or service communication protocols by coupling of various client applications together in a "decoupled" fashion. Hereafter, the teachings of the invention will be referred to as the communication interface. "Decoupling," as the term is used herein, means that the programmer of client application is freed of the necessity to know the details of the communication protocols, data representation format and data record organization of all the other applications or services with which data exchanges are desired. Further, the programmer of the client application need not know the location of services or servers providing data on particular subjects in order to be able to obtain data on these subjects. The communication interface automatically takes care of all the details in data exchanges between client applications and between data-consumer applications and data-provider services.

The system shown in FIG. 1 is a typical network coupling multiple host computers via a network or by shared memory. Two host computers, 10 and 12, are shown in FIG. 1 running two client applications 16 and 18, although in other embodiments these two client applications may be running on the same computer. These host computers are coupled by a network 14 which may be any of the known networks such as the ETHERNET™ communication protocol, the token ring protocol, etc. A network for exchanging data is not required to practice the invention, as any method of exchanging data known in the prior art will suffice for purposes of practicing the invention. Accordingly, shared memory files or shared distributed storage to which the host computers 10 and 12 have equal access will also suffice as the environment in which the teachings of the invention are applicable.

Each of the host computers 10 and 12 has random access memory and bulk memory such as disk or tape drives associated therewith (not shown). Stored in these memories are the various operating system programs, client application programs, and other programs such as the programs in the libraries that together comprise the communication interface which cause the host computers to perform useful work. The libraries of programs in the communication interface provide basic tools which may be called upon by client applications to do such things as find the location of services that provide data on a particular subject and establish communications with that service using the appropriate communication protocol.

Each of the host computers may also be coupled to user interface devices such as terminals, printers, etc. (not shown).

In the exemplary system shown in FIG. 1, host computer 10 has stored in its memory a client application program 16. Assume that this client application program 16 requires exchanges of data with another client application program or service 18 controlling host computer 12 in order to do useful work. Assume also that the host computers 10 and 12 use different formats for representation of data and that application programs 16 and 18 also use different formats for data representation and organization for the data records created thereby. These data records will usually be referred to herein as forms. Assume also that the data path 14 between the host computers 10 and 12 is comprised of a local area network of the ETHERNET™ variety.

Each of the host processors 10 and 12 is also programmed with a library of programs, which together comprise the communication interfaces 20 and 22, respectively. The communication interface programs are either linked to the compiled code of the client applications by a linker to generate run time code, or the source code of the communication programs is included with the source code of the client application programs prior to compiling. In any event, the communication library programs are somehow bound to the client application. Thus, if host computer 10 was running two client applications, each client application would be bound to a communication interface module such as module 20.

The purpose of the communications interface module 20 is to decouple application 16 from the details of the data format and organization of data in forms used by application 18, the network address of application 18, and the details of the communication protocol used by application 18, as well as the details of the data format and organization and communication protocol necessary to send data across network 14. Communication interface module 22 serves the same function for application 18, thereby freeing it from the need to know many details about the application 16 and the network 14. The communication interface modules facilitate modularity in that changes can be made in client applications, data formats or organizations, host computers, or the networks used to couple all of the above together without the need for these changes to ripple throughout the system to ensure continued compatibility.

In order to implement some of these functions, the communications interfaces 20 and 22 have access via the network 14 to a network file system 24 which includes a subject table 26 and a service table 28. These tables will be discussed in more detail below with reference to the discussion of subject-based addressing. These tables list network addresses of services that provide information on various subjects.

A typical system model in which the communication interface is used consists of users, users groups, networks, services, service instances (or servers) and subjects. Users, representing human end users, are identified by a user-ID. The user ID used in the communications interface is normally the same as the user ID or log-on ID used by the underlying operating system (not shown). However, this need not be the case. Each user is a member of exactly one group.

Groups are comprised of users with similar service access patterns and access rights. Access rights to a service or system object are grantable at the level of users and at the level of groups. The system administrator is responsible for assigning users to groups.

A "network," as the term is used herein, means the underlying "transport layer" (as the term is used in the ISO network layer model) and all layers beneath the transport layer in the ISO network model. An application can send or receive data across any of the networks to which its host computer is attached.

The communication interface according to the teachings of the invention, of which blocks 20 and 22 in FIG. 1 are exemplary, includes for each client application to which it is bound a communications component 30 and a data-exchange component 32. The communications component 30 is a common set of communication facilities which implement, for example, subject-based addressing and/or service discipline decoupling. The communications component is linked to each client application. In addition, each communications component is linked to the standard transport layer protocols, e.g., TCP/IP, of the network to which it is coupled. Each communication component is linked to and can support multiple transport layer protocols. The transport layer of a network does the following things: it maps transport layer addresses to network addresses, multiplexes transport layer connections onto network connections to provide greater throughput, does error detection and monitoring of service quality, error recovery, segmentation and blocking, flow control of individual connections of transport layer to network and session layers, and expedited data transfer. The communications component cooperates with the transport layer to provide reliable communications protocols for client applications as well as providing location transparency and network independence to the client applications.

The data-exchange component of the communications interface, of which component 32 is typical, implements a powerful way of representing and transmitting data by encapsulating the data within self-describing data objects called forms. These forms are self-describing in that they include not only the data of interest, but also type or format information which describes the representations used for the data and the organization of the form. Because the forms include this type or format information, format operations to convert a particular form having one format to another format can be done using strictly the data in the form itself without the need for access to other data called class descriptors or class definitions which give semantic information. Semantic information in class descriptors basically means the names of the fields of the form.

The ability to perform format operations solely with the data in the form itself is very important in that it prevents the delays encountered when access must be made to other data objects located elsewhere, such as class descriptors. Since format operations alone typically account for 25 to 50% of the processing time for client applications, the use of self-describing objects streamlines processing by rendering it faster.

The self-describing forms managed by the data-exchange component also allow the implementation of generic tools for data manipulation and display. Such tools include communication tools for sending forms between processes in a machine-independent format. Further, since self-describing forms can be extended, i.e., their organization changed or expanded, without adversely impacting the client applications using said forms, such forms greatly facilitate modular application development.

Since the lowest layer of the communications interface is linked with the transport layer of the ISO model and since the communications component 30 includes multiple service disciplines and multiple transport-layer protocols to support multiple networks, it is possible to write application-oriented protocols which transparently switch over from one network to another in the event of a network failure.

A "service" represents a meaningful set of functions which are exported by an application for use by its client applications. Examples of services are historical news retrieval services such as Dow Jones New, Quotron data feed, and a trade ticket router. Applications typically export only one service, although the export of many different services is also possible.

A "service instance" is an application or process capable of providing the given service. For a given service, several "instances" may be concurrently providing the service so as to improve the throughput of the service or provide fault tolerance.

Although networks, services and servers are traditional components known in the prior art, prior art distributed systems do not recognize the notion of a subject space or data independence by self-describing, nested data objects. Subject space supports one form of decoupling called subject-based addressing. Self-describing data objects which may be nested at multiple levels are new. Decoupling of client applications from the various communications protocols and data formats prevalent in other parts of the network is also very useful.

The subject space used to implement subject-based addressing consists of a hierarchical set of subject categories. In the preferred embodiment, a four-level subject space hierarchy is used. An example of a typical subject is: "equity.ibm.composite.trade." The client applications coupled to the communications interface have the freedom and responsibility to establish conventions regarding use and interpretations of various subject categories.

Each subject is typically associated with one or more services providing data about that subject in data records stored in the system files. Since each service will have associated with it in the communication components of the communication interface a service discipline, i.e., the communication protocol or procedure necessary to communicate with that service, the client applications may request data regarding a particular subject without knowing where the service instances that supply data on that subject are located on the network by making subscription requests giving only the subject without the network address of the service providing information on that subject. These subscription requests are translated by the communications interface into an actual communication connection with one or more service instances which provide information on that subject.

A set of subject categories is referred to as a subject domain. Multiple subject domains are allowed. Each domain can define domain-specific subject and coding functions for efficiently representing subjects in message headers.

DATA INDEPENDENCE: The Data-Exchange Component

The overall purpose of the data-exchange component such as component 32 in FIG. 1 of the communication interface is to decouple the client applications such as application 16 from the details of data representation, data structuring and data semantics.

Referring to FIG. 2, there is shown an example of a class definition for a constructed class which defines both format and semantic information which is common to all instances of forms of this class. In the particular example chosen, the form class is named Player_Name and has a class ID of 1000. The instances of forms of this class 1000 include data regarding the names, ages and NTRP ratings for tennis players. Every class definition has associated with it a class number called the class ID which uniquely identifies the class.

The class definition gives a list of fields by name and the data representation of the contents of the field. Each field contains a form and each form may be either primitive or constructed. Primitive class forms store actual data, while constructed class forms have fields which contain other forms which may be either primitive or constructed. In the class definition of FIG. 2, there are four fields named Rating, Age, Last_Name and First_Name. Each field contains a primitive class form so each field in instances of forms of this class will contain actual data. For example, the field Rating will always contain a primitive form of class 11. Class 11 is a primitive class named Floating_Point which specifies a floating-point data representation for the contents of this field. The primitive class definition for the class Floating_Point, class 11, is found in FIG. 5. The class definition of the primitive class 11 contains the class name, Floating_Point, which uniquely identifies the class (the class number, class 11 in this example, also uniquely identifies the class) and a specification of the data representation of the single data value. The specification of the single data value uses well-known predefined system data types which are understood by both the host computer and the application dealing with this class of forms.

Typical specifications for data representation of actual data values include integer, floating point, ASCII character strings or EBCDIC character strings, etc. In the case of primitive class 11, the specification of the data value is Floating_Point_1/1 which is an arbitrary notation indicating that the data stored in instances of forms of this primitive class will be floating-point data having two digits total, one of which is to the right of the decimal point.

Returning to the consideration of the Player_Name class definition of FIG. 2, the second field is named Age. This field contains forms of the primitive class named Integer associated with class number 12 and defined in FIG. 5. The Integer class of form, class 12, has, per the class definition of FIG. 5, a data representation specification of Integer_3, meaning the field contains integer data having three digits. The last two fields of the class 1000 definition in FIG. 2 are Last_Name and First_Name. Both of these fields contain primitive forms of a class named String_Twenty_ASCII, class 10. The class 10 class definition is given in FIG. 5 and specifies that instances of forms of this class contain ASCII character strings which are 20 characters long.

FIG. 3 gives another constructed class definition named Player_Address, class 1001. Instances of forms of this class each contain three fields named Street, City and State. Each of these three fields contains primitive forms of the class named String_20_ASCII, class 10. Again, the class definition for class 10 is given in FIG. 5 and specifies a data representation of 20-character ASCII strings.

An example of the nesting of constructed class forms is given in FIG. 4. FIG. 4 is a class definition for instances of forms in the class named Tournament_Entry, class 1002. Each instance of a form in this class contains three fields named Tournament_Name, Player, and Address. The field Tournament_Name includes forms of the primitive class named String_Twenty_ASCII, class 10 defined in FIG. 5. The field named Player contains instances of constructed forms of the class named Player_Name, class 1000 having the format and semantic characteristics given in FIG. 2. The field named Address contains instances of the constructed form of constructed forms of the constructed class named Player__Address, class 1001, which has the format and semantic characteristics given in the class definition of FIG. 3.

The class definition of FIG. 4 shows how nesting of forms can occur in that each field of a form is a form itself and every form may be either primitive and have only one field or constructed and have several fields. In other words, instances of a form may have as many fields as necessary, and each field may have as many subfields as necessary. Further, each subfield may have as many sub-subfields as necessary. This nesting goes on for any arbitrary number of levels. This data structure allows data of arbitrary complexity to be easily represented and manipulated.

Figures 6, 7:
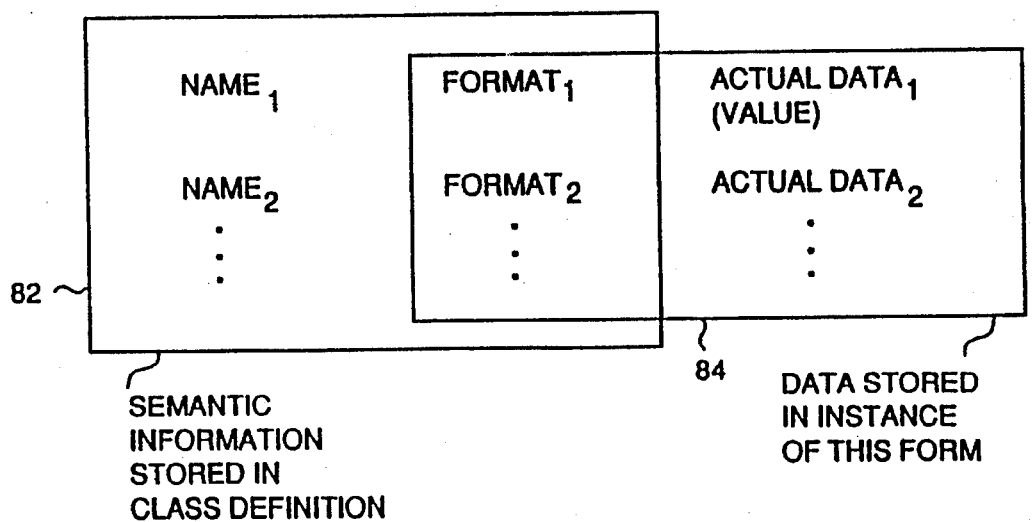
FIG. 6 is an example of a typical form instance as it is stored in memory.
FIG. 7 illustrates the partitioning of semantic data, format data, and actual or value data between the form-class definition and the form instance.

Referring to FIG. 6 there is shown an instance of a form of the class of forms named Tournament_Entry, class 1002, as stored as an object in memory. The block of data 38 contains the constructed class number 1002 indicating that this is an instance of a form of the constructed class named Tournament_Entry. The block of data 40 indicates that this class of form has three fields. Those three fields have blocks of data shown at 42, 44, and 46 containing the class numbers of the forms in these fields. The block of data at 42 indicates that the first field contains a form of class 10 as shown in FIG. 5. A class 10 form is a primitive form containing a 20-character string of ASCII characters as defined in the class definition for class 10 in FIG. 5. The actual string of ASCII characters for this particular instance of this form is shown at 48, indicating that this is a tournament entry for the U.S. Open tennis tournament. The block of data at 44 indicates that the second field contains a form which is an instance of a constructed form of class 1000. Reference to this class definition shows that this class is named Player_Name. The block of data 50 shows that this class of constructed form contains four subfields. Those fields contain forms of the classes recorded in the blocks of data shown at 52, 54, 56 and 58. These fields would be subfields of the field 44. The first subfield has a block of data at 52, indicating that this subfield contains a form of primitive class 11. This class of form is defined in FIG. 5 as containing a floating-point two-digit number with one decimal place. The actual data for this instance of the form is shown at 60, indicating that this player has an NTRP rating of 3.5. The second subfield has a block of data at 54, indicating that this subfield contains a form of primitive class 12. The class definition for this class indicates that the class is named integer and contains integer data. The class definition for class 1000 shown in FIG. 2 indicates that this integer data, shown at block 62, is the player's age. Note that the class definition semantic data regarding field names is not stored in the form instance. Only the format or type information is stored in the form instance in the form of the class ID for each field.

The third subfield has a block of data at 56, indicating that this subfield contains a form of primitive class 10 named String_20_ASCII. This subfield corresponds to the field Last_Name in the form of class Player_Name, class 1000, shown in FIG. 2. The primitive class 10 class definition specifies that instances of this primitive class contain a 20-character ASCII string. This string happens to define the player's last name. In the instance shown in FIG. 6, the player's last name is Blackett, as shown at 64.

The last subfield has a block of data at 58, indicating that the field contains a primitive form of primitive class 10 which is a 20-character ASCII string. This subfield is defined in the class definition of class 1000 as containing the player's first name. This ASCII string is shown at 66.

The third field in the instance of the form of class 1002 has a block of data at 46, indicating that this field contains a constructed form of the constructed class 1001. The class definition for this class is given in FIG. 3 and indicates the class is named Player_Address. The block of data at 68 indicates that this field has three subfields containing forms of the class numbers indicated at 70, 72 and 74. These subfields each contain forms of the primitive class 10 defined in FIG. 5. Each of these subfields therefore contains a 20-character ASCII string. The contents of these three fields are defined in the class definition for class 1001 and are, respectively, the street, city and state entries for the address of the player named in the field 44. These 3-character strings are shown at 76, 78 and 80, respectively.

Referring to FIG. 7, there is shown a partition of the semantic information, format information and actual data between the class definition and instances of forms of this class. The field name and format or type information are stored in the class definition, as indicated by box 82. The format or type information (in the form of the class ID) and actual data or field values are stored in the instance of the form as shown by box 84. For example, in the instance of the form of class Tournament_Entry, class 1002 shown in FIG. 6, the format data for the first field is the data stored in block 42, while the actual data for the first field is the data shown at block 48. Essentially, the class number or class ID is equated by the communications interface with the specification for the type of data in instances of forms of that primitive class. Thus, the communications interface can perform format operations on instances of a particular form using only the format data stored in the instance of the form itself without the need for access to the class definition. This speeds up format operations by eliminating the need for the performance of the steps required to access a class definition which may include network access and/or disk access, which would substantially slow down the operation. Since format-type operations comprise the bulk of all operations in exchanging data between foreign processes, the data structure and the library of programs to handle the data structure defined herein greatly increase the efficiency of data exchange between foreign processes and foreign computers.

For example, suppose that the instance of the form shown in FIG. 6 has been generated by a process running on a computer by Digital Equipment Corporation (DEC) and therefore text is expressed in ASCII characters. Suppose also that this form is to be sent to a process running on an IBM computer, where character strings are expressed in EBCDIC code. Suppose also that these two computers were coupled by a local area network using the ETHERNET™ communications protocol.

To make this transfer, several format operations would have to be performed. These format operations can best be understood by reference to FIG. 1 with the assumption that the DEC computer is host 1 shown at 10 and the IBM computer is host 2 shown at 12.

The first format operation to transfer the instance of the form shown in FIG. 6 from application 16 to application 18 would be a conversion from the format shown in FIG. 6 to a packed format suitable for transfer via network 14. Networks typically operate on messages comprised of blocks of data comprising a plurality of bytes packed together end to end preceded by multiple bytes of header information which include such things as the message length, the destination address, the source address, and so on, and having error correction code bits appended to the end of the message. Sometimes delimiters are used to mark the start and end of the actual data block.

The second format operation which would have to be performed in this hypothetical transfer would be a conversion from the packed format necessary for transfer over network 14 to the format used by the application 18 and the host computer 12.

Format operations are performed by the forms-manager modules of the communications interface. For example, the first format operation in the hypothetical transfer would be performed by the forms-manager module 86 in FIG. 1, while the second format operation in the hypothetical transfer would be performed by the forms-manager module in the data-exchange component 88.

Figure 8:
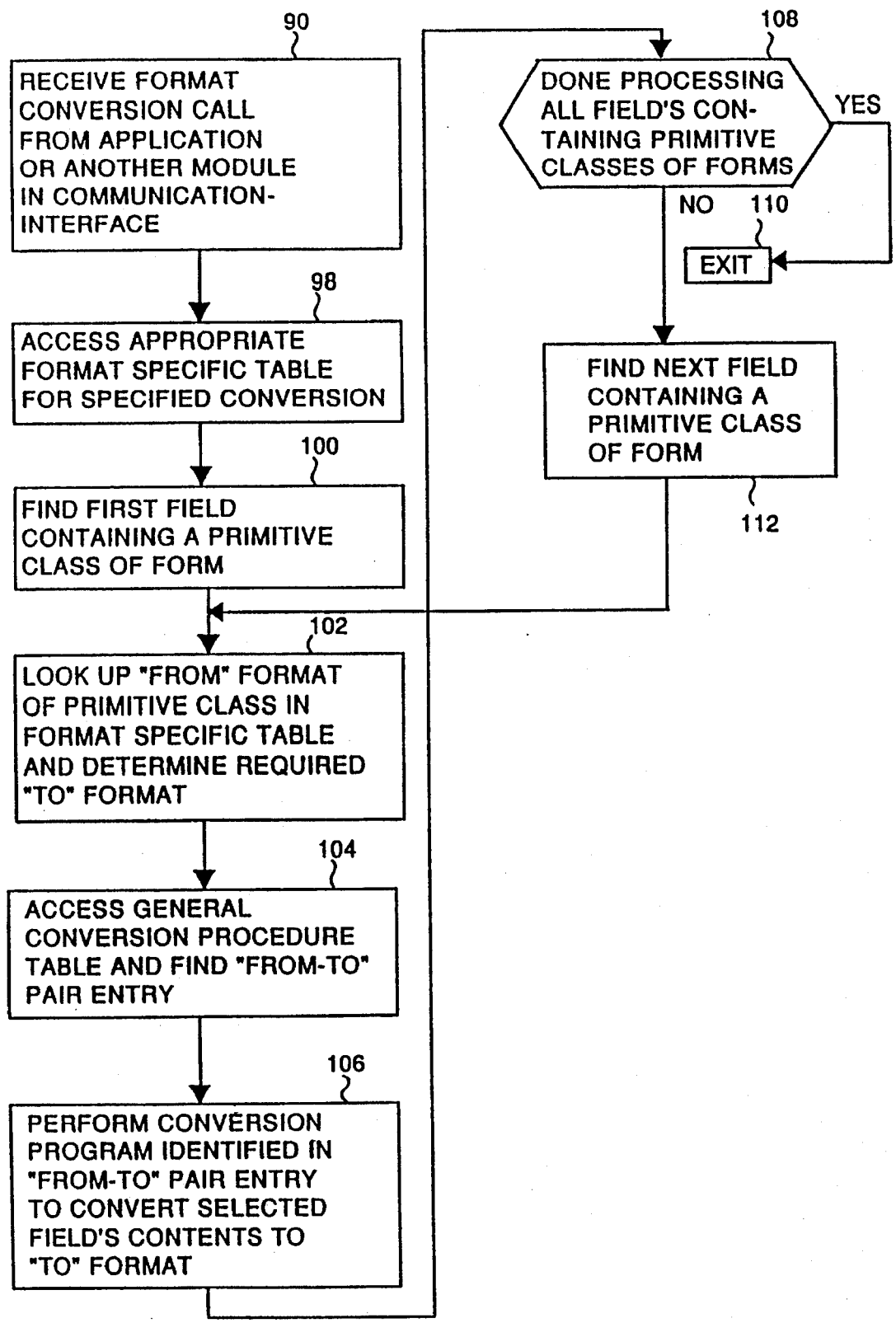
FIG. 8 is a flow chart of processing during a format operation.

Referring to FIG. 8, there is shown a flowchart of the operations performed by the forms-manager modules in performing format operations. Further details regarding the various functional capabilities of the routines in the forms-manager modules of the communications interface will be found in the functional specifications for the various library routines of the communications interface included herein. The process of FIG. 8 is implemented by the software programs in the forms-manager modules of the data-exchange components in the communications interface according to the teachings of the invention. The first step is to receive a format conversion call from either the application or from another module in the communications interface. This process is symbolized by block 90 and the pathways 92 and 94 in FIG. 1. The same type call can be made by the application 18 or the communications component 96 for the host computer 12 in FIG. 1 to the forms-manager module in the data-exchange component 88, since this is a standard functional capability or "tool" provided by the communication interface of the invention to all client applications. Every client application will be linked to a communication interface like interface 20 in FIG. 1.

Typically, format conversion calls from the communication components such as modules 30 and 96 in FIG. 1 to the forms-manager module will be from a service discipline module which is charged with the task of sending a form in format 1 to a foreign application which uses format 2. Another likely scenario for a format conversion call from another module in the communication interface is when a service discipline has received a form from another application or service which is in a foreign format and which needs to be converted to the format of the client application.

The format conversion call will have parameters associated with it which are given to the forms manager. These parameters specify both the "from" format and the "to" or "target" format.

Block 98 represents the process of accessing an appropriate target format-specific table for the specified conversion, i.e., the specified "from" format and the specified "to" format will have a dedicated table that gives details regarding the appropriate target format class for each primitive "from" format class to accomplish the conversion. There are two tables which are accessed sequentially during every format conversion operation in the preferred embodiment. In alternative embodiments, these two tables may be combined. Examples of the two tables used in the preferred embodiment are shown in FIGS. 9, 10 and 11. FIG. 9 shows a specific format conversion table for converting from DEC machines to X.409 format. FIG. 10 shows a format-specific conversion table for converting from X.409 format to IBM machine format. FIG. 11 shows a general conversion procedures table identifying the name of the conversion program in the communications interface library which performs the particular conversion for each "from"-"to" format pair.

The tables of FIGS. 9 and 10 probably would not be the only tables necessary for sending a form from the application 16 to the application 18 in FIG. 1. There may be further format-specific tables necessary for conversion from application 16 format to DEC machine format and for conversion from IBM machine format to application 18 format. However, the general concept of the format conversion process implemented by the forms-manager modules of the communications interface can be explained with reference to FIGS. 9, 10 and 11.

Assume that the first conversion necessary in the process of sending a form from application 16 to application 18 is a conversion from DEC machine format to a packed format suitable for transmission over an ETHERNET™ network. In this case, the format conversion call received in step 90 would invoke processing by a software routine in the forms-manager module which would perform the process symbolized by block 98.

In this hypothetical example, the appropriate format-specific table to access by this routine would be determined by the "from" format and "to" format parameters in the original format conversion call received by block 90. This would cause access to the table shown in FIG. 9. The format conversion call would also identify the address of the form to be converted.

The next step is symbolized by block 100. This step involves accessing the form identified in the original format conversion call and searching through the form to find the first field containing a primitive class of form. In other words, the record is searched until a field is found storing actual data as opposed to another constructed form having subfields.

In the case of the form shown in FIG. 6, the first field storing a primitive class of form is field 42. The "from" column of the table of FIG. 9 would be searched using the class number 10 until the appropriate entry was found. In this case, the entry for a "from" class of 10 indicates that the format specified in the class definition for primitive class 25 is the "to" format. This process of looking up the "to" format using the "from" format is symbolized by block 102 in FIG. 8. The table shown in FIG. 9 may be "hardwired" into the code of the routine which performs the step symbolized by block 102.

Alternatively, the table of FIG. 9 may be a database or other file stored somewhere in the network file system 24 in FIG. 1. In such a case, the routine performing the step 102 in FIG. 8 would know the network address and file name for the file to access for access to the table of FIG. 9.

Next, the process symbolized by block 104 in FIG. 8 is performed by accessing the general conversion procedures table shown in FIG. 11. This is a table which identifies the conversion program in the forms manager which performs the actual work of converting one primitive class of form to another primitive class of form. This table is organized with a single entry for every "from"—"to" format pair. Each entry in the table for a "from"—"to" pair includes the name of the conversion routine which does the actual work of the conversion. The process symbolized by block 104 comprises the steps of taking the "from"—"to" pair determined from access to the format-specific conversion table in step 102 and searching the entries of the general conversion procedures table until an entry having a "from"—"to" match is found. In this case, the third entry from the top in the table of FIG. 11 matches the "from"—"to" format pair found in the access to FIG. 9. This entry is read, and it is determined that the name of the routine to perform this conversion is ASCII_ETHER. (In many embodiments, the memory address of the routine, opposed to the name, would be stored in the table.)

Block 106 in FIG. 8 symbolizes the process of calling the conversion program identified by step 104 and performing this conversion routine to change the contents of the field selected in step 100 to the "to" or target format identified in step 102. In the hypothetical example, the routine ASCII_ETHER would be called and performed by step 106. The call to this routine would deliver the actual data stored in the field selected in the process of step 100, i.e., field 42 of the instance of a form shown in FIG. 6, such that the text string "U.S. Open" would be converted to a packed ETHERNET™ format.

Next, the test of block 108 is performed to determine if all fields containing primitive classes of forms have been processed. If they have, then format conversion of the form is completed, and the format conversion routine is exited as symbolized by block 110.

If fields containing primitive classes of forms remain to be processed, then the process symbolized by block 112 is performed. This process finds the next field containing a primitive class of form.

Thereafter, the processing steps symbolized by blocks 102, 104, 106, and 108 are performed until all fields containing primitive classes of forms have been converted to the appropriate "to" format.

As noted above, the process of searching for fields containing primitive classes of forms proceeds serially through the form to be converted. If the next field encountered contains a form of a constructed class, that class of form must itself be searched until the first field therein with a primitive class of form is located. This process continues through all levels of nesting for all fields until all fields have been processed and all data stored in the form has been converted to the appropriate format. As an example of how this works, in the form of FIG. 6, after processing the first field 42, the process symbolized by block 112 in FIG. 8 would next encounter the field 44 (fields will be referred to by the block of data that contain the class ID for the form stored in that field although the contents of the field are both the class ID and the actual data or the fields and subfields of the form stored in that field). Note that in the particular class of form represented by FIG. 6, the second field 44 contains a constructed form comprised of several subfields. Processing would then access the constructed form of class 1000 which is stored by the second field and proceeds serially through this constructed form until it locates the first field thereof which contains a form of a primitive class. In the hypothetical example of FIG. 6, the first field would be the subfield indicated by the class number 11 at 52. The process symbolized by block 102 would then look up class 11 in the "from" column in the table of FIG. 9 and determine that the target format is specified by the class definition of primitive class 15. This "from"—"to" pair 11-15 would then be compared to the entries of the table of FIG. 11 to find a matching entry. Thereafter, the process of block 106 in FIG. 8 would perform the conversion program called Float1_ETHER to convert the block of data at 60 in FIG. 6 to the appropriate ETHERNET™ packed format. The process then would continue through all levels of nesting.

Figure 12:
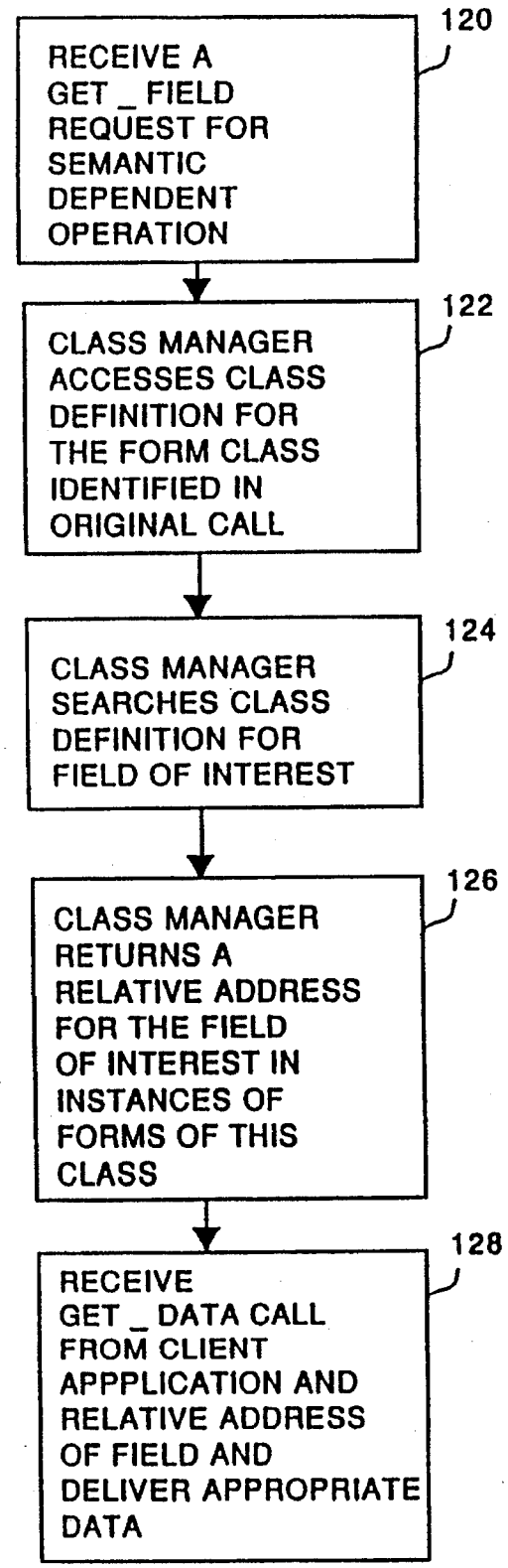
FIG. 12 is a flow chart for a typical semantic-dependent operation.

Referring to FIG. 12, there is shown a flowchart for a typical semantic-dependent operation. Semantic-dependent operations allow decoupling of applications by allowing one application to get the data in a particular field of an instance of a form generated by a foreign application provided that the field name is known and the address of the form instance is known. The communications interface according to the teachings of the invention receives semantic-dependent operation requests from client applications in the form of Get_Field calls in the preferred embodiment where all processes use the same field names for data fields which mean the same thing (regardless of the organization of the form or the data representation of the field in the form generated by the foreign process). In alternative embodiments, an aliasing or synonym table or data base is used. In such embodiments, the Get_Field call is used to access the synonym table in the class manager and looks for all synonyms of the requested field name. All field names which are synonyms of the requested field name are returned. The class manager then searches the class definition for a match with either the requested field name or any of the synonyms and retrieves the field having the matching field name.

Returning to consideration of the preferred embodiment, such Get_Field calls may be made by client applications directly to the forms-class manager modules such as the module 122 in FIG. 1, or they may be made to the communications components or forms-manager modules and transferred by these modules to the forms-class manager. The forms-class manager creates, destroys, manipulates, stores and reads form-class definitions.

A Get_Field call delivers to the forms-class manager the address of the form involved and the name of the field in the form of interest. The process of receiving such a request is symbolized by block 120 in FIG. 12. Block 20 also symbolizes the process by which the class manager is given the class definition either programmatically, i.e., by the requesting application, or is told the location of a data base where the class definitions including the class definition for the form of interest may be found. There may be several databases or files in the network file system 24 of FIG. 1 wherein class definitions are stored. It is only necessary to give the forms-class manager the location of the particular file in which the class definition for the form of interest is stored.

Next, as symbolized by block 122, the class-manager module accesses the class definition for the form class identified in the original call.

The class manager then searches the class definition field names to find a match for the field name given in the original call. This process is symbolized by block 124.

After locating the field of interest in the class definition, the class manager returns a relative address pointer to the field of interest in instances of forms of this class. This process is symbolized by block 126 in FIG. 12. The relative address pointer returned by the class manager is best understood by reference to FIGS. 2, 4 and 6. Suppose that the application which made the Get_Field call was interested in determining the age of a particular player. The Get_Field request would identify the address for the instance of the form of class 1002 for player Blackett as illustrated in FIG. 6. Also included in the Get_Field request would be the name of the field of interest, i.e., "age". The class manager would then access the instance of the form of interest and read the class number identifying the particular class descriptor or class definition which applied to this class of forms. The class manager would then access the class descriptor for class 1002 and find a class definition as shown in FIG. 4. The class manager would then access the class definitions for each of the fields of class definition 1002 and would compare the field name in the original Get_Field request to the field names in the various class definitions which make up the class definition for class 1002. In other words, the class manager would compare the names of the fields in the class definitions for classes 10, 1000, and 1001 to the field name of interest, "Age". A match would be found in the class definition for class 1000 as seen from FIG. 2. For the particular record format shown in FIG. 6, the "Age" field would be the block of data 62, which is the tenth block of data in from the start of the record. The class manager would then return a relative address pointer of 10 in block 126 of FIG. 12. This relative address pointer is returned to the client application which made the original Get_Field call. The client application then issues a Get_Data call to the forms-manager module and delivers to the forms-manager module the relative address of the desired field in the particular instance of the form of interest. The forms-manager module must also know the address of the instance of the form of interest which it will already have if the original Get_Field call came through the forms-manager module and was transferred to the forms-class manager. If the forms-manager module does not have the address of the particular instance of the form of interest, then the forms manager will request it from the client application. After receiving the Get_Data call and obtaining the relative address and the address of the instance of the form of interest, the forms manager will access this instance of the form and access the requested data and return it to the client application. This process of receiving the Get_Data call and returning the appropriate data is symbolized by block 128 in FIG. 12.

Normally, class-manager modules store the class definitions needed to do semantic-dependent operations in RAM of the host machine as class descriptors. Class definitions are the specification of the semantic and formation information that define a class. Class descriptors are memory objects which embody the class definition. Class descriptors are stored in at least two ways. In random access memory (RAM), class descriptors are stored as forms in the format native to the machine and client application that created the class definition. Class descriptors stored on disk or tape are stored as ASCII strings of text.

When the class-manager module is asked to do a semantic-dependent operation, it searches through its store of class descriptors in RAM and determines if the appropriate class descriptor is present. If it is, this class descriptor is used to perform the operation detailed above with reference to FIG. 12. If the appropriate class descriptor is not present, the class manager must obtain it. This is done by searching through known files of class descriptors stored in the system files 24 in FIG. 1 or by making a request to the foreign application that created the class definition to send the class definition to the requesting module. The locations of the files storing class descriptors are known to the client applications, and the class-manager modules also store these addresses. Often, the request for a semantic-dependent operation includes the address of the file where the appropriate class descriptor may be found. If the request does not contain such an address, the class manager looks through its own store of class descriptors and through the files identified in records stored by the class manager identifying the locations of system class descriptor files.

If the class manager asks for the class descriptor from the foreign application that generated it, the foreign application sends a request to its class manager to send the appropriate class descriptor over the network to the requesting class manager or the requesting module. The class descriptor is then sent as any other form and used by the requesting class manager to do the requested semantic-dependent operation.

If the class manager must access a file to obtain a class descriptor, it must also convert the packed ASCII representation in which the class descriptors are stored on disk or tape to the format of a native form for storage in RAM. This is done by parsing the ASCII text to separate out the various field names and specifications of the field contents and the class numbers.

Figures 13A, 13B:
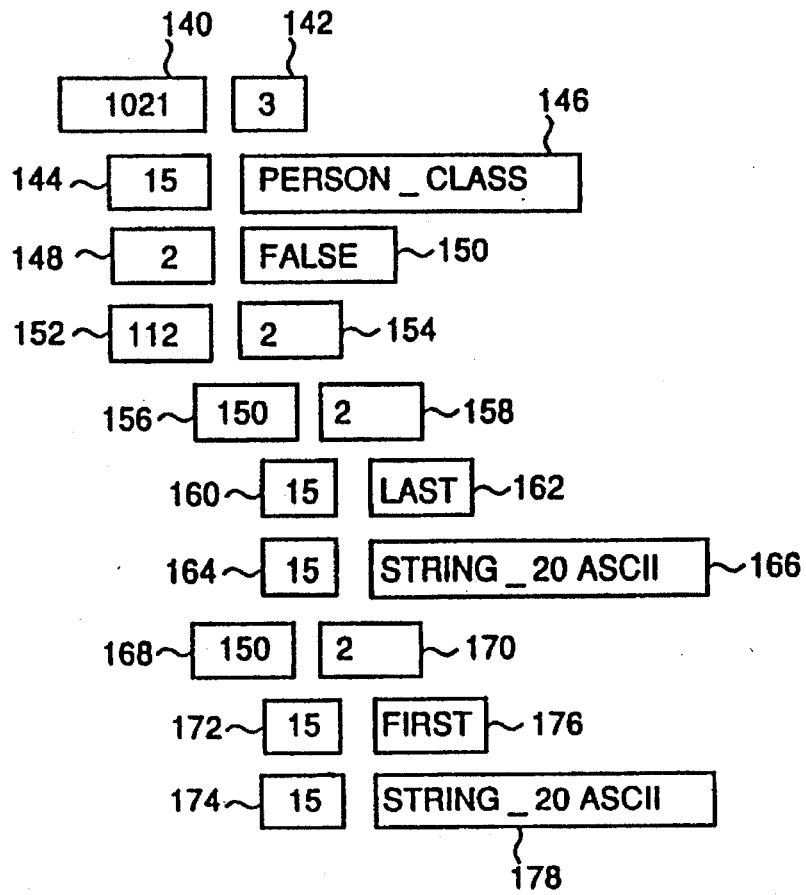
FIGS. 13A and 13B are, respectively, a class definition and the class descriptor form which stores this class definition.

FIGS. 13A and 13B illustrate, respectively, a class definition and the structure and organization of a class descriptor for the class definition of FIG. 13A and stored in memory as a form. The class definition given in FIG. 13A is named Person_Class and has only two fields, named last and first. Each of these fields is specified to store a 20-character ASCII string.

FIG. 13B has a data block 140 which contains 1021 indicating that the form is a constructed form having a class number 1021. The data block at 142 indicates that the form has 3 fields. The first field contains a primitive class specified to contain an ASCII string which happens to store the class name, Person_Class, in data block 146. The second field is of a primitive class assigned the number 2, data block 148, which is specified to contain a boolean value, data block 150. Semantically, the second field is defined in the class definition for class 1021 to define whether the form class is primitive (true) or constructed (false). In this case, data block 150 is false indicating that class 1021 is a constructed class. The third field is a constructed class given the class number 112 as shown by data block 152. The class definition for class 1021 defines the third field as a constructed class form which gives the names and specifications of the fields in the class definition. Data block 154 indicates that two fields exist in a class 112 form. The first field of class 112 is itself a constructed class given the class number 150, data block 156, and has two subfields, data block 158. The first subfield is a primitive class 15, data block 160, which is specified in the class definition for class 150 to contain the name of the first field in class 1021. Data block 162 gives the name of the first field in class 1021. The second subfield is of primitive class 15, data block 164, and is specified in the class definition of class 150 (not shown) to contain an ASCII string which specifies the representation, data block 166, of the actual data stored in the first field of class 1021. The second field of class 112 is specified in the class definition of class 112 to contain a constructed form of class 150, data block 168, which has two fields, data block 170, which give the name of the next field in class 1021 and specify the type of representation of the actual data stored in this second field.

DATA DISTRIBUTION AND SERVICE PROTOCOL DECOUPLING BY SUBJECT-BASED ADDRESSING AND THE USE OF SERVICE DISCIPLINE PROTOCOL LAYERS

Figure 14:
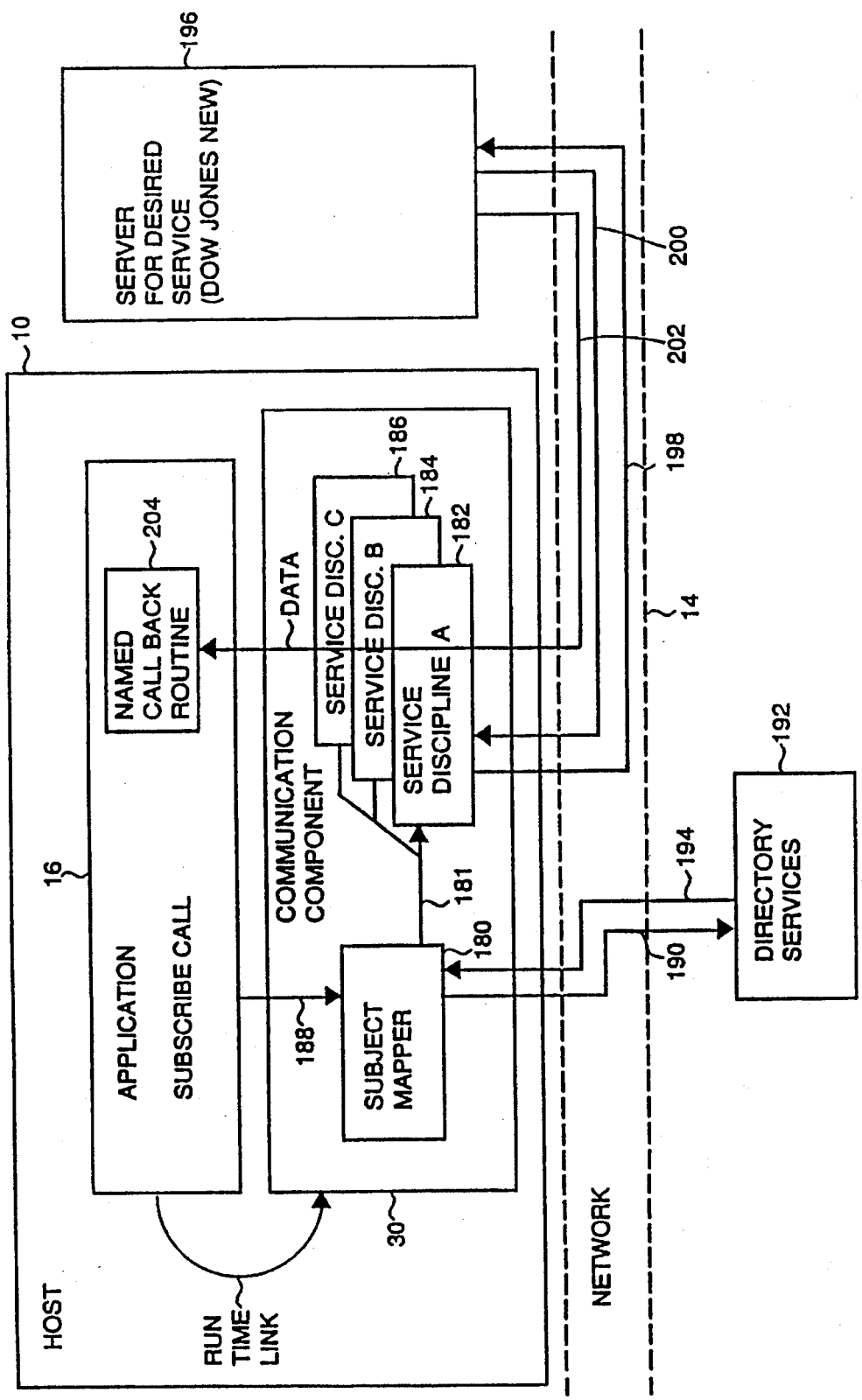
FIG. 14 is a block diagram illustrating the relationships between the subject-mapper module and the service discipline modules of the communication component to the requesting application and the service for subject-based addressing.

Referring to FIG. 14, there is shown a block diagram of the various software modules, files, networks, and computers which cooperate to implement two important forms of decoupling. These forms of decoupling are data distribution decoupling and service protocol decoupling. Data distribution decoupling means freeing client applications from the necessity to know the network addresses for servers providing desired services. Thus, if a particular application needs to know information supplied by, for example, the Dow Jones news service, the client application does not need to know which servers and which locations are providing data from the Dow Jones news service raw data feed.

Service protocol decoupling means that the client applications need not know the particular communications protocols used by the servers, services or other applications with which exchanges of data are desired.

Data distribution decoupling is implemented by the communications module 30 in FIG. 14. The communications component is comprised of a library of software routines which implement a subject mapper 180 and a plurality of service disciplines to implement subject-based addressing. Service disciplines 182, 184 and 186 are exemplary of the service disciplines involved in subject-based addressing.

Subject-based addressing allows services to be modified or replaced by alternate services providing equivalent information without impacting the information consumers. This decoupling of the information consumers from information providers permits a higher degree of modularization and flexibility than that provided by traditional service-oriented models.

Subject-based addressing starts with a subscribe call 188 to the subject mapper 180 by a client application 16 running on host computer 10. The subscribe call is a request for information regarding a particular subject. Suppose hypothetically that the particular subject was equity.IBM.news. This subscribe call would pass two parameters to the subject mapper 180. One of these parameters would be the subject equity.IBM.news. The other parameter would be the name of a callback routine in the client application 16 to which data regarding the subject is to be passed. The subscribe call to the subject mapper 180 is a standard procedure call.

The purpose of the subject mapper is to determine the network address for services which provide information on various subjects and to invoke the appropriate service discipline routines to establish communications with those services. To find the location of the services which provide information regarding the subject in the subscribe call, the subject mapper 80 sends a request symbolized by line 190 to a directory-services component 192. The directory-services component is a separate process running on a computer coupled to the network 14 and in fact may be running on a separate computer or on the host computer 10 itself. The directory-services routine maintains a data base or table of records called service records which indicate which services supply information on which subjects, where those services are located, and the service disciplines used by those services for communication. The directory-services component 192 receives the request passed from the subject mapper 180 and uses the subject parameter of that request to search through its tables for a match. That is, the directory-services component 192 searches through its service records until a service record is found indicating a particular service or services which provide information on the desired subject. This service record is then passed back to the subject mapper as symbolized by line 194. The directory-services component may find several matches if multiple services supply information regarding the desired subject.

The service record or records passed back to the subject mapper symbolized by line 194 contain many fields. Two required fields in the service records are the name of the service which provides information on the desired subject and the name of the service discipline used by that service. Other optional fields which may be provided are the name of the server upon which said service is running and a location on the network of that server.

Generally, the directory-services component will deliver all the service records for which there is a subject map, because there may not be a complete overlap in the information provided on the subject by all services. Further, each service will run on a separate server which may or may not be coupled to the client application by the same network. If such multiplicity of network paths and services exists, passing all the service records with subject matter matches back to the subject mapper provides the ability for the communications interface to switch networks or switch servers or services in the case of failure of one or more of these items.

As noted above, the subject mapper 180 functions to set up communications with all of the services providing information on the desired subject. If multiple service records are passed back from the directory-services module 192, then the subject mapper 180 will set up communications with all of these services.

Upon receipt of the service records, the subject mapper will call each identified service discipline and pass to it the subject and the service record applicable to that service discipline. Although only three service disciplines 182, 184 and 186 are shown in FIG. 14, there may be many more than three in an actual system.

In the event that the directory-services component 192 does not exist or does not find a match, no service records will be returned to the subject mapper 180. In such a case, the subject mapper will call a default service discipline and pass it and the subject and a null record.

Each service discipline is a software module which contains customized code optimized for communication with the particular service associated with that service discipline.

Each service discipline called by the subject mapper 180 examines the service records passed to it and determines the location of the service with which communications are to be established. In the particular hypothetical example being considered, assume that only one service record is returned by the directory-services module 192 and that that service record identifies the Dow Jones news service running on server 196 and further identifies service discipline A at 182 as the appropriate service discipline for communications with the Dow Jones news service on server 196. Service discipline A will then pass a request message to server 196 as symbolized by line 198. This request message passes the subject to the service and may pass all or part of the service record.

The server 196 processes the request message and determines if it can, in fact, supply information regarding the desired subject. It then sends back a reply message symbolized by line 200.

Once communications are so established, the service sends all items of information pertaining to the requested subject on a continual basis to the appropriate service discipline as symbolized by path 202. In the example chosen here, the service running on server 196 filters out only those news items which pertain to IBM for sending to service discipline at 182. In other embodiments, the server may pass along all information it has without filtering this information by subject. The communications component 30 then filters out only the requested information and passes it along to the requesting application 16. In some embodiments this is done by the daemon to be described below, and in other embodiments, it is done elsewhere such as in the information or service layers to be described below.

Each service discipline can have a different behavior. For example, service discipline B at 184 may have the following behavior. The service running on server 196 may broadcast all news items of the Dow Jones news service on the network 14. All instances of service discipline B may monitor the network and filter out only those messages which pertain to the desired subject. Many different communication protocols are possible.

The service discipline A at 182 receives the data transmitted by the service and passes it to the named callback routine 204 in the client application 16. (The service discipline 182 was passed the name of the callback routine in the initial message from the mapper 180 symbolized by line 181.) The named callback routine then does whatever it is programmed to do with the information regarding the desired subject.

Data will continue to flow to the named callback routine 204 in this manner until the client application 16 expressly issues a cancel command to the subject mapper 180. The subject mapper 180 keeps a record of all subscriptions in existence and compares the cancel command to the various subscriptions which are active. If a match is found, the appropriate service discipline is notified of the cancel request, and this service discipline then sends a cancel message to the appropriate server. The service then cancels transmission of further data regarding that subject to the service discipline which sent the cancel request.

It is also possible for a service discipline to stand alone and not be coupled to a subject mapper. In this case the service discipline or service disciplines are linked directly to the application, and subscribe calls are made directly to the service discipline. The difference is that the application must know the name of the service supplying the desired data and the service discipline used to access the service. A database or directory-services table is then accessed to find the network address of the identified service, and communications are established as defined above. Although this software architecture does not provide data distribution decoupling, it does provide service protocol decoupling, thereby freeing the application from the necessity to know the details of the communications interface with the service with which data is to be exchanged.

More details on subject-based addressing subscription services provided by the communications interface according to the teachings of the invention are given in Section 4 of the communications interface specification given below. The preferred embodiment of the communications interface of the invention is constructed in accordance with that specification.

An actual subscribe function in the preferred embodiment is done by performing the TIB_Consume_Create library routine described in Section 4 of the specification. The call to TIB_Consume_Create includes a property list of parameters which are passed to it, one of which is the identity of the callback routine specified as My_Message_Handler in Section 4 of the specification.

In the specification, the subject-based addressing subscription service function is identified as TIBINFO. The TIBINFO interface consists of two libraries. The first library is called TIBINFO_CONSUME for data consumers. The second library is called TIBINFO_PUBLISH for data providers. An application includes one library or the other or both depending on whether it is a consumer or a provider or both. An application can simultaneously be a consumer and a provider.

Figure 15:
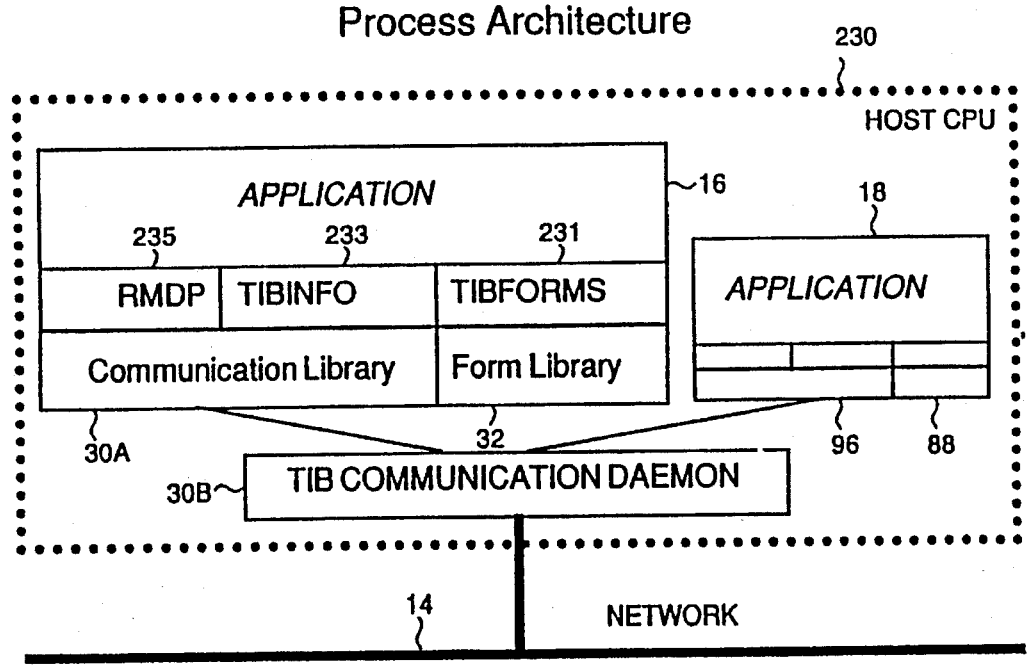
FIG. 15 illustrates the relationship of the various modules, libraries and interfaces of an alternative embodiment of the invention to the client applications.

Referring to FIG. 15, there is shown a block diagram of the relationship of the communications interface according to the teachings of the invention to the applications and the network that couples these applications. Blocks having identical reference numerals to blocks in FIG. 1 provide similar functional capabilities as those blocks in FIG. 1. The block diagram in FIG. 15 shows the process architecture of the preferred embodiment. The software architecture corresponding to the process architecture given in FIG. 15 is shown in block form in FIG. 16.

Figure 16:
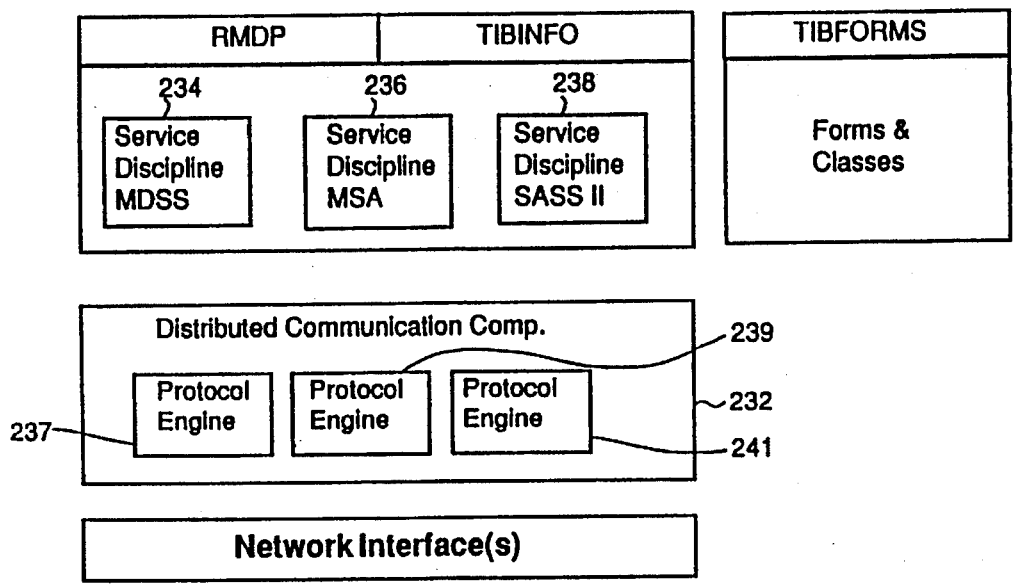
FIG. 16 illustrates the relationships of various modules inside the communication interface of an alternative embodiment.

The software architecture and process architecture detailed in FIGS. 15 and 16, respectively, represents an alternative embodiment to the embodiment described above with reference to FIGS. 1–14.

Referring to FIG. 15, the communications component 30 of FIG. 1 is shown as two separate functional blocks 30A and 30B in FIG. 15. That is, the functions of the communications component 30 in FIG. 1 are split in the process architecture of FIG. 15 between two functional blocks. A communications library 30A is linked with each client application 16, and a backend communications daemon process 30B is linked to the network 14 and to the communication library 30A. There is typically one communication daemon per host processor. This host processor is shown at 230 in FIG. 15 but is not shown at all in FIG. 16. Note that in FIG. 15, unlike the situation in FIG. 1, the client applications 16 and 18 are both running on the same host processor 230. Each client application is linked to its own copies of the various library programs in the communication libraries 30A and 96 and the form library of the data-exchange components 32 and 88. These linked libraries of programs share a common communication daemon 30B.

The communication daemons on the various host processors cooperate among themselves to insure reliable, efficient communication between machines. For subject addressed data, the daemons assist in its efficient transmission by providing low-level system support for filtering messages by subject. The communication daemons implement various communication protocols described below to implement fault tolerance, load balancing and network efficiency.

The communication library 30A performs numerous functions associated with each of the application-oriented communication suites. For example, the communication library translates subjects into efficient message headers that are more compact and easier to check than ASCII subject values. The communications library also maps service requests into requests targeted for particular service instances, and monitors the status of those instances.

The data-exchange component 32 of the communications interface according to the teachings of the invention is implemented as a library called the "form library." This library is linked with the client application and provides all the core functions of the data-exchange component. The form library can be linked independently of the communication library and does not require the communication daemon 30B for its operation.

The communication daemon serves in two roles. In the subject-based addressing mode described above where the service instance has been notified of the subject and the network address to which data is to be sent pertaining to this subject, the communication daemon 30B owns the network address to which the data is sent. This data is then passed by the daemon to the communication library bound to the client application, which in turn passes the data to the appropriate callback routine in the client application. In another mode, the communication daemon filters data coming in from the network 14 by subject when the service instances providing data are in a broadcast mode and are sending out data regarding many different subjects to all daemons on the network.

The blocks 231, 233 and 235 in FIG. 15 represent the interface functions which are implemented by the programs in the communication library 30A and the form library 32. The TIBINFO interface 233 provides subject-based addressing services by the communication paradigm known as the subscription call. In this paradigm, a data consumer subscribes to a service or subject and in return receives a continuous stream of data about the service or subject until the consumer explicitly terminates the subscription (or a failure occurs). A subscription paradigm is well suited to real-time applications that monitor dynamically changing values, such as a stock price. In contrast, the more traditional request/reply communication is ill suited to such real-time applications, since it requires data consumers to "poll" data providers to learn of changes.

The interface 235 defines a programmatic interface to the protocol suite and service comprising the Market Data Subscription Service (MDSS) sub-component 234 in FIG. 16. This service discipline will be described more fully later. The RMDP interface 235 is a service address protocol in that it requires the client application to know the name of the service with which data is to be exchanged.

In FIG. 16 there is shown the software architecture of the system. A distributed communications component 232 includes various protocol engines 237, 239 and 241. A protocol engine encapsulates a communication protocol which interfaces service discipline protocols to the particular network protocols. Each protocol engine encapsulates all the logic necessary to establish a highly reliable, highly efficient communication connection. Each protocol engine is tuned to specific network properties and specific applications properties. The protocol engines 237, 239 and 241 provide a generic communication interface to the client applications such as applications 16 and 18. This frees these applications (and the programmers that write them) from the need to know the specific network or transport layer protocols needed to communicate over a particular network configuration. Further, if the network configuration or any of the network protocols are changed such as by addition of a new local area network, gateway etc. or switching of transport layer protocols say from DECNET™ to TCP/IP™, the application programs need not be changed. Such changes can be accommodated by the addition, substitution or alteration of the protocol engines so as to accommodate the change. Since these protocol engines are shared, there is less effort needed to change the protocol engines than to change all the applications.

The protocol engines provide protocol transparency and communication path transparency to the applications thereby freeing these applications from the need to have code which deals with all these details. Further, these protocol engines provide network interface transparency.

The protocol engines can also provide value added services in some embodiments by implementing reliable communication protocols. Such value added services include reliable broadest and reliable point to point communications as well as Reliable Multicast™ communications where communications are switched from reliable broadcast to reliable point to point when the situation requires this change for efficiency. Further, the protocol engines enhance broadcast operations where two or more applications are requesting data on a subject by receiving data directed to the first requesting application and passing it along to the other requesting applications. Prior art broadcast software does not have this capability.

The protocol engines also support efficient subject based addressing by filtering messages received on the network by subject. In this way, only data on the requested subject gets passed to the callback routine in the requesting application. In the preferred embodiment, the protocol engines coupled to the producer applications or service instances filter the data by subject before it is placed in the network thereby conserving network bandwidth, input/output processor bandwidth and overhead processing at the receiving ends of communication links.

The distributed communication component 232 (hereafter DCC) in FIG. 16 is structured to meet several important objectives. First, the DCC provides a simple, stable and uniform communication model. This provides several benefits. It shields programmers from the complexities of: the distributed environment; locating a target process; establishing communications with this target process; and determining when something has gone awry. All these tasks are best done by capable communications infrastructure and not by the programmer. Second, the DCC reduces development time not only by increasing programmer productivity but also by simplifying the integration of new features. Finally, it enhances configurability by eliminating the burden on applications to know the physical distribution on the network of other components. This prevents programmers from building dependencies in their code on particular physical configurations which would complicate later reconfigurations.

Another important objective is the achievement of portability through encapsulation of important system structures. This is important when migrating to a new hardware or software environment because the client applications are insulated from transport and access protocols that may be changing. By isolating the required changes in a small portion of the system (the DCC), the applications can be ported virtually unchanged and the investment in the application software is protected.

Efficiency is achieved by the DCC because it is coded on top of less costly "connectionless" transport protocol in standard protocol suites such as TCP/IP and OSI. The DCC is designed to avoid the most costly problem in protocols, i.e., the proliferation of data "copy" operations.

The DCC achieves these objectives by implementing a layer of services on top of the basic services provided by vendor supplied software. Rather than re-inventing basic functions like reliable data transfer or flow-control mechanisms, the DCC shields applications from the idiosyncracies of any particular operating system. Examples include the hardware oriented interfaces of the MS-DOS environment, or the per-process file descriptor limit of UNIX. By providing a single unified communication toll that can be easily replicated in many hardware and software environments, the DCC fulfills the above objectives.

The DCC implements several different transmission protocols to support the various interaction paradigms, fault-tolerance requirements and performance requirements imposed by the service discipline protocols. Two of the more interesting protocols are the reliable broadcast and intelligent multicast protocols.

Standard broadcast protocols are not reliable and are unable to detect lost messages. The DCC reliable broadcast protocols ensure that all operational hosts either receive each broadcast message or detects the loss of the message. Unlike many so-called reliable broadcast protocols, lost messages are retransmitted on a limited, periodic basis.

The Intelligent Multicast™ protocol provides a reliable datastream to multiple destinations. The novel aspect of this protocol is that it can switch dynamically from point-to-point transmission to broadcast transmission in order to optimize the network and processor load. The switch from point-to-point to broadcast (and vice-versa) is transparent to higher-level protocols. This transport protocol allows the support of a much larger number of consumers than would be possible using either point-to-point or broadcast alone. The protocol is built on top of other protocols with the DCC.

Currently, all DCC protocols exchange data only in discrete units, i.e., messages (in contrast to many transport protocols). The DCC guarantees that the messages originating from a single process are received in the order sent.

The DCC contains fault tolerant message transmission protocols that support retransmission in the event of a lost message. The DCC software guarantees "at-most-once" semantics with regard to message delivery and makes a best attempt to ensure "exactly-once" semantics.

The DCC has no exposed interface for use by application programmers.

The distributed component 232 is coupled to a variety of service disciplines 234, 236 and 238. The service discipline 234 has the behavior which will herein be called Market Data Subscription Service. This protocol allows data consumers to receive a continuous stream of data, fault tolerant of failures of individual data sources. This protocol suite provides mechanisms for administering load-balancing and entitlement policies.

The MDSS service discipline is service oriented in that applications calling this service discipline through the RMDP interface must know the service that supplies requested data. The MDSS service discipline does however support the subscription communication paradigm which is implemented by the Subject Addressed Subscription Service (SASS) service discipline 238 in the sense that streams of data on a subject will be passed by the MDSS service discipline to the linked application.

The MDSS service discipline allows data consumer applications to receive a continuous stream of data, tolerant of failures of individual data sources. This protocol suite 234 also provides mechanisms for load balancing and entitlement policy administration where the access privileges of a user or application are checked to insure a data consumer has a right to obtain data from a particular service.

Two properties distinguish the MDSS service discipline from typical client server protocols. First, subscriptions are explicitly supported whereby changes to requested values are automatically propagated to requesting applications. Second client applications request or subscribe to a specific service (as opposed to a particular server and as opposed to a particular subject). The MDSS service discipline then forwards the client application request to an available server. The MDSS service discipline also monitors the server connection and reestablishes it if the connection fails using a different server if necessary.

The MDSS service discipline implements the following important objectives.

Fault tolerance is implemented by program code which performs automatic switchover between redundant services by supporting dual or triple networks and by utilizing the fault tolerant transmission protocols such as reliable broadcast implemented in the protocol engines. Recovery is automatic after a server failure.

Load balancing is performed by balancing the data request load across all operating servers for a particular service. The load is automatically rebalanced when a server fails or recovers. In addition, the MDSS supports server assignment policies that attempts to optimize the utilization of scarce resources such as "slots" in a page cache or bandwidth across an external communication line.

Network efficiency is implemented by an intelligent multicast protocol implemented by the distributed communication daemon 30B in FIG. 15. The intelligent multicast protocol optimizes limited resources of network and I/O processor bandwidth by performing automatic, dynamic switchover from point to point communication protocols to broadcast protocols when necessary. For example, Telerate page 8 data may be provided by point to point distribution to the first five subscribers and then switch all subscribers to broadcast distribution when the sixth subscriber appears.

The MDSS service discipline provides a simple, easy-to-use application development interface that masks most of the complexity of programming a distributed system, including locating servers, establishing communication connections, reacting to failures and recoveries and load balancing.

The core functions of the MDSS service discipline are: get, halt and derive. The "get" call from a client application establishes a fault-tolerant connection to a server for the specified service and gets the current value of the specified page or data element. The connection is subscription based so that updates to the specified page are automatically forwarded to the client application. "Halt" stops the subscription. "Drive" sends a modifier to the service that can potentially change the subscription.

The MDSS service discipline is optimized to support page oriented services but it can support distribution of any type data.

The service discipline labeled MSA, 236, has yet a different behavior. The service discipline labeled SASS, 238, supports subject-based address subscription services.

The basic idea behind subject based addressing and the SASS service discipline's (hereafter SASS) implementation of it is straightforward. Whenever an application requires data, especially data on a dynamically changing value, the application simply subscribes to it by specifying the appropriate subject. The SASS then maps this subject request to one or more service instances providing information on this subject. The SASS then makes the appropriate communication connections to all the selected services through the appropriate one or more protocol engines necessary to communication with the servicer or servers providing the selected service or services.

Through the use of subject based addressing, information consumers can request information in a way that is independent of the application producing the information. Hence, the producing application can be modified or supplanted by a new application providing the same information without affecting the consumers of the information.

Subject based addressing greatly reduces the complexities of programming a distributed application in three ways. First, the application requests information by subject, as opposed to by server or service. Specifying information at this high level removes the burden on applications of needing to know the current network address of the service instances providing the desired information. It further relieves the application of the burden or knowing all the details of the communication protocols to extract data from the appropriate service or services and the need to know the details of the transport protocols needed to traverse the network. Further, it insulates the client applications from the need for programming changes when something else changes like changes in the service providers, e.g., a change from IDN to Ticker 3 for equity prices. All data is provided through a single, uniform interface to client applications. A programmer writing a client application needing information from three different services need not learn three different service specific communication protocols as he or she would in traditional communication models. Finally, the SASS automates many of the difficult and error prone tasks such as searching for an appropriate service instance and establishing a correct communication connection.

The SASS service discipline provides three basic functions which may be invoked through the user interface.

"Subscribe" is the function invoked when the consumer requests information on a real-time basis on one or more subjects. The SASS service discipline sets up any necessary communication connections to ensure that all data matching the given subject(s) will be delivered to the consumer application. The consumer can specify that data be delivered either asynchronously (interrupt-driven) or synchronously.

The producer service will be notified of the subscription if a registration procedure for its service has been set up. This registration process will be done by the SASS and is invisible to the user.

The "cancel" function is the opposite of "subscribe". When this function is invoked, the SASS closes down any dedicated communication channel and notifies the producer service of the cancellation if a registration procedure exists.

The "Receive" function and "callback" function are related functions by which applications receive messages matching their subscriptions. Callbacks are asynchronous and support the event driven programming style. This style is well suited for applications requiring real time data exchange. The receive function supports a traditional synchronous interface for message receipt.

A complementary set of functions exists for a data producer. Also, applications can be both data producers and data consumers.

Figure 17:
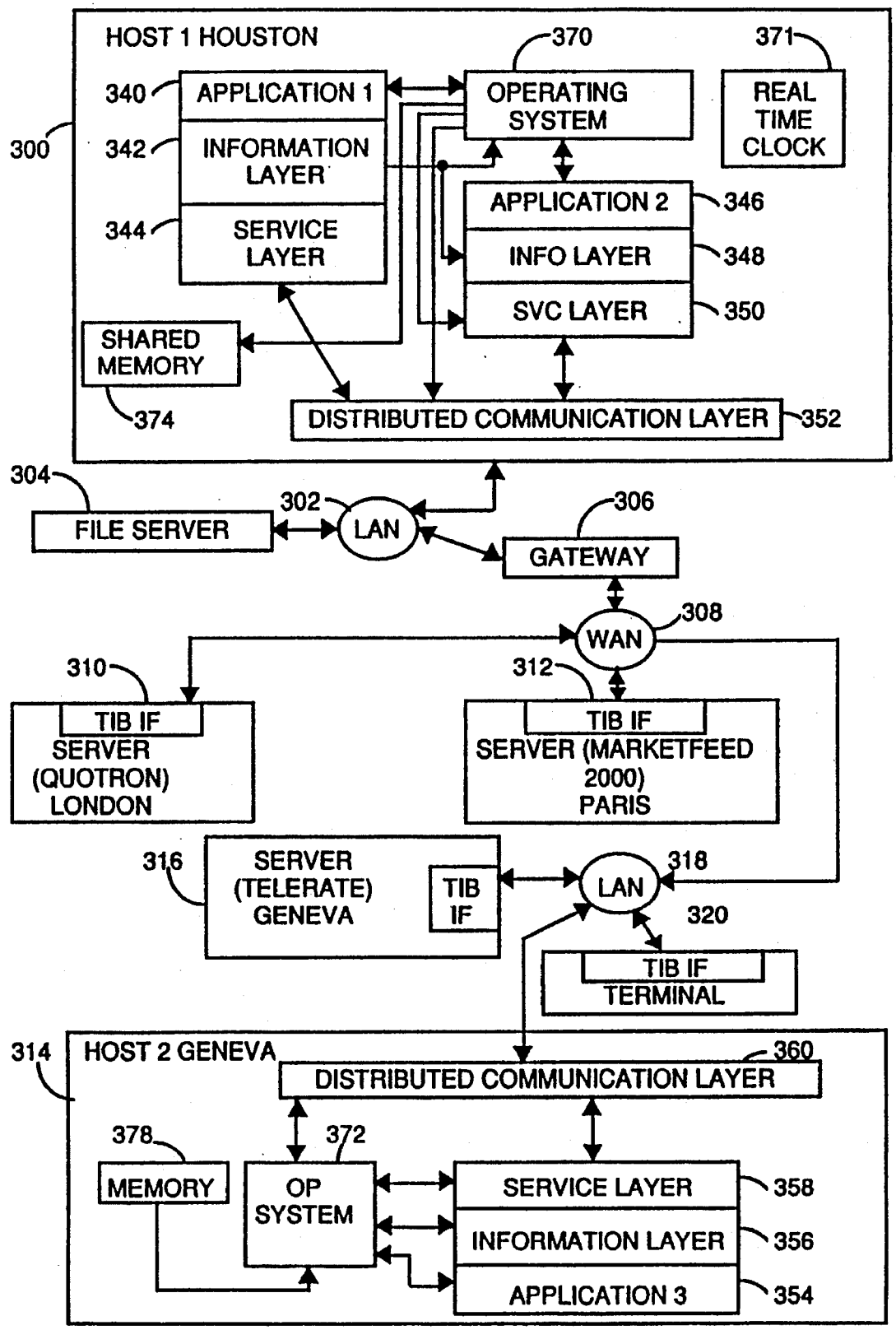
FIG. 17 is a block diagram of a typical distributed computer network.

Referring to FIG. 17 there is shown a typical computer network situation in which the teachings of the invention may be profitably employed. The computer network shown is comprised of a first host CPU 300 in Houston coupled by a local area network (hereafter LAN) 302 to a file server 304 and a gateway network interconnect circuit 306. The gateway circuit 306 connects the LAN 302 to a wide area network (hereafter WAN) 308. The WAN 308 couples the host 300 to two servers 310 and 312 providing the Quotron and Marketfeed 2000 services, respectively, from London and Paris, respectively. The WAN 308 also couples the host 300 to a second host CPU 314 in Geneva and a server 316 in Geneva providing the Telerate service via a second LAN 318. Dumb terminal 320 is also coupled to LAN 318.

Typically the hosts 300 and 314 will be multitasking machines, but they may also be single process CPU's such as computers running the DOS or PC-DOS operating systems The TIB communication interface software supplied herewith as Appendix A embodies the best mode of practicing the invention and is ported for a Unix based multitasking machine. To adapt the teachings of the invention to the DOS or other single task environments requires that the TIB communication daemon 30B in the process architecture be structures as an interrupt driven process which is invoked, i.e., started upon receipt of a notification from the operating system that a message has been received on the network which is on a subject to which one of the applications has subscribed.

The LAN's 302 and 318, WAN 308 and gateway 306 may each be of any conventional structure and protocol or any new structure and protocol developed in the future so long as they are sufficiently compatible to allow data exchange among the remaining elements of the system. Typically, the structures and protocols used on the networks will be TCP/IP, DECNET™, ETHERNET™, token ring, ARPANET and/or other digital pack or high speed private line digital or analog systems using hardwire, microwave or satellite transmission media. Various CCITT recommendations such as X.1, X.2, X.3, X.20, X.21, X.24, X.28, X.29, X.25 and X.75 suggest speeds, user options, various interface standards, start-stop mode terminal handling, multiplex interface for synchronous terminals, definitions of interface circuits and packet-network interconnection, all of which are hereby incorporated by reference. A thorough discussion of computer network architecture and protocols is included in a special issue of IEEE Transactions on Communications, April 1980, Vol. COM-28, which also is incorporated herein by reference. Most digital data communication is done by characters represented as sequences of bits with the number of bits per character and the sequence of 0's and 1's that correspond to each character defining a code. The most common code is International Alphabet No. 5 which is known in the U.S. as ASCII. Other codes may also be used as the type of code used is not critical to the invention.

In coded transmission, two methods of maintaining synchronism between the transmitting and receiving points are commonly used. In "start-stop" transmission, the interval between characters is represented by a steady 1 signal, and the transmission of a single 0 bit signals the receiving terminal that a character is starting. The data bits follow the start bit and are followed by a stop pulse. The stop pulse is the same as the signal between characters and has a minimum length that is part of the terminal specification. In the synchronous method, bits are sent at a uniform rate with a synchronous idle pattern during intervals when no characters are being sent to maintain timing. The synchronous method is used for higher speed transmission.

Protocols as that term is used in digital computer network communication are standard procedures for the operation of communication. Their purpose is to coordinate the equipment and processes at interfaces at the ends of the communication channel. Protocols are considered to apply to several levels. The International Organization for Standardization (ISO) has developed a seven level Reference Model of Open System Interconnection to guide the development of standard protocols. The seven levels of this standard hereafter referred to as the ISO Model and their functions are:

(1) Application: Permits communication between applications. Protocols here serve the needs of the end user.

(2) Presentation: Presents structured data in proper form for use by application programs. Provides a set of services which may be selected by the application layer to enable it to interpret the meaning of data exchanged.

(3) Session: Sets up and takes down relationships between presentation entities and controls data exchange, i.e., dialog control.

(4) Transport: Furnishes network-independent transparent transfer of data. Relieves the session layer from any concern with the detailed way in which reliable and cost-effective transfer of data is achieved.

(5) Network: Provides network independent routing, switching services.

(6) Data Link: Gives error-free transfer of data over a link by providing functional and procedural means to establish, maintain and release data links between network entities.

(7) Physical: Provides mechanical, electrical, functional and procedural characteristics to establish, maintain, and release physical connections, e.g., data circuits between data link entities.

Some data link protocols, historically the most common, use characters or combinations of characters to control the interchange of data. Others, including the ANSI Advanced Data Communication Control Procedure and its subsets use sequences of bits in predetermined locations in the message to provide the link control.

Packet networks were developed to make more efficient use of network facilities than was common in the circuit-switched and message-switched data networks of the mid-60's. In circuit-switched networks, a channel was assigned full time for the duration of a call. In message-switched networks, a message or section of a serial message was transmitted to the next switch if a path (loop or trunk) was available. If not, the message was stored until a path was available. The use of trunks between message switches was often very efficient. In many circuit-switched applications though, data was transmitted only a fraction of the time the circuit was in use. In order to make more efficient use of facilities and for other reasons, packet networks came into existence.

In a packet network, a message from one host or terminal to another is divided into packets of some definite length, usually 128 bytes. These packets are then sent from the origination point to the destination point individually. Each packet contains a header which provides the network with the necessary information to handle the packet. Typically, the packet includes at least the network addresses of the source and destination and may include other fields of data such as the packet length, etc. The packets transmitted by one terminal to another are interleaved on the facilities between the packets transmitted by other users to their destinations so that the idle time of one source can be used by another source. Various network contention resolution protocols exist to arbitrate for control of the network by two or more destinations wishing to send packets on the same channel at the same time. Some protocols utilize multiple physical channels by time division or frequency multiplexing.

The same physical interface circuit can be used simultaneously with more than one other terminal or computer by the use of logical channels. At any given time, each logical channel is used for communication with some particular addressee; each packet includes in its header the identification of its logical channel, and the packets of the various logical channels are interleaved on the physical-interface circuit.

At the destination, the message is reassembled and formatted before delivery to the addressee process. In general, a network has an internal protocol to control the movement of data within the network.

The internal speed of the network is generally higher than the speed of any terminal or node connected to the network.

Three methods of handling messages are in common use. "Datagrams" are one-way messages sent from an originator to a destination. Datagram packets are delivered independently and not necessarily in the order sent. Delivery and nondelivery notifications may be provided. In "virtual calls", packets are exchanged between two users of the network; at the destination, the packets are delivered to the addressee process in the same order in which they were originated. "Permanent virtual circuits" also provide for exchange of packets between two users on a network. Each assigns a logical channel, by arrangement with the provider of the network, for exchange of packet with the other. No setup or clearing of the channel is then necessary.

Some packet networks support terminals that do not have the internal capability to format messages in packets by means of a packet assembler and disassembler included in the network.

The earliest major packet network in the U.S. was ARPNET, set up to connect terminals and host computers at a number of universities and government research establishments. The objective was to permit computer users at one location to use data or programs located elsewhere, perhaps in a computer of a different manufacturer. Access to the network is through an interface message processor (IMP) at each location, connected to the host computer(s) there and the IMP at other locations. IMP's are not directly connected to each other IMP. Packets routed to destination IMP's not connected directly to the source IMP are routed through intervening IMP's until they arrive at the destination process. At locations where there is no host, terminal interface processors are used to provide access for dumb terminals.

Other packet networks have subsequently been set up worldwide, generally operating in the virtual call mode.

In early packet networks, routing of each packet in a message is independent. Each packet carries in its header the network address of the destination as well as a sequence number to permit arranging of the packets in the proper order at the destination. Networks designed more recently use a "virtual circuit" structure and protocol. The virtual circuit is set up at the beginning of a data transmission and contains the routing information for all the packets of that data transmission. The packets after the first contain the designation of the virtual circuit in their headers. In some networks, the choice of route is based on measurements received from all other nodes, of the delay to every other node on the network. In still other network structures, nodes on the network are connected to some or all the other nodes by doubly redundant or triply redundant pathways.

Some networks such as Dialog, Tymshare and Telenet use the public phone system for interconnection and make use of analog transmission channels and modems to modulate digital data onto the analog signal lines.

Other network structures, generally WAN's, use microwave and/or satellites coupled with earth stations for long distance transmissions and local area networks or the public phone system for local distribution.

There is a wide variety of network structures and protocols in use. Further, new designs for network and transport protocols, network interface cards, network structures, host computers and terminals, server protocols and transport and network layer software are constantly appearing. This means that the one thing that is constant in network design and operation is that it is constantly changing. Further, the network addresses where specific types of data may be obtained and the access protocols for obtaining this data are constantly changing. It is an object of the communication interface software of the invention to insulate the programmer of application programs from the need to know all the networks and transport protocols, network addresses, access protocols and services through which data on a particular subject may be obtained. By encapsulating and modularizing all this changing complexity in the interface software of the invention, the investment in application programs may be protected by preventing network topology or protocol dependencies from being programmed into the applications. Thus, when something changes on the network, it is not necessary to reprogram or scrap all the application programs.

The objectives are achieved according to the teachings of the invention by network communications software having a three-layer architecture, hereafter sometimes called the TIB™ software. In FIG. 17, these three layers are identified as the information layer, the service layer and the distributed communication layer. Each application program is linked during the compiling and linking process to its own copy of the information layer and the service layer. The compiling and linking process is what converts the source code of the application program to the machine readable object code. Thus, for example, application program 1, shown at 340, is directly linked to its own copy of layers of the software of the invention, i.e., the information layer 342 and the service layer 344. Likewise application 2, shown at 346 is linked to its own copies of the information layer 348 and the service layer 350. These two applications share the third layer of the software of the invention called the distributed communication layer 352. Typically there is only one distributed communication layer per node (where a node is any computer, terminal or server coupled to the network) which runs concurrently with the applications in multitasking machines but which could be interrupt drivers in nonmultitasking environments.

The second host 314 in Geneva in the hypothetical network of FIG. 17 is running application program 3, 354. This application is linked to its copies of the information layer 356 and the service layer 358. A concurrently running distributed communication layer 360 in host 2 is used by application 354.

Each of the servers 310, 312 and 316 have a data producer versions of the 3 layer TIB™ software. There is a data consumer version of the TIB™ software which implements the "subscribe' function and a data producer version which implements the "publish" function. Where a process (a program in execution under the UNIX™ definition) is both a data consumer and a data publisher, it will have libraries of programs and interface specifications for its TIB™ software which implement both the subscribe and publish functions.

Each of the hosts 300 and 314 is under the control of an operating system, 370 and 372, respectively, which may be different. Host 1 and host 2 may also be computers of different manufacturers as may servers 310, 312 and 316. Host 1 has on-board shared memory 374 by which applications 340 and 346 may communicate such as by use of a UNIX™ pipe or other interprocess communication mechanism. Host 2 utilizes memory 378.

In a broad statement of the teachings of the invention, the information layer, such as 342, encapsulates the TIBINFO™ interface functionality, and the subject-based addressing functionality of the TIB™ software communication library 30A of FIGS. 15 and 16. The TIBINFO interface is defined in Section 4 of the software specification below. TIBINFO defines a programmatic interface by which applications linked to this information layer may invoke the protocols and services of the Subject-Addressed Subscription Service (SASS) component.

Figure 18:
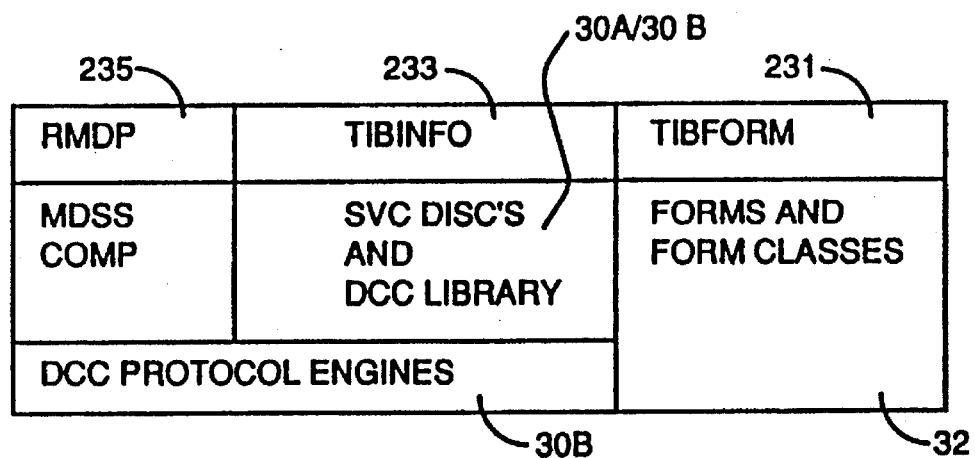
FIG. 18 is a process architecture showing the relationship of the DCC library to the DCC protocol engines in the daemon.

FIG. 18 clarifies the relationships between the process architecture of FIG. 15, the software architecture of FIG. 16 and the 3 layers for the TIB™ software shown in FIG. 17. In FIG. 15, the communications library 30A is a library of programs which are linked to the application 16 which provide multiple functions which may be called upon by the RMDP and TIBINFO interfaces. Subject-Addressed Subscription Services are provided by subject mapper programs and service discipline programs in the component labeled 30A/30B. This component 30A/30B also includes library programs that provide the common infrastructure program code which supports, i.e., communicates with and provides data to, the protocol engine programs of the TIB communication daemon 30B.

The TIBINFO interface is devoted to providing a programmatic interface by which linked client applications may start and use subject-addressed subscriptions for data provided by data producers on the network wherever they may be.

The RMDP interface provide the programmatic interface by which subscriptions may be entered and data received from services on the network by linked client applications which already know the names of the services which supply this data. The communication library 30A in FIG. 15 supplies library programs which may be called by linked client applications to implement the Market-Data-Subscription Service (MDSS). This function creates subscription data requested by service names by setting up, with the aid of the daemon's appropriate protocol engine, a reliable communication channel to one or more servers which supply the requested data. Failures of individual servers are transparent to the client since the MDSS automatically switches to a new server which supplies the same services using the appropriate protocol engine. The MDSS also automatically balances the load on servers and implements entitlement functions to control who gets access to a service. The reliable communication protocols of the DCC library 30A/30B such as intelligent multicast and reliable broadcast and the protocol engines of the daemon 30B are invoked by the MDSS library programs. More details are given in Section 3 of the TIB™ Specification given below.

Figure 19A:
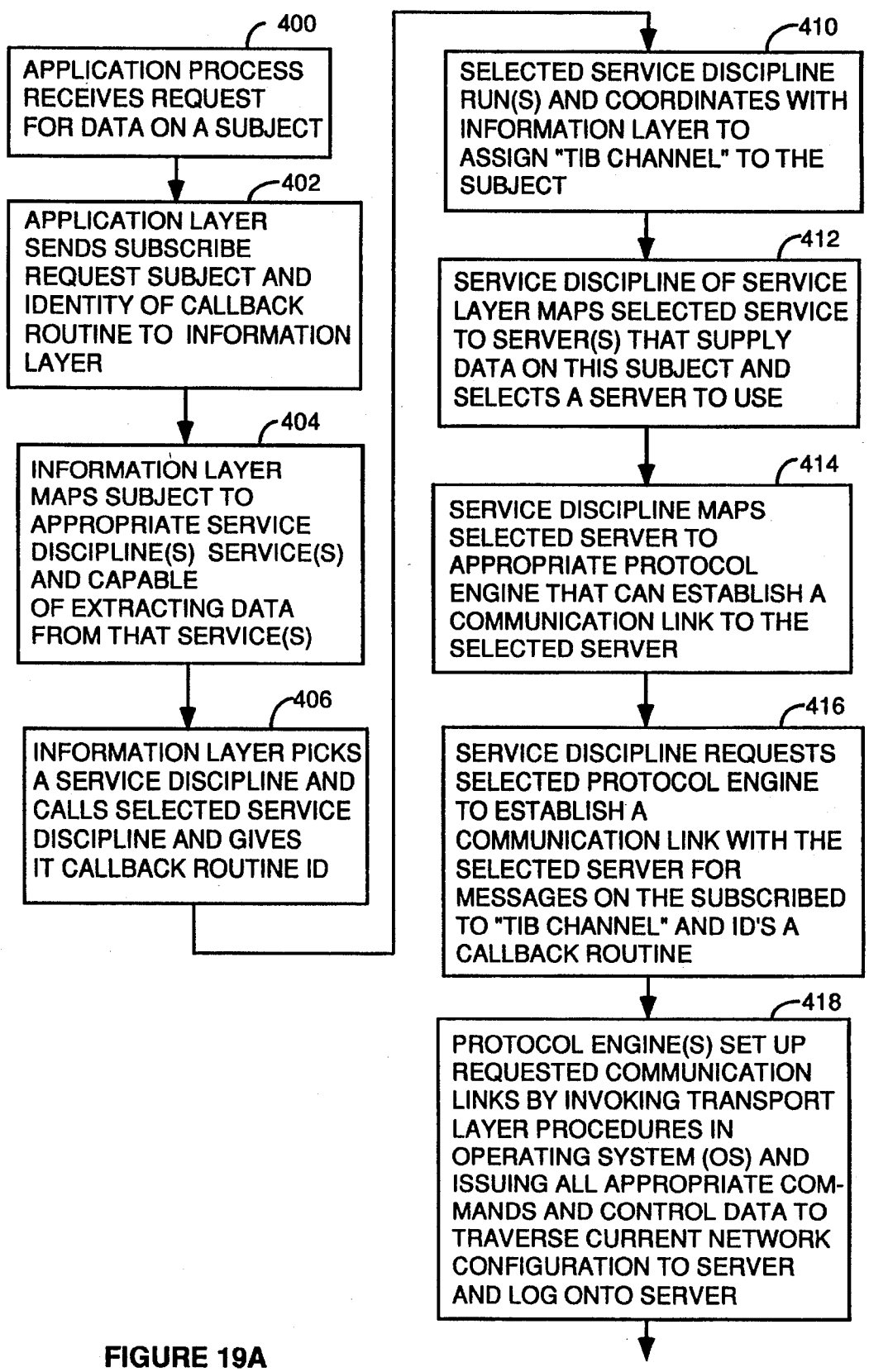
FIG. 19, comprised of FIGS. 19A and 19B, is a flow diagram of the process which occurs, inter alia, at the three layers of the software of the invention where a subscribe request is sent to a service.
Figure 19:
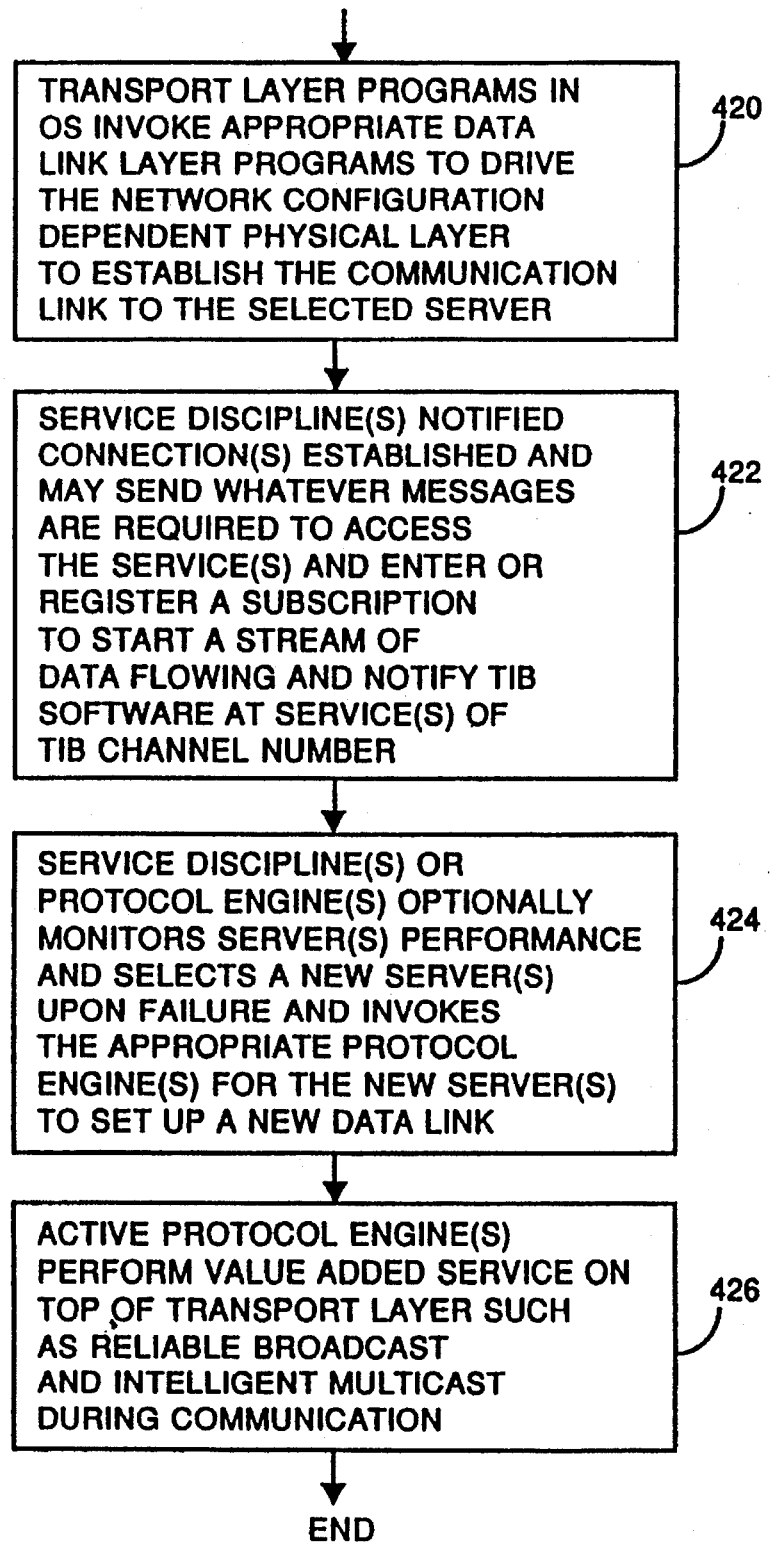

Referring to FIG. 19, which is comprised of FIGS. 19A and 19B, there is shown a flow chart for the process carried out, inter alia, at each of the 3 layers on the subscriber process side for entering a subscription on a particular subject and receiving data on the subject. Step 400 represents the process of receiving a request from a user for data on a particular subject. This request could come from another process, another machine or from the operating system in some embodiments. For purposes of this example assume that the request comes to application 1 in FIG. 17 from a user.

Application 1 (on the application layer or layer 1 of the ISO Model) then sends a "subscribe request" to information layer 342 in FIG. 17. This process is represented by step 402 in FIG. 19A. This subscribe request is entered by calling the appropriate library program in the linked library of programs which includes the TIB-INFO interface. This subroutine call passes the subject on which data is requested and a pointer to the callback routine in the requesting process that the TIB-INFO library program on the information layer is to call when messages are received on this subject.

The information layer 342 encapsulates a subject-to-service discipline mapping function which provides architectural decoupling of the requesting process as that term is defined in the glossary herein. Referring to steps 404 and 406 in FIG. 19A and to FIG. 17, the input to the information layer is the subject and the output is a call to a service discipline on the service layer 344 in FIG. 17. The information layer includes the TIB-INFO interface and all library programs of the linked communications library 30A in FIG. 15 involved with subject-to-service mapping. The information layer maps the subject to the service or services which provide data on this subject as symbolized by step 404 and then maps this service or services to one or more service disciplines that encapsulate communication protocols to communicate with these services. This information layer then coordinates with the service discipline to assign a "TIB channel" as symbolized by step 410.

A "TIB channel" is like an "attention: Frank Jones" line on the address of a letter. This TIB channel data is used to route the message to the process which requested data on whatever subject is assigned to that TIB channel. Each subject is assigned a TIB channel when a subscription is entered. There is a subscription list that correlates the subscribing processes, their network addresses, the subjects subscribed to and the TIB channel numbers assigned to these subjects. Data on this list is used by the daemon to route messages received at its port address to the proper requesting process. This list is also used on the data publisher side to cause messages on particular subjects to be routed to the port address of the machine on which the requesting process is running. The communication layer of the TIB software associated with the service writes the channel number data in the headers of packets from messages on particular subjects before these packets are transmitted on the network. At the receiver side, the TIB channel data in the header causes proper routing of the packet to the requesting process. The TIB channel abstraction and the routing function it implies is performed by the DCC library portion 30A/30B in FIG. 18 which is linked to each requesting process.

Assuming there are two such services, these services are then mapped by the service disciplines on the service layer to the servers that provide these services as symbolized by step 412.

In one embodiment, the information layer selects and calls only one of the service discipline subroutines in the service layer as symbolized by step 406. The service discipline then runs and assigns a TIB channel to the subscription subject as symbolized by step 410. The call from the information layer also passes the pointer to a callback routine in the information layer to be called when messages on the subject arrive.

In alternative embodiments, the information layer may call all the service disciplines identified in the subject-to-service discipline mapping process so as to set up communication links with all the services.

In some embodiments, the names of alternative services and alternative servers are passed to the selected service discipline or directly to the distributed communication layer by the information layer for use in setting up alternate communication links. This allows the distributed communication layer to set up an alternate communication link to another server in case of failure of the selected server or for simultaneous communication link setup to increase the throughput of the network. In still other embodiments, the requesting process can call the service layer directly and invoke the appropriate service discipline by doing the subject-to-service discipline mapping in the application itself. The data regarding alternate services and servers can be passed by calling a library subroutine in the DCC library of block 30A/30B in FIG. 18 which runs and stores the data regarding the alternates.

In alternative embodiments, the information layer may assign the TIB channel to each subject or the service layer may assign the TIB channel acting alone without coordinating with the information layer. Step 410 represents the embodiments where the service discipline assigns the TIB channel number by coordinating with the information layer. Messages sent by data provider processes will have the assigned subject channel data included as part of their header information.

TIB channels are used by the communication layer (DCC) for filtering and routing purposes. That is, the daemon 30B in FIG. 15 and protocol engines 30B in FIG. 18 know when a message arrives at the daemon's port address having particular TIB channel data in the header that there are outstanding subscriptions for data on this subject. The daemon process knows the channels for which there are outstanding subscriptions because this information is sent to the communication layer by the service layer. The daemon 30B stores data received from the service discipline regarding all TIB channels having open subscriptions. The daemon then sends any message on a subject having an open subscription to processes at that port address which have subscribed to messages on that subject. The daemon does not know what the subject is but it does know there is a match between TIB channels having open subscriptions and subjects of some of the incoming messages.

Each node coupled to the computer network of FIG. 17 such as host 300 has one network interface card and one port address. This port address may be assigned a "logical channel" in some networks for multiplexing of the network card by multiple processes running simultaneously on the same host. These port addresses may sometimes hereafter also be referred to as network addresses. How data gets back and forth between network addresses is the responsibility of the communication layers such as layer 352 in FIG. 17 which invokes the transport layer, network layer, data link layer and physical layer functionalities of the operating systems 370 and 372, network interface cards (not shown) and other circuits on the network itself such as might be found in gateway 306 and WAN 308.

The service layer, information layer and communication layer are layers which are "on top" of the ISO model layers, i.e., they perform services not performed on any layer of the ISO model or they perform "value added" services as an adjunct to services performed on an ISO model layer.

The purpose of the service layer is, among other things, to provide service decoupling as that term is defined in the glossary herein. Service decoupling frees the application of the need to know the details of how to communicate which services. To perform this function, the service layer includes a program or function to map the selected service to all servers that provide this service and pick one (step 412 in FIG. 19). The service layer then maps the selected server to a protocol engine that encapsulates the communication procedures or protocols necessary to traverse the network, i.e., set up a data link regardless of the path that needs to be followed through the network to get to this server, and communicate with the selected server regardless of what type of machine it is, what type of network and network card it is coupled to and what operating system this server runs. This process is symbolized by step 414.

In alternative embodiments, the application or subscribing process may call the protocol engine directly by having done its own subject based addressing and encapsulating its own communication protocol. In other alternative embodiments, the service layer will select all the servers supplying a service and request the communication layer to set up data links with all of them simultaneously to increase the throughput of the network or to use one server and switch to another upon failure of the selected server.

Normally all services that provide a selected service are assumed to use the same communication protocol so a single service discipline can communicate with them all. However, if different instances of the same services or different services providing data on the same subjects use different communication protocols, the teachings of the invention contemplate subclasses of service disciplines. This means that the information layer will call a generic service discipline which contains code which can be shared by all subclasses of this service discipline to do common functions such as subscribe or cancel which are done the same way on all servers that provide this service. The generic service discipline will then map the subscription request to one or more of the different servers that provide the service. The service discipline(s) code which encapsulates the communication procedure peculiar to the selected server(s) is then called and runs to finish the process of setting up the subscription data stream with the selected server(s).

The output of the service layer is a request to the communication layer to the effect, "set up a communication link by whatever means you deem most appropriate with the following server and services on the following subject channel." The service layer also sends a pointer to the service layer callback routine which will handle messages or packets on the requested subject. This process is symbolized by step 416. In some embodiments the network addresses of all servers that run service processes supplying data on the requested subject are passed to a DCC library program which stores them for use in providing a reliable communication link by providing failure recovery in case the selected server crashes.

Step 418 represents the process where the selected protocol engine sets up the requested data link by invoking selected functions of the transport layer protocols encapsulated in the operating system. These protocols invoke other communication protocols on the network, data link and physical layers so as to set up the requested data link and log onto the service as symbolized by step 420. The service layer service discipline usually then sends a message to the service notifying it of the subscription and the TIB channel assigned to this TIB as symbolized by step 422. The subject channel is noted by the information service and/or communication layer of the TIB interface software linked to the service. This allows the TIB channel data to be added to the packet headers of transmitted packets on the subject of interest. This subscription message starts the flow of data in some embodiments, while in other embodiments, the flow of data starts when the data link to the server is first established.

In some embodiments, a single subscription may necessitate calling multiple services, so the information layer may map the subject to multiple service disciplines. These in turn map the request to multiple protocol engines which simultaneously set up data links to the multiple services.

In some alternative embodiments, the service disciplines talk directly to the transport layer and encapsulate the protocols necessary to communicate on the current network configuration. In these embodiments, the service layer may filter incoming messages by subject before calling the callback routine in the information layer.

On small networks, an alternate embodiment is to broadcast subscription requests to particular subjects on the network. Services coupled to the network listen to these broadcasts and send messages on the subjects of interest to the port addresses identified in the broadcasts. These messages are then directed by the DCC layer at the port address to the requesting process in the manner described elsewhere herein.

In alternative embodiments, the service layer also performs other functions such as: regulating access to certain services; session management in the traditional sense of the session layer of the ISO model; replication management of replicated services and servers; failure/recovery management in case of failure of a service; distribution management; load balancing to prevent one server or service from being inequitably loaded with data requests when other services/servers can fill the need; or, security functions such as providing secure, encoded communications with a server. Of particular importance among these alternate embodiments are the embodiments which encapsulate service recovery schemes on the service layer. In these embodiments, when a server goes down, a recovery scheme to obtain the same data elsewhere encapsulated in the appropriate service discipline is run to re-establish a new data link to an alternate server as symbolized by step 424.

In the preferred embodiment, the service discipline assigns the TIB channel to the subject and picks the protocol engine to use in terms of the characteristics of the server and the service to be accessed and the network and network protocol to be used, and in light of the degree of reliability necessary.

The daemon 30B in FIGS. 15 and 18 can include many different protocol engines, each of which has different characteristics. For example there may be a protocol engine for point-to-point communication between nodes having Novell network interface cards and using the Novell protocol and a protocol engine for point-to-point communications between nodes using the TCP and UDP protocols and associated network interface cards. There may also be a protocol engine for communication with high speed data publishers using reliable broadcast, and a protocol engine for either point-to-point or reliable broadcast communication using the Intelligent Multicast™ protocol. There can be as many protocol engines as there are options for communication protocols, types of servers and services and reliability options, and more can be added at any time.

Further, some of the service disciplines may be procedures for communicating with other processes on the same machine such as the operating system or another application or directly with a user through a terminal. More service disciplines can be added at any time to communicate with new sources of information.

A service discipline, when it receives a subscription request may open a specific TIB channel for that subject or allow any arbitrary TIB channel to be used.

The selected service discipline or disciplines pick the protocol engine that has the right characteristics to efficiently communicate with the selected service by calling a DCC library program. The DCC library program updates the subscription list with the new subscription and channel data and sends a message to the selected protocol engine via shared memory or some other interprocess transfer mechanism. If the host is not multitasking, the daemon will be caused to run by an interrupt generated by the DCC library program. The message to the selected protocol engine will be as previously described and will include the identity of the selected server. The protocol engine will map the identity of this server to the network address of the server and carry out the communication protocol encapsulated within the selected protocol engine to set up the data link. Some of these protocols are value added protocols to, for example, increase the reliability of generic transport layer broadcast protocols or to do intelligent multicasting. These value added protocols will be detailed below. This step is symbolized by step 426.

The distributed communication layers 352 and 360, function to provide configuration decoupling. This eliminates the need for the requesting process to know how to do various communication protocols such as TCP, UDP, broadcast etc and to have code therein which can implement these protocols. The protocol engines implement various communication protocols and the DCC library implements the notion of TIB channels and performs routing and filtering by subject matter based upon the TIB channel data in the packet headers of incoming packets. The protocol engine for communicating using the UDP protocol also does message disassembly into packets on the service or transmit side and packet reassembly into complete messages on the subscribing process or receive side. This is a value added service since the UDP transport protocol does not include these disassembly and reassembly functions. The TCP transport protocol includes these message disassembly and packet reassembly functions so the protocol engine that invokes this transport layer function need not supply these type value added services.

In some embodiments of the invention, the UDP protocol engine adds sequence numbers and data regarding how many packets comprise each complete message to the packet headers. This allows the daemon or DCC library of the receiving process TIB communication layer to check the integrity of the message received to insure that all packets have been received.

As data packets come in from the network, they are passed up through the DCC library, service layer and information layer to the subscribing process. The service layer in some embodiments may filter the incoming messages by subject matter instead of having this filtering done by the daemon or the DCC library as in other embodiments. In still other embodiments, the filtering by subject matter is done by the information layer.

In some embodiments, the service layer also performs data formatting by calling programs in the TIB FORMS interface 231 in FIG. 15 or the TIB Forms Library 32 in FIG. 1.

In some embodiments, the subject based addressing is done by collecting all the information a subscribing process could ever want in a gigantic data base and organizing the data base by subject matter with updates as data changes. The service layer would then comprise routines to map the subject request to data base access protocols to extract data from the proper areas of the data base. The communication layer in such embodiments maps incoming update data to update protocols to update the appropriate date in the data base.

The preferred embodiment implements the more powerful notion of allowing the data sources to be distributed. This allows new servers and services to be coupled to the system without causing havoc or obsolescence with all the existing application software. The use of the information, service and communication layers of the TIB software according to the teachings of the invention provides a very flexible way of decoupling the application software from the ever changing network below it.

In the preferred embodiment, the filtering by subject matter for point-to-point protocols is done by the TIB software on the transmit side. Note that in FIG. 17, the servers 310, 312 and 316 are decoupled from the network by TIB interface software symbolized by the blocks marked "TIB IF". Terminal 320 is also decoupled in the same manner and can be a service for manual entry of data by the user. Specifically, this filtering is done by the information layer bound to the service which is publishing the data. For a service that is using the broadcast transport protocol, the TIB communication layer at the network addresses receiving the broadcast would filter out all messages except those having subjects matching open subscriptions by comparing the TIB channel data to the channel data for open subscriptions listed in the subscription table based upon subscription data generated by the information layer and TIB channel data generated by the service layer. Note that where a service simply broadcasts data, the service discipline for accessing that service can be as simple as "listen for data arriving at the following network address and filter out the messages on other than the subscribed subject." The service discipline would then format the data properly by invoking the proper function in the TIB Forms Library and pass the data through the information layer to the requesting process.

The use of the communication layer allows all the network configuration parameters to be outside the applications and subject to revision by the system administrator or otherwise when the network configuration changes. This insulates the application software from the network interface and provides a functionality similar to and incorporating at least all the functionality of the ISO Model network layer.

Note also that in some embodiments, the functionality of the information, service and communication layers could also be easily implemented in hardware rather than the software of the preferred embodiment. The service and communication layers implement most of the functionality the ISO Model Network, Data Link and Physical layers plus more.

In some embodiments, the distributed communication layer only receives a general request from the service layer to set up a data link and decides on its own which is the most efficient protocol to use. For example, the DCC may receive 5 separate subscriptions for the same information. The DCC may elect on its own to set up 5 separate data links or bundle the requests, set up one data link and distribute the arriving message by interprocess transfers to each of the 5 requesting processes. In other embodiments, the DCC may act on its own to decide which protocol to use, but may accept things from the service layer such as, "I want this fast" or "I want this reliable". In the latter case, the communication layer may elect to send two subscriptions for the same information to two different services or may set up two different links to the same service by different network paths.

In the preferred embodiment, the DCC library portion of the communication library serves the sole function of determining how to best get data from one network address to another. All replication management and failure recovery protocols are encapsulated in the service disciplines.

Figure 20:
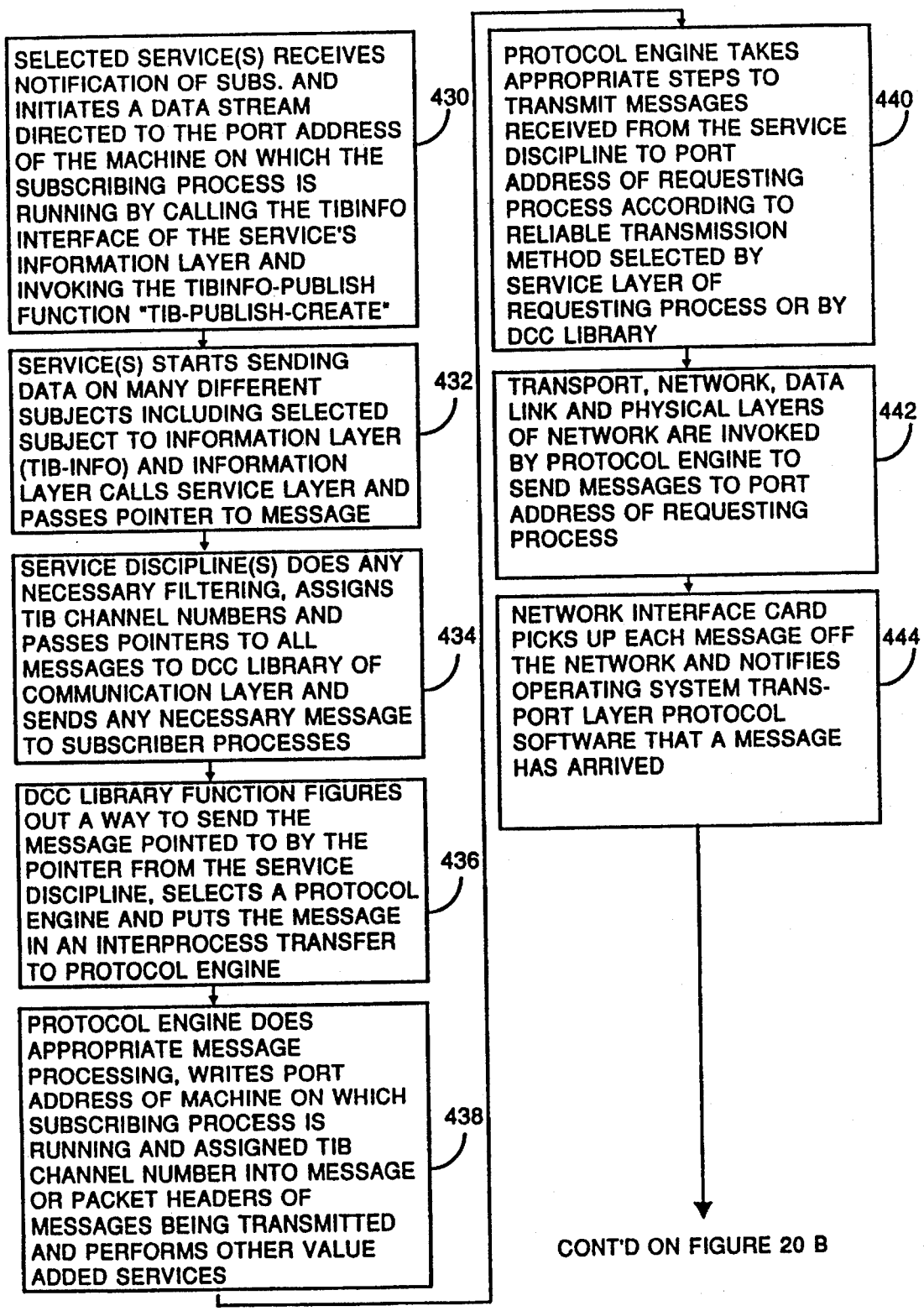
FIG. 20, comprised of FIGS. 20A and 20B, is a flow chart of the process which occurs at, inter alia, the three layers of the software interface according to the teachings of the invention when a subscribe request is received at a data producing process and messages flow back to the subscribing process.
Figure 20B:
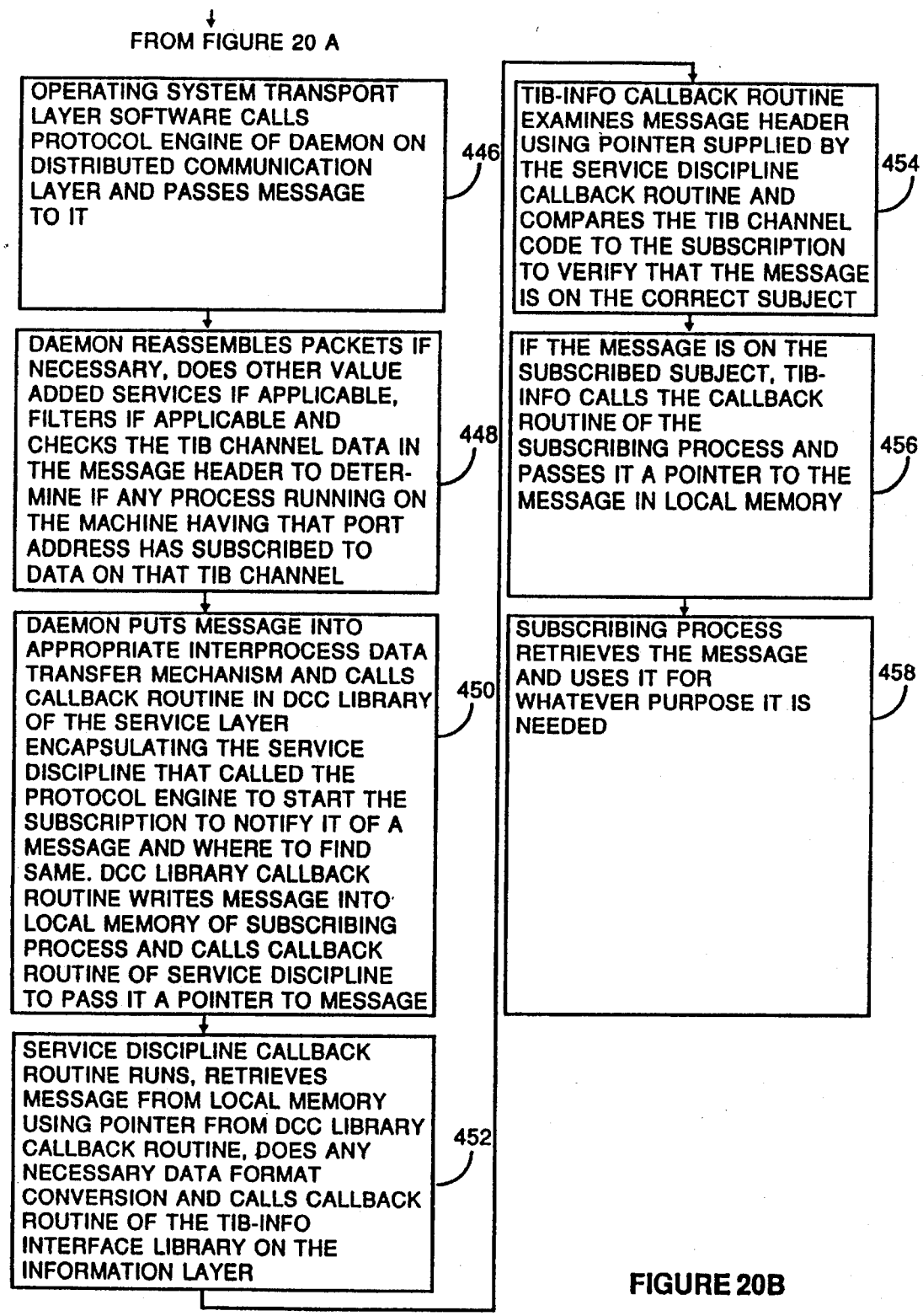

Referring to FIG. 20, comprised of FIGS. 20A and 20B, there is shown a flow chart for the processing involved at the three layers of the TIB software on the transmit side in creating a subscription data stream at a publishing process or service and sending it down through the TIB software and across the network to the subscribing process.

Step 430 represents the process whereby the selected service receives a message from a subscribing process and initiates a data stream. Each service such as the Quotron service running on server 310 in FIG. 17 and the Marketfeed 2000 and Telerate services running on servers 312 and 316, respectively, are decoupled from the network by a version of the three layer architecture TIB software according to the teachings of the invention. This is symbolized by the blocks marked TIB IF in these server boxes which stands for TIB interface software.

The TIB interface for each service decouples the service from any requirement to have functionality capable of supporting filtering or subject based addressing. Thus, if a service is designed to broadcast all equity prices on the American Stock Exchange and Over-the-Counter market, but the subscription is simply for IBM equity prices, the service responds as it always has and need not have a function to filter out only IBM equity prices. The service discipline for this type service will be adapted to filter out all messages except IBM equity prices in response to such a subscription request.

Another service like Telerate which publishes many different pages organized by subject matter, e.g., a page on Government T-Bill rates, a page on long term corporate bond rates etc., will be able to accept a subscription for only a specific page and may be able to accept special commands to cause the service to publish only specific columns on a particular page. In such a case, the service layer bound to such a service will include a service discipline which receives subscription requests by subject and filters messages from a broadcast that do not pertain to a subject having an open subscription.

Step 430 also represents the process of the service calling the TIB-Publish function of the information layer TIB-INFO library and starting the flow of data toward the subscribing process. The service need not have any of its own ability to filter by subject. The subscription request it receives is in the "native tongue" that this service understands because it is formatted and sequenced in that fashion by the service discipline of the subscribing process.

Most of the filtering by subject matter is done by the service disciplines, but where this filtering is done depends upon the type of service. Some services publish only one type of data so everything such a publisher puts out is of interest to the subscribing process. For example, assume that the service accessed is the real time clock 371 in FIG. 17 which puts out only the current time, and assume that the subject of the subscription is "give me the time of day". In such a case, the service discipline is very simple and no filtering need occur. Such a service discipline can be simply a protocol to determine how to communicate the data to the requesting process and what TIB channel to assign to it.

The fact that the service starts sending data in whatever manner such a service normally sends data is symbolized by step 432. Thus, if the service is Telerate, it can send the page image and updates for any one of a number of different pages and it understands a subscription for only one of its many pages whereas the Quotron service would not understand a subscription for only IBM equity prices. The various service disciplines of the service layer provide, inter alia, the necessary functionality which the service does not have.

Step 432 assumes a service which broadcasts messages on many different subjects and a subscription request for only one or a few of those subjects. In other hypothetical examples, the service may publish only the requested information such as a particular telerate page. In the Telerate case, the subscription request may specify that only a particular page and particular columns of that page be sent and may request the page image by a point-to-point communication protocol using a dedicated TIB channel.

Step 434 represents the response processing of the service layer to the subscription request and the stream of data that results. In step 434, the service discipline does any necessary filtering by subject matter and assigns the TIB channel number. The filtering by subject matter is generally done by the service discipline on the data producer side of an exchange only when the producer produces vastly more data than is called for by the subscription such as in the case of a high speed, broadcast producer. In such a case, the extraneous data could overwhelm the network. The TIB channel numbers are assigned by the service discipline in step 434 but they are not actually added to the headers for the packets until the message reaches the communication layer. In some alternative embodiments, the TIB channel numbers may be written to the packet headers by the service discipline.

The TIB channel number assignment is done by the service discipline based upon the type of service, subscription and communication protocol being used. Where a broadcast protocol is being used, the service discipline in some embodiments will, in step 434, simply assign different TIB channel numbers to different subjects and send a message to subscribers listed in a subscription table maintained by the service layer on the information layer. The message will say simply, for example, "For updates on IBM equity prices, monitor TIB channel 100". Note that the TIB channel data is used by the TIB software of the receiving host solely to route messages to the proper subscribing processes. TIB channels have nothing to do with logical channels, network routing or other network, data link or physical layer issues.

In other embodiments, in the broadcast protocol situation, the service discipline will consult a subscription list and filter out all messages on subjects other than subjects with open subscriptions. For those subjects, a TIB channels will be assigned and a message will be sent to the TIB software linked to the subscribing processes as to what TIB channels to listen to for messages to be routed to their client processes.

In the case of point-to-point protocols, the subscription requests usually contain the TIB channel numbers assigned to the subject by the service discipline selected by the information layer linked to the subscribing process. In such a case, step 434 represents the process of assigning the TIB channel number received in the subscription request to messages emitted from the service. In a typical case of a subscription to a Telerate page which specifies that a particular TIB channel is to be used in case a point-to-point protocol is selected, the service discipline will send the page image by selecting a point-to-point protocol engine. The service discipline will also send a message acknowledging the subscription and advising the TIB software of the subscribing process to listen to a particular TIB channel for broadcasts of updates to the page. The receiving TIB software then opens a TIB broadcast channel for the updates.

Step 436 represents the processes performed by the DCC library after the service discipline calls it. The DCC library's sole function in the preferred embodiment is to determine the best way to send a message to any particular network address where the service discipline or the subscription request does not specify the communication protocol to be used. In some embodiments, the DCC library of the communication layer will accept suggestions from the service layer or subscription request as to how to send the message but may select a different protocol if this is deemed to be more efficient.

Further, the DCC library may change the communication protocol being used based upon changing conditions such as number of subscribers. For example, an Intelligent Multicast protocol may be chosen (described in more detail below). In this protocol, a point-to-point protocol is used when the number of subscribers is below a certain cutoff number (programmable by the system administrator) but switchover to a broadcast protocol automatically occurs when the number of subscribers rises above the cutoff number. In the preferred embodiment "high-water" and "low-water" marks are used as will be described below. In other embodiments, any cost function may be used to set the switchover point based upon cost and efficiency of sending multiple point-to-point messages as opposed to a single broadcast message.

Step 436 also represents the process of retrieving the message from local memory of the service and putting it into an interprocess transfer process to send it to the protocol engine/daemon 30B in FIG. 15.

Step 438 represents the processes carried out by the protocol engine of the service to transmit the messages to the subscribing processes. If the transport protocol in use is UDP, the protocol engine, in some embodiments, will do a packetizing function. This is the process of breaking down the message into packets and adding header data on the transmit side and reassembling the packets in the proper order on the receiver side. The TCP transport protocol does its own packetizing, so protocol engines that invoke this transport layer need not packetize. Nonpacket protocol engines also exist for other types of transport protocols.

The protocol engine also writes the port address of the machine running the subscribing process in the message headers and may perform other value added services. These other services include reliable broadcast and Intelligent Multicasting. Reliable broadcast services will be explained below, but basically this service provides functionality that does not exist in current broadcast communication protocols to increase reliability.

The protocol engines have a standard programmers interface through which they communicate with the transport layer routines in the operating system. The steps taken by the protocol engine to invoke the transport layer functionality so as to drive the network, data-link and physical layer protocols in such a manner so as to deliver the messages to the subscribing processes are not critical to the invention are symbolized by steps 440 and 442. Exactly what these steps are cannot be specified here because they are highly dependent upon the structure, configuration and protocol of the network as well as the interface to the transport layer. When any of these change, the protocol engines may have to be changed to accommodate the change to the network. This, however, prevents the need to change the application software thereby providing configuration decoupling.

After the message traverses the network, it is picked up by the network interface card having the port address shared by the subscribing process. This process is symbolized by step 444. The network card buffers the message and generates an interrupt to the transport layer routine which handles incoming messages.

Step 446 represents the process where the transport layer software calls the appropriate protocol engine of the daemon 30B in the communication layer such as layers 352 or 360 in FIG. 17. The incoming message or packet will be passed to the appropriate protocol engine by some interprocess transfer mechanism such as shared memory. In the preferred embodiment, the daemon is an ongoing process running in background on a multitasking machine. In other embodiments, the daemon is interrupt driven and only runs when a message has been received or is to be transmitted. Step 446 also represents the packet reassembly process for TCP or other transport layer protocols where packet reassembly is done by the transport layer.

Step 448 represents the processes performed by the protocol engine in the daemon to process and route the incoming message.

For UDP transport layer protocol engines, packet reassembly is done. This of course implies that the protocol engine of the data producer process added sequence numbers to the packet headers so that they can be reassembled in the proper order. Other value added services may then be performed such as checking all the sequence numbers against data which indicates the sequence numbers which should have arrived to determine if all the packets have been received. In some embodiments, the data as to the sequence numbers to expect is written into fields dedicated to this purpose in the packet headers. In other embodiments, this data is sent in a separate message.

If any packets are missing a message will be sent automatically by the receiving communication layer back to the communication layer of the data producer process to request retransmission of any lost or garbled packets. This of course implies that the communication layer for the data process stores all packets in memory and retains them for possible retransmission until an acknowledgment message is received indicating that all packets have been successfully received.

Step 448 also symbolizes the main function performed by the communication layer daemon/protocol engine in receiving messages. That function is routing the messages to the appropriate subscribing process according to the TIB channel information in the header. The protocol engine checks the TIB channel number in the header against the current subscription list sent to it by the service discipline. The subscription list will include pointers to the appropriate service discipline callback routine and subscribing process for messages assigned to any particular TIB channel. The protocol engine also filters messages by TIB channel number for embodiments in which messages reach the TIB software coupled to the subscribing process which do not pertain to the subject of an open subscription. This may also be done at the service layer, or information layer but it is most efficient to do it at the communication layer.

The protocol engine will then put the message in the appropriate interprocess transfer mechanism, usually shared memory or a Unix™ pipe, and generate an interrupt to the DCC library as symbolized by step 450. This interrupt will vector processing to the appropriate DCC library callback routine which was identified to the protocol engine by the DCC library when the subscription on this TIB channel and subject was opened. The DCC library routine so invoked is linked to and part of the subscribing process which initiated the subscription. The DCC library callback routine then retrieves the message from the interprocess transfer mechanism and stores it in local memory of the subscribing process. The DCC library callback routine then generates an interrupt to the service layer and passes it a pointer to the message.

Step 452 represents the process performed by the service layer on incoming messages. The interrupt from the DCC library causes to run the service discipline callback routine identified in the original subscribe message passed by the service layer through the DCC library. The callback routine will, in some embodiments, do any data format conversions necessary and may, in other embodiments do subject matter filtering. Then, the service discipline generates an interrupt to the information layer which cause the callback routine of the information layer to run. The interrupt contains a pointer to the message.

Step 454 symbolizes processing of incoming messages by the information layer. In some embodiments, the service layer does not guarantee that all messages reaching the information layer exactly match the subject for which data was requested. In these embodiments, step 454 symbolizes the process of comparing the TIB channel code to the subject of the subscription to make sure they match. If the data has been previously filtered by subject, step 454 can be eliminated.

Step 456 symbolizes the process of generating an interrupt to the callback routine of the subscribing process if there is a match on subject. If not, no interrupt is generated and monitoring for new messages continues by the daemon while all the interrupt driven processes terminate and release their computer resources until the next interrupt.

Step 458 symbolizes the process of use of the message data for whatever purpose the subscribing process originally sought this data.

Reliable broadcast is one of the value added services that the communication layer can use to supplement and improve the communication protocols of the transport layer. Traditional broadcast protocols offered by prior art transport layers are not reliable. For example, if there is noise on the line which corrupts or destroys a packet or message or if the network interface card overflows the buffer, packets or entire messages can be lost and the processes listening for the message never gets the message, or they get an incomplete or garbled message. There is no acknowledge function in traditional broadcast, so if some of the processes miss the message or get incomplete or garbled messages, the transmitting process never finds out. This can happen for one in every hundred packets or for one in ten packet Traditional prior art transport layer broadcast protocols do not include functionality, i.e., program code, to distribute a broadcast message received at the network address of the host to multiple processes running on that host.

Figure 21:
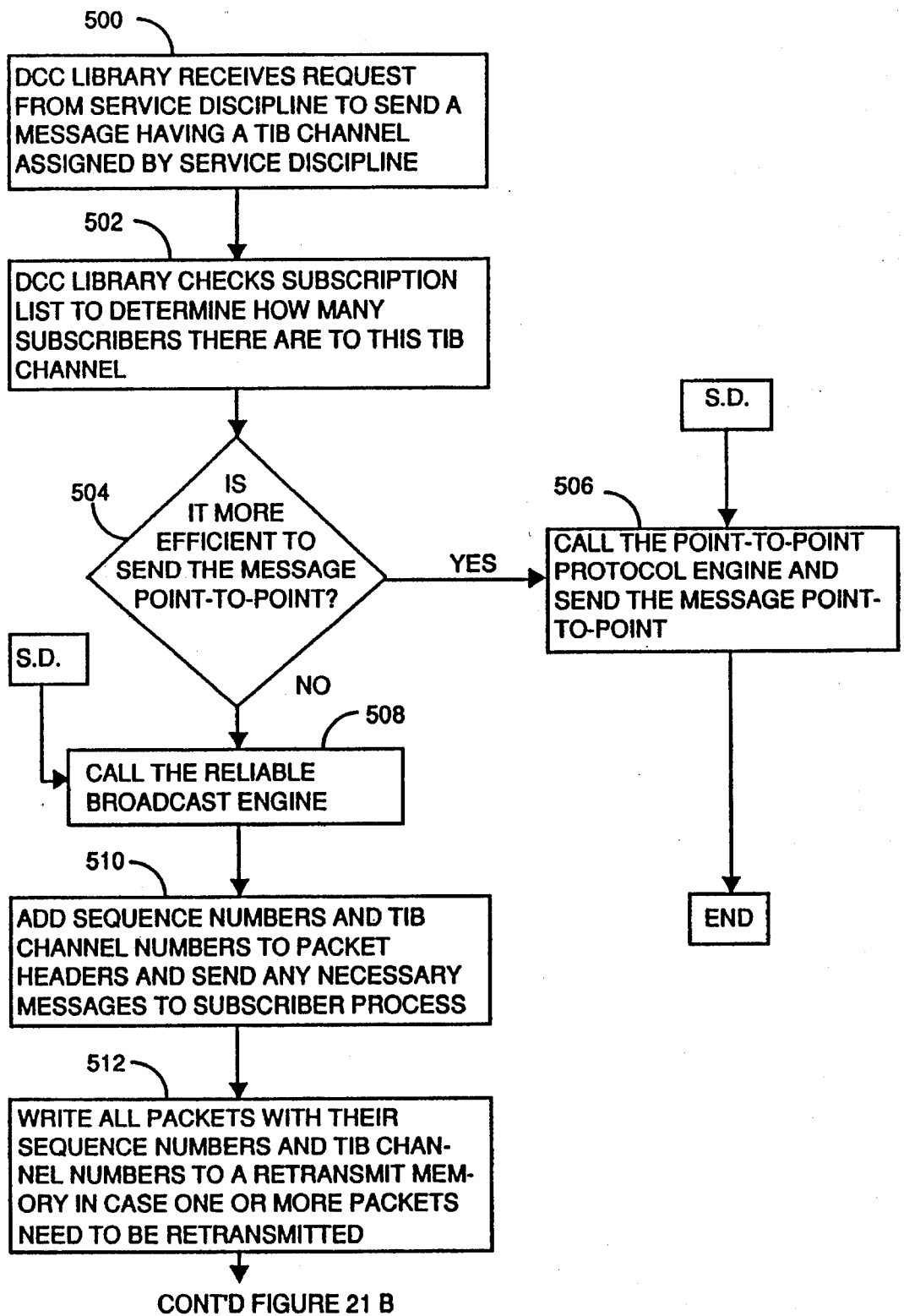
FIG. 21, comprised of FIGS. 21A and 21B, is a flow chart of the process which occurs at the DCC library and in the reliable broadcast protocol engine when messages are sent by the reliable broadcast protocol.
Figure 21:
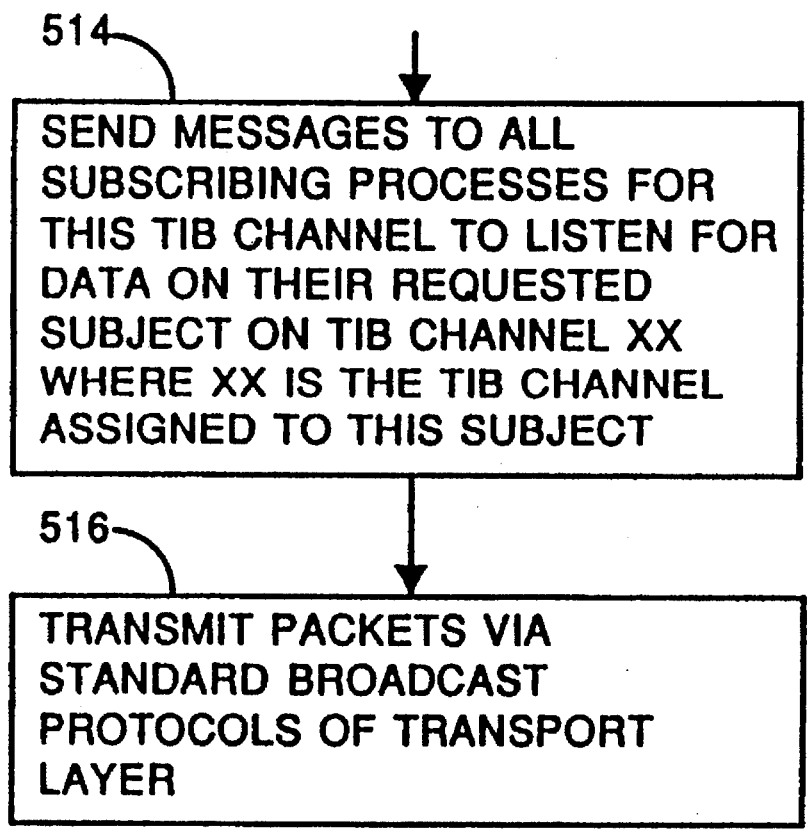

The communication layer according to the teachings of the invention includes at least one protocol engine to implement reliable broadcast protocols which are built on top and supplement the functionality of the prior art transport layer broadcast protocols. Referring to FIG. 21 comprised of FIGS. 21A and 21B, there is shown a flow chart for one embodiment of a reliable broadcast protocol implemented by the communication layer. Step 500 represents the process where the DCC library receives a request from a service discipline to send a message having a particular TIB channel assigned thereto. In some embodiments, this request may also include a request or a command to send the message by the reliable broadcast protocol. In embodiments where the reliable broadcast protocol is mandated by the service discipline, the service discipline includes a function to determine the number of subscribers to a particular channel and determine the cost of sending the same message many times to all the port addresses of all subscribers versus the cost of sending the message once by broadcast with messages to all subscribers to listen to TIB channel XX (whatever TIB channel number was assigned to this subject) for data on the subjects they are interested in. In the embodiment illustrated in FIG. 21, this cost determination function is included within the communication layer DCC library functionality.

Step 502 represents this cost determination process as performed by the DCC library. The particular program of the DCC library which implements this function, checks the subscription list and counts the number of subscribers to the TIB channel assigned to this message. The cost of sending the message point-to-point to all these subscribers is then evaluated using any desired costing function. In some embodiments, the cost function may be a comparison of the number of subscribers to a predetermined cutoff number. The particular cost function used is not critical to the invention. The cost of sending the message to multiple subscribers point-to-point is that the same message must be placed repeatedly on the network by the data producing software. The cost of broadcasting a message is that all network cards pick it up and may interrupt the transport protocol program in the operating system of the host which transmits the message by interprocess transfer to the TIB daemon only to find out the message is not of interest to any client process running on that host. Computer resources are thus wasted at any such host.

Step 504 represents the process the DCC library carries out to evaluate the cost and decide to send the message either by point-to-point protocol or reliable broadcast. If it is determined that the number of subscribers to this TIB channel is small enough, the decision will be made to send the message by a point-to-point protocol. Step 506 represents the process of calling the point-to-point protocol engine and sending the message using this protocol.

If the number of subscribers is too high for efficient point-to-point transmission, the DCC library calls the reliable broadcast protocol engine as symbolized by step 508.

Step 510 represents the first step of the reliable broadcast protocol processing. The reliable broadcast protocol according to the teachings of the invention supports multiple subscribing processes running of the same host and requires that each subscribing process receive all the packets of the message without error and acknowledge receipt thereof. To insure that this is the case, sequence numbers must be added to the headers of each packet and some data must be communicated to the subscribing processes that indicate the sequence numbers that must all have been received in order to have received the entire message. In some embodiments, only the sequence numbers will be added to the packet headers and the data regarding the sequence numbers that comprise the entire message will be sent by separate message to each process having an open subscription to the TIB channel assigned to the message. In other embodiments, the sequence numbers that comprise the entire message will be added to the header of the first packet or to the headers of all the packets. The sequence numbers added to the packets are different than the sequence numbers added by packetizing functionality of the transport protocols of the operating system in TCP protocols since the TIB sequence numbers are used only to determine if all packets of a message have been received. In some embodiments, the packet sequence numbers added by the transport protocol may be used by the TIB communication layer of the subscribing processes to determine if all the packets have been received. In other embodiments of reliable broadcast protocol engines for supplementing the UDP transport layer protocol, the packetizing function of the protocol engine adds sequence numbers which can be used both for transport/network/data link/physical layer functions but also for TIB communication layer functions in verifying that all packets of a message have been received.

After the sequence numbers have been added, the packets are written to a retransmit buffer with their sequence numbers for storage in case some or all of the packets need to be retransmitted later as symbolized by step 512.

Before the messages can be sent to the various subscribing processes, the reliable broadcast protocol engine adds the TIB channel data to the header of each packet and sends a message to each subscribing process listed in the subscription table as having open subscriptions for this channel to listen for data on their requested subject on TIB channel XX where XX is the TIB channel number assigned to this subject.

Step 516 represents the process of transmitting the packets via the standard broadcast protocols of the transport layer by calling the appropriate operating system program and passing a pointer to each packet.

Figure 22:
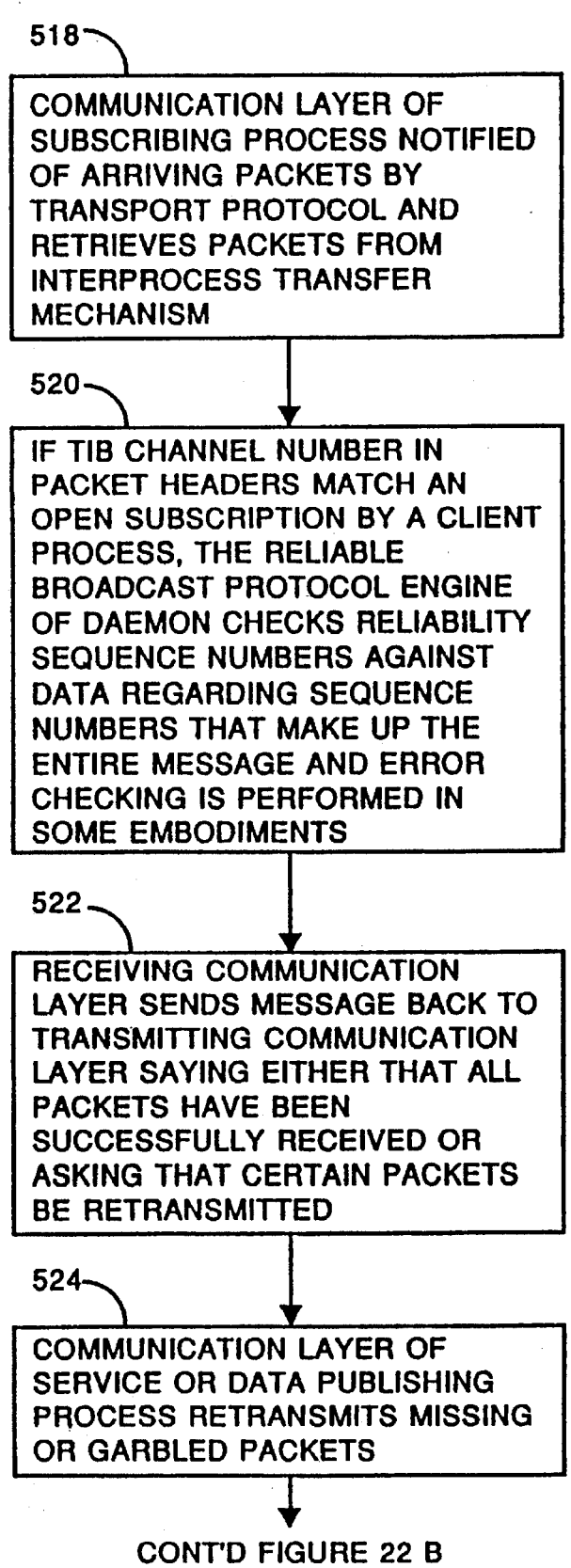
FIG. 22, comprised of FIGS. 22A and 22B, is a flow chart of processing by a reliable broadcast protocol engine on the data consumer side of the reliable broadcast transaction.
Figure 22:
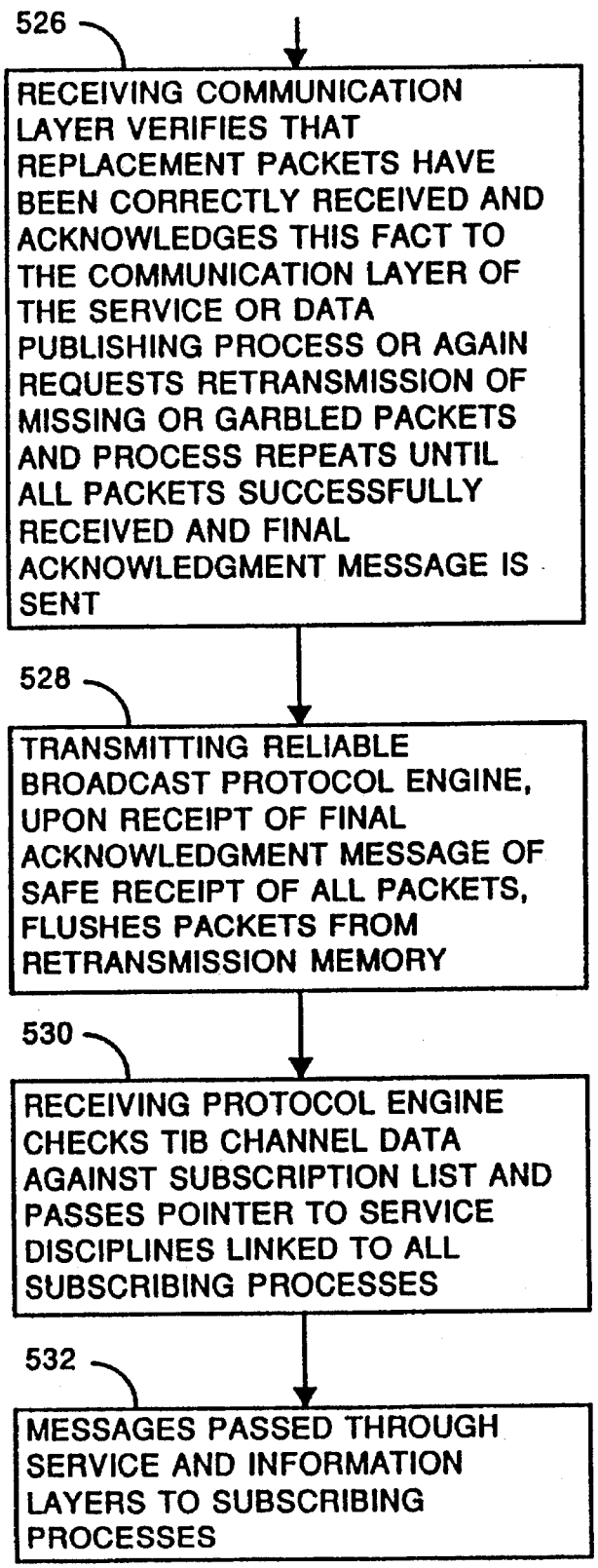

Referring to FIG. 22 comprised of FIGS. 22A and 22B, there is shown a flow chart of the processing by the communication layer of the subscribing process in the reliable broadcast protocol. The packets broadcast on the network are picked up by all network interface cards of all hosts on the network which then invoke the transport protocol software of the operating systems of the various hosts. The transport protocols then notify the daemons of the communication layers that a broadcast message has arrived and puts the packets in an interprocess transfer mechanism, usually shared memory. The daemons then retrieve the packets from the interprocess transfer mechanism as represented by step 518.

Step 520 represents the process of checking the TIB channel numbers of the incoming packets to determine if they correspond to the TIB channel of any open subscription. If they do, the reliability sequence numbers are checked by the reliable broadcast protocol engine against the data indicating which packets and corresponding sequence numbers should have been received to have received a complete message. In some embodiments, especially embodiments using transport, network, data link and physical layers where error checking (ECC) is not performed at layers below the TIB interface software of the invention, error detection and correction is performed on the packets using the ECC bits appended to the packet. If errors have occurred that are beyond the range of correction given the number of ECC bits present, the packet is marked as garbled.

After determining which packets are missing or garbled, if any, the receiving protocol engine then sends a message back to the communication layer of the service or publishing process. This message will either acknowledge that all packets have been received without a problem or will request that certain packets be retransmitted. This is symbolized by step 522.

Step 524 represents the process of retransmission of the missing or garbled packets by the communication layer of the data producing process or service. In some embodiments, the missing or garbled packets will be sent point-to-point to only the subscribing process that did not get them. In other embodiments, the missing or garbled packets are broadcast to nodes with notification messages being sent to the subscribing processes that need them to listen on TIB channel XX where XX is the TIB channel on which the packets will be broadcast. The phrase "listen to channel XX" as it is used here has nothing to do with the actual transmission frequency, timeslot or other physical characteristic of the transmission. It merely means that the missing or garbled packets will be appearing on the network shortly and will have TIB channel XX routing information in their header data.

Step 526 represents the process of checking by the receiving communication layer that the replacement packets have been properly received similar to the processing of step 520. If they have, the receiving communication layer acknowledges this fact to the communication layer of the service. If not, a request for retransmission of the missing or garbled packets is again sent to the communication layer of the transmitting process, retransmission ensues and the whole process repeats until all packets have been successfully received. The final acknowledge message from the receiving communication layer to the transmitting communication layer that all packets have been successfully received causes the reliable broadcast protocol engine of the transmitting communication layer to flush all the packets from the retransmission memory as symbolized by step 528.

Step 530 represents the routing process where the reliable broadcast protocol engine checks the TIB channel data against the subscription list to determine which client processes have requested data assigned to this TIB channel. Once this information is known, the protocol engine passes a pointer to the message to all service disciplines which have entered subscriptions for data on this TIB channel. In some embodiments, the protocol engine will place a copy of the message in a separate interprocess transfer mechanism for every subscribing process. In other embodiments, shared memory will be the interprocess transfer mechanism and a pointer to the same copy of the message will be sent to all subscribing processes. The subscribing processes will then arbitrate for access to the message in the information layer or the service layer.

Step 532 represents the processes previously described of passing the message up through the service and information layers to the subscribing process by successive interrupts causing to run the callback routines designated when the subscription was entered. Filtering by subject matter may also occur in some embodiments at the service layer and/or the information layer to guarantee a match to the subscribed subject.

Figure 23:
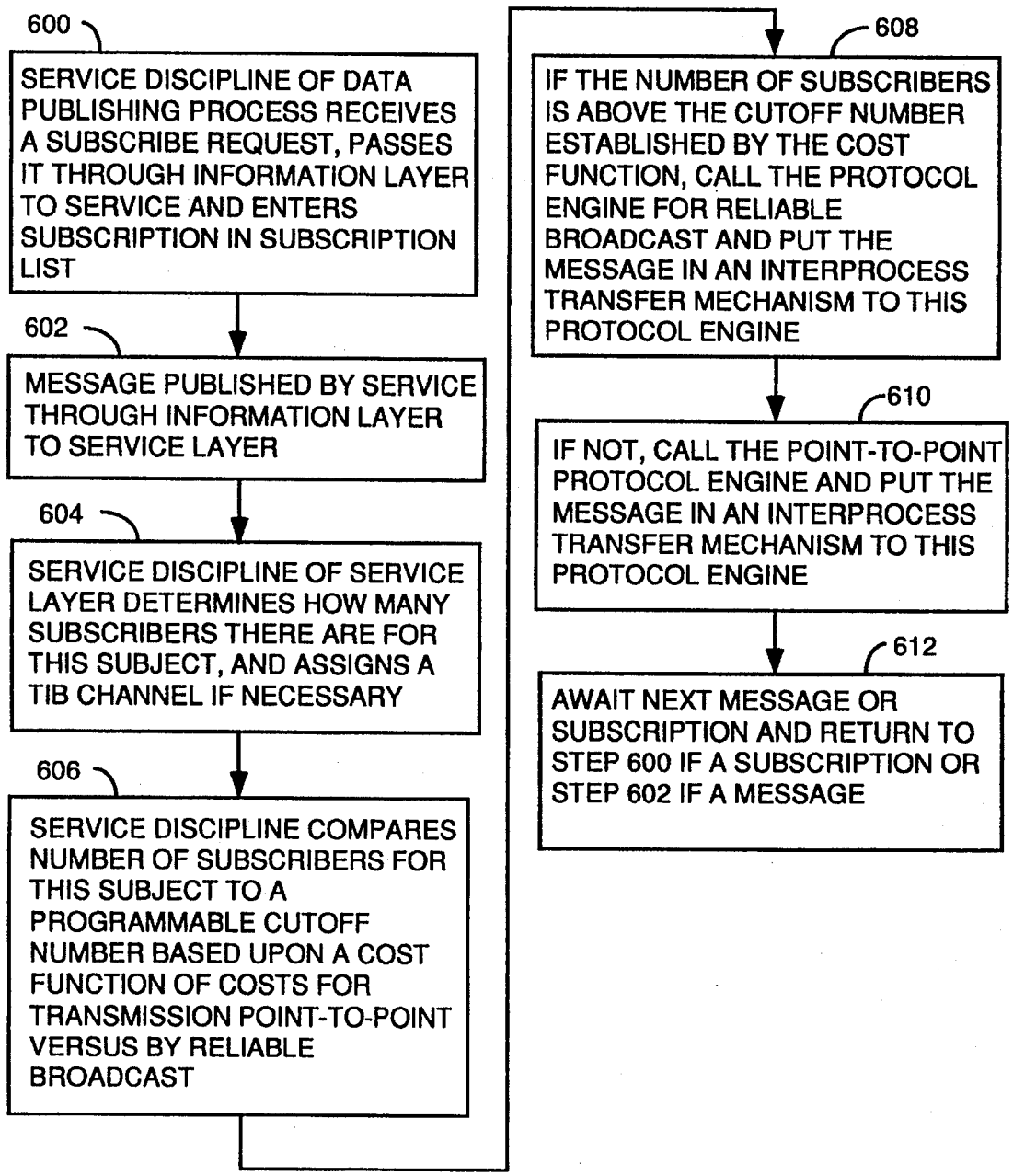
FIG. 23 is a flow chart of the processing which occurs in the service discipline to implement the Intelligent Multicast™ protocol.

FIG. 23 is a flow chart of processing to transmit data by the Intelligent Multicast communication protocol. This protocol uses either point-to-point or reliable broadcast protocols for each message depending upon the subject matter and how many subscriptions are open on this subject. The choice of protocol is automatically made for each message depending upon how many subscribing processes/network addresses there are for the message at the time the message is published. If the number of subscribers for a subject changes sufficiently, the transmission protocol may change automatically.

Step 600 represents the process of receiving a subscription request at the service layer of the data publishing process, passing this subscription along to the subscribing process and making an entry for a new subscription in the subscription table.

In step 602, a message is published by the service through the information layer to the service layer. The subject of the message may or may not be on the subject for which the new subscription was just entered. The service layer examines the subject data forwarded by the information layer about the message and coordinates with the information layer to assign a TIB channel to the subject if the TIB channel was already assigned by the service and information layers of the subscribing process as symbolized by step 604.

In step 606, the service discipline compares the number of subscribers for the subject of the message to a programmable cutoff number which is based upon the cost of transmission point-to-point versus the cost of transmission by reliable broadcast. The programmable cutoff number can be set and altered by the system administrator and is based upon any desired cost function, the nature of which is not critical to the invention. In the preferred embodiment, the cost function is comprised of a high water mark and a low water mark. If the number of subscribers is above the high water mark, the message will be sent by reliable broadcast. If the number of subscribers to this subject then subsequently falls below the low water mark, subsequent messages will be sent point-to-point. In some embodiments, the cost function can be an automatic learning program that listens to the network and subscription requests and makes the decision based upon latency time or some other criteria of network efficiency.

Step 608 represents the process of calling the reliable broadcast protocol engine if the number of subscribers is greater than the cutoff number. The message is then put in an interprocess transfer mechanism directed to this protocol engine.

If the number of subscribers is below the cutoff number, point-to-point transmission is more efficient so the service discipline calls the point-to-point protocol engine and puts the message into an interprocess transfer mechanism directed to this protocol engine as symbolized by step 610.

Step 612 represents the process of waiting for the next message or subscription and returning to step 600 if a subscription is received and to step 602 if another message is received.

In summary the concept of the invention is to use software layers to decouple applications from the complexities of the computer network communication art in ways that applications have never before been decoupled. For example, it is believed that the subject based addressing decoupling provided by the information layer is new especially when coupled with the service decoupling provided by the service layer. It is believed to be new to have extensible service and communication layers that can be easily modified by the addition of new service disciplines and protocol engines to provide service and configuration decoupling under changing conditions such as new network topologies and the addition of new or changed services and/or servers to the network. It is new to have a service layer that includes many different service disciplines designed to encapsulate many varied communication protocols. For example, these service disciplines can handle communication with everything from services like Telerate to operating system programs, other processes on other machines (or even the same machine or another part of the same process even) to a user sitting at a terminal. Further, the abilities of this service layer to implement failure monitoring and recovery, distribution and replication management, and security/access control services is new.

Further, it is new to have the configuration decoupling and value added services of the communication layer.

The teachings of the invention contemplate use of any one of these layers or any combination of the three in the various embodiments which together define a class or genus of software programs the species of which implement the specific functions or combinations thereof defined herein.

Appendix A, which can be found in the application file, is a complete source code listing for the TIB™ communication interface software according to the teachings of the invention in the C programming language. Included are all library programs, all interfaces and all layers of the software for both data publishing and data consuming processes. Also included are all utility programs necessary to compile this software into machine readable code for a Unix™ based multitasking workstation.

There follows a more detailed specification of the various library programs and the overall structure and functioning of an embodiment of the communication interface according to the teachings of the invention.

Information Driven Architecture™, Teknekron Information Bus™, TIB™, TIBINFO™, TIBFORMS™, Subject-Based Addressing™, and RMDP™ are trademarks of Teknekron Software Systems, Inc.

CONTENTS

1. Introduction
2. Teknekron Information Bus Architecture
3. Reliable Market Data Protocol:RMDP
4. Subject-Addressed Subscription Service:TIBINFO
5. Data-exchange Component:TIBFORM
6. Appendix: 'man' Pages 1. Introduction The Teknekron Information Bus™ software (TIB™ component) is a distributed software component designed to facilitate the exchange of data among applications executing in a real-time, distributed environment. It is built on top of industry standard communication protocols (TCP/IP) and data-exchange standards (e.g., X.400).

The document is organized as follows. Section 2 gives an architectural overview of the TIB™. Section 3 describes the Reliable Market Data Protocol. This general purpose protocol is particularly well suited to the requirements of the page-based market data services. It is also often used for bulletin and report distribution. Section 4 describes TIB-INFO, an interface supporting Subject-based Addressing. Section 5 describes a component and its interface that supports a very flexible and extensible data-exchange standard. This component is called TIBFORMS. The Appendix contains (UNIX-like) manual pages for the core interfaces.

2. Architectural Overview

2.1 Introduction

The Teknekron Information Bus (TIB™) is comprised of two major components: the (application-oriented) data communication component and the data-exchange component. These are depicted in FIG. 2.1. In addition, a set of presentation tools and a set of support utilities have been built around these components to assist the application developer in the writing of TIB™-based applications.

The (application-oriented) data communication component implements an extensible framework for implementing high-level, communication protocol suites. Two protocol suites have been implemented that are tailored toward the needs of fault-tolerant, real-time applications that communicate via messages. Specifically, the suites implement subscription services that provide communication support for monitoring dynamically changing values over a network. Subscription services implement a communication paradigm well suited to distributing market data from, for example, Quotron or Telerate.

One of the protocol suites supports a traditional service-oriented cooperative processing model. The other protocol suite directly supports a novel information-oriented, cooperative processing model by implementing subject-based addressing. Using this addressing scheme, applications can request information by subject through a general purpose interface. Subject-based addressing allowing information consumers to be decoupled from information producers; thereby, increasing the modularity and extensibility of the system.

The application-oriented protocol suites are built on top of a common set of communication facilities called the distributed communications component, depicted as a sublayer in FIG. 2.1. In addition to providing reliable communications protocols, this layer provides location transparency and network independence to its clients.

The layer is built on top of standard transport-layer protocols (e.g., TCP/IP) and is capable of supporting multiple transport protocols. The data-exchange component implements a powerful way of representing and transmitting data. All data is encapsulated within self-describing data objects, called TIB™-forms or, more commonly, simply forms. Since TIB™ forms are self-describing, they admit the implementation of generic tools for data manipulation and display. Such tools include communication tools for sending forms between processes in a machine-independent format. Since a self-describing form can be extended without adversely impacting the applications using it, forms greatly facilitate modular application development.

The two major components of TIB™ were designed so that applications programmers can use them independently or together. For example, forms are not only useful for communicating applications that share data, but also for non-communicating applications that desire to use the generic tools and modular programming techniques supported by forms. Such applications, of course, do not need the communication services of the TIB™. Similarly, applications using subject-based addressing, for example, need not transmit forms, but instead can transmit any data structure. Note that the implementation of the communication component does use forms, but it does not require applications to use them.

2.2 System Model

The system model supported by the TIB™ consists of users, user groups, networks, services, service instances (or servers), and subjects.

The concept of a user, representing a human "end-user," is common to most systems. A user is identified by a user-id. The TIB™ user-id is normally the same as the user-id (or logon id) supported by the underlying operating system, but it need not be.

Each user is a member of a exactly one group. The intention is that group should be composed of users with similar service access patterns and access rights. Access rights to a service or system object are grantable at the level of users and at the level of groups. The system administrator is responsible for assigning users to groups.

A network is a logical concept defined by the underlying transport layer and is supported by the TIB™. An application can send or receive across any of the networks that its host machine is attached to. It also supports all gateways functions and internetwork routing that is supported by the underlying transport-layer protocols.

Since the lowest layer of the TIB™ communication component supports multiple networks, application-oriented protocols can be written that transparently switchover from one network to another in the event of a network failure.

A service represents a meaningful set of functions that are exported by an application for use by its clients. Examples of services are an historical news retrieval service, a Quotron datafeed, and a trade ticket router. An application will typically export only one service, although it can export many different services.

A service instance is an application process capable of providing the given service. (Sometimes these are called "server processes.") For a given service, several instances may be concurrently providing it, so as to improve performance or to provide fault tolerance. Application-oriented communication protocols in the TIB™ can implement the notion of a "fault-tolerant" service by providing automatic switchover from a failed service instance to an operational one providing the same service.

Networks, services, and servers are traditional components of a system model and are implemented in one fashion or another in most distributed systems. On the other hand, the notion of a subject is novel to the information model implemented by the TIB™.

The subject space consists of a hierarchical set of subject categories. The current release of the TIB™ supports a 4 level hierarchy, as illustrated by the following well formed subject: "equity.ibm.composite.trade." The TIB™ itself enforces no policy as to the interpretation of the various subject categories. Instead, the applications have the freedom and responsibility to establish conventions on use and interpretation of subject categories.

Each subject is typically associated with one or more services producing data about that subject. The subject-based protocol suites of the TIB™ are responsible for translating an application's request for data on a subject into communication connections to one or more service instances providing information on that subject.

A set of subject categories is referred to as a subject domain. The TIB™ provides support for multiple subject domains. This facility is useful, for example, when migrating from one domain to another domain. Each domain can define domain-specific subject encoding functions for efficiently representing subjects in message headers.

2.3 Process Architecture

The communication component of the TIB™ is a truly distributed system with its functions being split between a frontend TIB™/communication library, which is linked with each application, and a backend TIB™/communication daemon process, for which there is typically one per host processor. This process architecture is depicted FIG. 2.2. Note that this functional split between TIB™ library and TIB™ daemon is completely transparent to the application. In fact, the application is completely unaware of the existence of the TIB™ daemon, with the exception of certain failure return codes.

The TIB™ daemons cooperate among themselves to ensure reliable, efficient communication between machines. For subject-addressed data, they assist in its efficient transmission by providing low-level system support for filtering messages by subject.

The TIB™/communication library performs numerous functions associated with each of the application-oriented communication suites. For example, the library translates subjects into efficient message headers that are more compact and easier to check than ASCII subject values. It also maps service requests into requests targeted for particular service instances, and monitors the status of those instances.

The data-exchange component of TIB™ is implemented as a library, called the TIB™/form library, that is linked with the application. This library provides all of the core functions of the data-exchange component and can be linked independently of the TIB™/communication library. The TIB™/form library does not require the TIB™/communication daemon.

2.4 Communication Component

The TIB™ Communication Component consists of 3 subcomponents: the lower-level distributed communication component (DCC), and two high-level application-oriented communication protocol suites-the Market Data Subscription Service (MDSS), and the Subject-Addressed Subscription Service (SASS).

The high-level protocol suites are tailored around a communication paradigm known as a subscription. In this paradigm, a data consumer "subscribes" to a service or subject, and in return receives a continuous stream of data about the service or subject until the consumer explicitly terminates the subscription (or a failure occurs). A subscription paradigm is well suited for realtime applications that monitor dynamically changing values, such as a stock's price. In contrast, the more traditional request/reply communication paradigm is ill-suited for such realtime applications, since it requires data consumers to "poll" data providers to learn of changes.

The principal difference between the two high-level protocols is that the MDSS is service-oriented and SASS is subject-oriented. Hence, for example, MDSS supports the sending of operations and messages to services, in addition to supporting subscriptions; whereas, SASS supports no similar functionality.

2.4.3. Market Data Subscription Service

2.4.1.1 Overview

MDSS allows data consumers to receive a continuous stream of data, tolerant of failures of individual data sources. This protocol suite provides mechanisms for administering load balancing and entitlement policies.

Two properties distinguish the MDSS protocols from the typical client/server protocols (e.g. RPC). First, subscriptions are explicitly supported, whereby changes to requested values are automatically propagated to clients. Second, clients request (or subscribe) to a service, as opposed to a server, and it is the responsibility of the MDSS component to forward the client's request to an available server. The MDSS is then responsible for monitoring the server connection and reestablishing if it fails, using a different server, if necessary.

The MDSS has been designed to meet the following important objectives:

(1) Fault tolerance. By supporting automatic switchover between redundant services, by explicitly supporting dual (or triple) networks, and by utilizing the fault-tolerant transmission protocols implemented in the DCC (such as the "reliable broadcast protocols"), the MDSS ensures the integrity of a subscription against all single point failures. An inopportune failure may temporarily disrupt a subscription, but the MDSS is designed to detect failures in a timely fashion and to quickly search for an alternative communication path and/or server. Recovery is automatic as well.

(2) Load balancing. The MDSS attempts to balance the load across all operational servers for a service. It also rebalances the load when a server fails or recovers. In addition, the MDSS supports server assignment policies that attempts to optimize the utilization of scarce resources such as "slots" in a page cache or bandwidth across an external communication line.

(3) Network efficiency. The MDSS supports the intelligent multicast protocol implemented in the DCC. This protocol attempts to optimize the limited resources of both network bandwidth and processor I/O bandwidth by providing automatic, dynamic switchover from point-to-point communication protocols to broadcast protocols. For example, the protocol may provide point-to-point distribution of Telerate page 8 to the first five subscribers and then switch all subscribers to broadcast distribution when the sixth subscriber appears.

(4) High-level communication interface. The MDSS implements a simple, easy-to-use application development interface that mask most of the complexities of programming a distributed system, including locating servers, establishing communication connections, reacting to failures and recoveries, and load balancing.

2.4.1.2 Functionality

The MDSS supports the following core functions:

get MDSS establishes a fault-tolerant connection to a server for the specified service and "gets" (i.e., retrieves) the current value of the specified page or data element. The connection is subscription based so that updates to the specified page are automatically forwarded.

halt "halt" the subscription to the specified service.

derive sends a modifier to the server that could potentially change the subscription.

The MDSS protocol has been high-optimized to support page-oriented market data feed, and this focus has been reflected in the choice of function names. However, the protocol suite itself is quite general and supports the distribution of any type of data. Consequently, the protocol suite is useful and is being used in other contexts (e.g., data distribution in an electronic billboard). 2.4.2 Subject-Addressed Subscription Service (SASS) 2.4.2.1 Overview The SASS is a sophisticated protocol suite providing application developers a very high-level communications interface that fully supports the information-oriented, cooperative processing model. This is achieved through the use of subject-based addressing.

The basic idea behind subject-based addressing and the SASS's implementation of it is straightforward. Whenever an application requires a piece of data, especially, data that represents a dynamically changing value (e.g. a stock price), the application simply subscribes to that data by specifying the appropriate subject. For example, in order to receive all trade tickets on IBM, an application may issue the following subscription: "trade_ticket.IBM". Once an application has subscribed to a particular subject, it is the responsibility of the SASS to choose one or more service instances providing information on that subject. The SASS then makes the appropriate communications connections and (optionally) notifies the service instances providing the information.

The SASS has been designed to meet several important objectives:

(1) Decoupling information consumers from information providers. Through the use of subject-based addressing, information consumers can request information in a way that is independent of the application producing the information. Hence, the producing application can be modified or supplanted by a new application providing the same information without affecting the consumers of the information.

(2) Efficiency. Support for filtering messages by subject is built into the low levels of the TIB™ daemon, where it can be very efficient. Also, the SASS supports filtering data at the producer side: data that is not currently of interest to any application can simply be discarded prior to placing in on the network; thereby, conserving network bandwidth and processor I/O bandwidth.

(3) High-level communication interface. The SASS interface greatly reduces the complexities of programming a distributed application in three ways. First, the consumer requests information by subject, as opposed to by server or service. Specifying information at this level is easier and more natural than at the service level. Also, it insulates the program from changes in service providers (e.g., a switch from IDN to Ticker 3 for equity prices). Second, the SASS presents all data through a simple uniform interface-a programmer needing information supplied by three services need not learn three service-specific protocols, as he would in a traditional processing model. Third, the SASS automates many of the hard or error-prone tasks, such as searching for an appropriate service instance, and establishing the correct communication connection.

2.4.2.2 Functionality

For a data consumer, the SASS provides three basic functions:

subscribe where the consumer requests information on a real-time basis on one or more subjects. The SASS components sets up any necessary communication connections to ensure that all data matching the given subject(s) will be delivered to the consumer. The consumer can specify that data be delivered either asynchronously (interrupt-driven) or synchronously. A subscription may result in the producer service instance being informed of the subscription. This occurs whenever the producer has set up a registration procedure for its service. This notification of the producer via any specified registration procedure is transparent to the consumer.

cancel which is the opposite of subscribe. The SASS component gracefully closes down any dedicated communication channels, and notifies the producer if an appropriate registration procedure exists for the service.

receive receive and "callbacks" are two different ways for applications to receive messages matching their subscriptions. Callbacks are asynchronous and support the event driven programming style-a style that is particularly well-suited for applications requiring realtime data exchange. "Receive" supports a traditional synchronous interface for message receipt.

For a data producer, the SASS provides a complementary set of functions.

Note that an application can be both a producer and a consumer with respect to the SASS, and this is not uncommon.

2.4.3 Distributed Communication Component 2.4.3.1 Overview

The Distributed Communication Component (DCC) provides communication services to higher-level TIB™ protocols, in particular, it provide several types of fault transparent protocols.

The DCC is based on several important objectives:

(1) The provision of a simple, stable, and uniform communication model. This objective offers several benefits. First, it offers increased programmer productivity by shielding developers from the complexities of a distributed environment; locating a target process, establishing communications with it, and determining when something has gone awry are all tasks best done by a capable communications infrastructure, not by the programmer. Second, it reduces development time, not only by increasing programmer productivity, but also by simplifying the integration of new features. Finally, it enhances configurability by keeping applications unaware of the physical distribution of other components. This prevents developers from building in dependencies based on a particular physical configuration. (Such dependencies would complicate subsequent reconfigurations.)

(2) Portability through encapsulation of important system structures. This objective achieves importance when migration to a new hardware or software environment becomes necessary. The effort expended in shielding applications from the specific underlying communication protocols and access methods pays off handsomely at that time. By isolating the required changes in a small portion of the system (in this case, the DCC), applications can be ported virtually unchanged, and the firm's application investment is protected.

(3) Efficiency. This is particular important in this component. To achieve this, the DCC builds on top of less costly "connectionless" transport protocols in standard protocol suites (e.g., TCP/IP and OSI). Also, the DCC has been carefully designed to avoid the most costly problem in protocols: the proliferation of data "copy" operations.

The DCC achieves these objectives by implementing a layer of services on top of the basic services provided by vendor-supplied software. Rather than re-inventing basic functions like reliable data transfer or flow-control mechanisms, the DCC concentrates on shielding applications from the idiosyncrasies of any one particular operating system. Examples include the hardware-oriented interfaces of the MS-DOS environment, or the per-process file descriptor limit of UNIX. By providing a single, unified communication tool that can be easily replicated in many hardware or software environment, the DCC fulfills the above objectives.

2.4.3.2 Functionality

The DCC implements several different transmission protocols to support the various interaction paradigms, fault-tolerance requirements, and performance requirements imposed by the high-level protocols. Two of the more interesting protocols are reliable broadcast and intelligent multicast protocols.

Standard broadcast protocols are not reliable and are unable to detect lost messages. The DCC reliable broadcast protocols ensure that all operational hosts either receive each broadcast message or detects the loss of the message. Unlike many so-called reliable broadcast protocols, lost messages are retransmitted on a limited, periodic basis.

The intelligent multicast protocol provides a reliable datastream to multiple destinations. The novel aspect of the protocol is that it can dynamically switch from point-to point transmission to broadcast transmission in order to optimize the network and processor load. The switch from point-to-point to broadcast (and vice versa) is transparent to higher-level protocols. This protocol admits the support of a much larger number of consumers than would be possible using either point-to-point or broadcast alone. The protocol is built on top of other protocols within the DCC.

Currently, all DCC protocols exchange data only in discrete units, i.e., "messages" (in contrast to many Transport protocols). The DCC guarantees that the messages originating from a single process are received in the order sent.

The DCC contains fault-tolerant message transmission protocols that support retransmission in the event of a lost message. The package guarantees "at-most-once" semantics with regards to message delivery and makes a best attempt to ensure "exactly once" semantics.

The DCC contains no exposed interfaces for use by application developers.

3. RELIABLE MARKET DATA PROTOCOL

3.1 Introduction

The Reliable Market Data Protocol (RMDP) defines a programmatic interface to the protocol suite and services comprising the Market Data Subscription Service (MDSS) TIB™ subcomponent. RMDP allows market data consumers to receive a continuous stream of data, based on a subscription request to a given service. RMDP tolerates failures of individual servers, by providing facilities to automatically reconnect to alternative servers providing the same service. All the mechanisms for detecting server failure and recovery, and for hunting for available servers are implemented in the RMDP library. Consequently, application programs can be written in a simple and naive way.

The protocol provides mechanisms for administering load balancing and entitlement policies. For example, consider a trading room with three Telerate lines. To maximize utilization of the available bandwidth of those Telerate lines, the system administrator can "assign" certain commonly used pages to particular servers, i.e., page 5 to server A, page 405 to server B, etc. Each user (or user group) would be assigned a "default" server for pages which are not explicitly preassigned. (These assignments are recorded in the TIB™ Services Directory.)

To accommodate failures, pages or users are actually assigned to prioritized list of servers. When a server experiences a hardware or software failure, RMDP hunts for and connects to the next server on the list. When a server recovers, it announces its presence to all RMDP clients, and RMDP reconnects the server's original clients to it. (Automatic reconnection avoids situations where some servers are overloaded while others are idle.) Except for status messages, failure and recovery reconnections are transparent to the application.

The MDSS protocol suite, including RMDP, is built on top of the DCC and utilizes the reliable communication protocols implemented in that component. In particular, the MDSS suite utilizes the reliable broadcast protocols and the intelligent multicast protocol provided therein. RMDP supports both LANs and wide area networks (WANs). RMDP also supports dual (or multiple) networks in a transparent fashion.

RMDP is a "service-addressed" protocol; a complementary protocol, TIBINFO, supports "subject-based addressing."

3.2 Programmatic Interface

RMDP programs are event-driven. All RMDP function calls are non-blocking: even if the call results in communication with a server, the call returns immediately. Server responses, as well as error messages, are returned at a later time through an application-supplied callback procedure.

The principal object abstraction implemented in RMDP is that of an Rstream, a "reliable stream," of data that is associated with a particular subscription to a specified service. Although, due to failures and recoveries, different servers may provide the subscription data at different times, the Rstream implements the abstraction of a single unified data stream. Except for short periods during failure or recovery reconnection, an Rstream is connected to exactly one server for the specified service. An application may open as many Rstreams as needed, subject only to available memory.

An Rstream is bidirectional—in particular, the RMDP client can send control commands and messages to the connected server over the Rstream. These commands and messages may spur responses or error messages from the server, and in one case, a command causes a "derived" subscription to be generated. Regardless of cause, all data and error messages (whether remotely or locally generated) are delivered to the client via the appropriate Rstream.

The RMDP interface is a narrow interface consisting of just six functions, which are described below.

```
void
rmdp_SetProp(property, value)
rmdp_prop_t property;
caddr_t value;
```

Used to set the values of RMDP properties. These calls must be made before the call to rmdp_Init(). Required properties are marked with ? in the list below. Other properties are optional. The properties currently used are:

*RMDP_CALLBACK

Pointer to the callback function. See the description of callback below.

RMDP_SERVICE_MAP

The name of Services Directory to be used in lieu of the standard directory.

RMDP_GROUP

The user group used to determine the appropriate server list. Should be prefixed with '+'. Default is group is "+" (i.e. the null group).

RMDP_RETRY_TIME

The number of seconds that the client will wait between successive retries to the same server, e.g., in the case of cache full." Default is 30.

RMDP_QUIET_TIME

The time in seconds that a stream may be "quiet" before the protocol assumes that the server has died and initiates a "hunt" for a different server. Default is 75.

RMDP_VERIFY_TIME

The time in seconds between successive pings of the server by the client. Default is 60.

RMDP_APP_NAME

The name of the application i.e. "telerate", "reuters" etc. If this property is set, then the relevant entries from the Service Directory will be cached.

```
void
rmdp_Init( );
```

This initializes the internal data structures and must be called prior to any calls to rmdp_Get().

```
RStream
rmdp_Get(service, request, host)
char *service, *request, *host;
```

This is used to get a stream of data for a particular 'service' and subscription 'request'. For the standard market data services, the request will be the name of a page (e.g., "5", "AANN"). If 'host' is non-NULL, then the RMDP will only use the server on the given host. In this case, no reconnection to alternative servers will be attempted upon a server failure. If 'host' is NULL, then RMDP will consult the TIB™ Services Directory to identify a list of server alternatives for the request. 'rstream' is an opaque value that is used to refer to the stream. All data passed to the application's callback function will be identified by this value.

An error is indicated by RStream rstream == NULL.

```
RStream
rmdp_Derive(rstream, op)
RStream   old;
char      *op;
```

This generates a new subscription and, hence, a new 'Rstream' from an existing subscription. 'command' is a string sent to the server, where it is interpreted to determine the specific derivation.

The standard market data servers understand the following commands: "n" for next-page, "p" for previous-page and "t XXXX" for time-page.

Derived streams cannot be recovered in the case of server failure. If successful, an Rstream is returned, otherwise NULL is returned.

```
void
rmdp_Message(rstream, msg)
RStream   rstream;
char      *msg;
```

Sends the string 'msg' to the server used by 'rstream'. The messages are passed directly to the server, and are not in any way affected by the state of the stream. The messages are understood by the standard market data servers include "rr <PAGE NAME>" to rerequest a page, and "q a" to request the server's network address. Some messages induce a response from the server (such as queries). In this case, the response will be delivered to all streams that are connected to the server.

```
void
rmdp_Halt(rstream)
RStream   rstream;
```

This gracefully halts the 'rstream'.

```
void
callback(rstream, msgtype, msg, act, err)
RStream   rstream;
mdp_msg_t   msgtype;
char        *msg;
mdp_act_t   act;
mdp_err_t   err;
```

This is the callback function which was registered with rmdp_SetProp(RMDP_CALLBACK, callback). 'rstream' is the stream to which the message pertains. 'msgtype' can be any of the values defined below (see "RMDP Message Type"). 'msg' is a string which may contain vt100 compatible escape sequences, as in MDSS. (It will NOT however be prefaced with an ^[[ . . . E. That role is assumed by the parameter 'msgtype'.)

The last two parameters are only meaningful if 'msgtype' is MDP_MSG_STATUS. 'act' can be any of the values found in "RMDP Action Type" (see below), but special action is necessary only if act =='MDP_ACT_CANCEL'. The latter indicates that the stream is being canceled and is no longer valid. It is up to the application to take appropriate action. In either case, 'err' can be any of the values found in "RMDP Error Type" (see below), and provides a description of the status.

RMDP Message Types (mdp_msg_t)

The message types are listed below. These types are defined in the underlying (unreliable) Market Data Protocol (MDP) and are exported to the RMDP.

```
MDP_MSG_BAD = -1
MDP_MSG_DATA = 0       Page data message.
MDP_MSG_STATUS = 1     Status/error message.
MDP_MSG_OOB = 2        "Out of Band" message, e.g.,
                       time stamp.
MDP_MSG_QUERY = 3      Query result.
```

RMDP Action Type (mdp_act_t)

The action types are listed below. These action types inform the RMDP clients of activities occurring in the lower level protocols. Generally speaking, they are "for your information only" messages, and do not require additional actions by the RMDP client. The exception is the "MDP_ACT_CANCEL" action, for which there is no recovery. These types are defined in the underlying (unreliable) Market Data Protocol (MDP) and are exported to the RMDP.

```
MDP_ACT_OK = 0         No unusual action required.
MDP_ACT_CANCEL = 1     The request cannot be
                       serviced, cancel the stream,
                       do not attempt to reconnect.
                       (E.g., invalid page name.)
```

| | |
|---|---|
| MDP_ACT_CONN_FIRST = 2 | The server is closing the stream; the first server in the alternatives list is being tried. (E.g., the server is shedding "extra" clients for load balancing.) |
| MDP_ACT_CONN_NEXT = 3 | The server is closing the stream; the next server in the alternatives list is being tried. (E.g., the server's line to host fails.) |
| MDP_ACT_LATER = 4 | Server cannot service request at this time; will resubmit request later, or try a different server. (E.g., Cache full.) |
| MDP_ACT_RETRY = 5 | Request is being retried immediately. |

RMDP Error Types (mdp_err_t)

Description of error, for logging or reporting to end user. These types are defined in the underlying (unreliable) Market Data Protocol (MDP) and are exported to the RMDP.

```
MDP_ERR_OK = 0
MDP_ERR_LOW = 1
MDP_ERR_QUIET = 2
MDP_ERR_INVAL = 3
MDP_ERR_RESRC = 4
MDP_ERR_INTERNAL = 5
MDP_ERR_DELAY = 6
MDP_ERR_SYS = 7
MDP_ERR_COMM = 8
```

4. Subject-Addressed Subscription Service: TIBINFO

4.1 Introduction

TIBINFO defines a programmatic interface to the protocols and services comprising the TIB™ subcomponent providing Subject-Addressed Subscription Services (SASS). The TIBINFO interface consists of libraries: TIBINFO_CONSUME for data consumers, and TIBINFO_PUBLISH for data providers. An application includes one library or the other or both depending on whether it is a consumer or provider or both. An application can simultaneously be a consumer and a producer.

Through its support of Subject-Based Addressing, TIBINFO supports a information-oriented model of cooperative processing by providing a method for consumers to request information in a way that is independent of the service (or services) producing the information. Consequently, services can be modified or replaced by alternate services providing equivalent information without impacting the information consumers. This decoupling of information consumers from information providers permits a higher degree of modularization and flexibility than that permitted by traditional service-oriented processing models.

For Subject-Based Addressing to be useful in a real time environment, it must be efficiently implemented. With this objective in mind, support for Subject-Based Addressing has been built into the low levels of the Distributed Communications Component. In particular, the filtering of messages by subject is performed within the TIB™ daemon itself.

4.2 Concepts

Subject

The subject space is hierarchical. Currently, a 4-level hierarchy is supported of the following format:

major[.minor[.qualifier1[.qualifier2]]]

where '[' and ']' are metacharacters that delimit an optional component. major, minor, qualifier1 and qualifier2 are called subject identifiers. A subject identifier is a string consisting of the printable ascii characters excluding '.', '?', and '*'. A subject identifier can be an empty string, in which case it will match with any subject identifier in that position. The complete subject, including the '.' separators, cannot exceed 32 characters. Subjects are case sensitive.

Some example of valid subjects are listed below: The comments refer to the interpretation of subjects on the consume side. (The publish-side semantics are slightly different.)

| | |
|---|---|
| equity.ibm.composite.quote | |
| equity..composite.quote | matches any minor subject |
| equity.ibm | matches any qualifier1 and qualifier2 |
| equity.ibm. | same as above |

Within the TIBINFO and the SASS, subjects are not interpreted. Hence, applications are free to establish conventions on the subject space. It should be noted that SASS components first attempt to match the major and minor subject identifiers first. As a consequence, although applications can establish the convention that "equity.ibm" and "..equity.ibm" are equivalent subjects, subscriptions to "equity.ibm" will be more efficiently processed.

Stream

A stream is an abstraction for grouping subscriptions. The subscriptions on a stream share a common set of properties, notably the same message handler (i.e., "callback" routine) and the same error handler. All subscriptions on a stream can be "canceled" simply by destroying the stream.

A stream imposes little overhead on the system. They can therefore be freely created and destroyed.

Protocol Engines, Service Disciplines, and Subject Mappers

The SASS and DCC components implement many support services in order to provide the functionality in TIBINFO. These include subject mappers for efficiently handling subjects, service disciplines for controlling the interaction with servers, and protocol engines for implementing reliable communication protocols. TIBINFO provides an interface for setting properties of these components. Hence, by setting the appropriate properties, one can specify, for example, the behavior of the subject mapper through the TIBINFO interface. Since these properties are in configuration files, configuration and site dependent parameters can be altered for the above components by the system administrator through TIBINFO.

In some embodiments, the property definitions for TIBINFO and for the underlying components may be augmented to support enhancements. This use of properties yields flexibility and extensibility within the confines of a stable functional interface.

4.3 Description

The TIBINFO interface is high-level and easy to use. Published data can be a form or an uninterpreted byte string. Messages can be received either in a synchronous fashion, or in an asynchronous fashion that is suitable for event-driven programming. The following functions are sufficient to write sophisticated consumers using event-driven programming.

Tib_stream *tib_consume_create(property-list, TIB_EOP)

Creates a TIBINFO stream that supports multiple subscriptions via the "subscribe" function. The property_list is a (possibly empty) list of property value pairs, as illustrated by

```
tib_consume_create(TIB_PROP_MSGHANDLER,
my_handler,
TIB_PROP_ERRHANDLER, my_err_handler, TIB_EOP);
```

Valid properties are defined below. TIB_EOP is a literal signaling the end of the property list.

```
void tib_destroy(stream)
Tib_stream    *stream;
```

Reclaims resources used by the specified stream.

```
Tib_errorcode tib_subscribe(stream, subject, clientdata)
Tib_stream    *stream;
Tib_subject   *subject;
caddr_t       clientdata;
```

Informs the TIB™ software that the client application is interested in messages having the indicated subject. If stream has an associated "message-handler," then it will be called whenever a message satisfying the subscription arrives. Qualifying messages are delivered on a first-in/first-out basis. The value of clientdata is returned in every message satisfying the subscription subject. Note that multiple subscriptions to the same subject on the same stream are undefined.

```
void tib_cancel(stream)
Tib_stream  *stream;
```

Cancels the client application's subscription to the specified subject.

```
void my_message_handler(stream,msg)
Tib_stream    *stream;
Tib_message   *message;
```

This is the "callback" function that was registered with the stream. Forms are returned unpacked. The function can reference the entire message structure through the macros described below.

The following functions are sufficient to write producers. Two publishing functions are provided to support the different data types that can be transmitted through the TIB-INFO interface.

tib_publish_create(property-list, TIB_EOP)

Is used to create an TIBINFO stream for publishing records. The property_list is a (possibly empty) list of property-value pairs, as illustrated by

```
tib_publish_create(TIB_PROP_ERRHANDLER,my_handler,TIB_EOP)
;
```

Valid properties are defined below. TIB_EOP is a constant signaling the end of the property list.

```
tib_destroy(stream)
Tib_stream   stream;
```

Reclaims resources used by the specified stream.

```
Tib_errorcode tib_publish_form(stream, subject, form)
Tib_stream    *stream;
Tib_subject   *subject;
Form          form;
```

Accepts a single, unpacked form, packs it, and publishes it.

```
Tib_errorcode tib_publish_buffer(stream, subject, length, form)
Tib_stream    *stream;
Tib_subject   *subject;
short         length;
Form          form;
```

Accepts a byte buffer of specified length and publishes it.

The remaining functions are control functions that apply to both the consume and the publish side.

void Tib_batch()

This may be used prior to initiating multiple subscriptions. It informs the TIB™ library that it can delay acting on the subscriptions until a tib_unbatch is seen. This allows the TIB™ library to attempt to optimize the execution of requests. Note that no guarantees are made about the ordering or timing of "hatched" request. In particular, (i) requests may be executed prior to the receipt of the tib_unbatch function, and (ii) the effects of changing properties in the middle of a hatched sequence of requests is undefined. Batch and unbatch requests may be nested. (Note that the use of tib_batch is completely optional and it does not change the semantics of a correct program.)

```
Tib_errorcode tib_stream_set(stream, property, value)
Tib_stream    *stream;
```

-continued

```
Tib_property    *property;
caddr_t         value;
```

Used to change the dynamically settable properties of a stream. These properties are described below. Note that some properties can only be set prior to stream creation (via tib_default_set) or at stream creation.

```
caddr_t tib_stream_get(stream, property)
Tib_stream      *stream;
Tib_property    *property;
```

Used to retrieve the current value of the specified property.

```
Tib_errorcode tib_default_set( property, value)
Tib_stream      *stream;
Tib_property    *property;
caddr_t         value;
```

Used to change the initial properties of a stream. During stream creation, the default values are used as initial values in the new stream whenever a property value is not explicitly specified in the creation argument list.

```
Tib_erorcode tib_default_get( property)
Tib_stream      *stream;
Tib_property    *property;
```

Used to retrieve the default value of the specified property.

tib_unbatch()

Informs TIBINFO to stop "batching" functions and to execute any outstanding ones.

TIBINFO Attributes

The properties defined by TIBINFO and their allowable values are listed below and are described in detail in the appropriate "man" pages. The last grouping of properties allow the programmer to send default property values and hints to the underlying system components-specifically, the network protocol engines, the TIB™ subject mapper, and various service disciplines.

| | |
|---|---|
| TIB_PROP_CFILE | cfile-handle |
| TIB_PROP_CLIENTDATA | pointer |
| TIB_PROP_ERRHANDLER | error-handler-routine |
| TIB_PROP_LASTMSG | tib_message pointer |
| TIB_PROP_MSGHANDLER | message-handler-routine |
| TIB_PROP_NETWORK | protocol-engine-property-list |
| TIB_PROP_NETWORK_CFILE | protocol-engine-property-cfile |
| TIB_PROP_SERVICE | service-discipline-property-list |
| TIB_PROP_SERVICE_CFILE | service-discipline-property-cfile |
| TIB_PROP_SUBJECT | subject-property-list |
| TIB_PROP_SUBJECT_CFILE | subject-property-cfile |

TIBINFO Message Structure

The component information of a TIBINFO message can be accessed through the following macros:

```
tib_msg_clientdata(msg)
tib_msg_subject(msg)
tib_msg_size(msg)
tib_msg_value(msg)
```

The following macros return TRUE (1) or FALSE (0):

```
tib_msg_is_buffer(msg)
tib_msg_is_form(msg)
```

5. TIB™ Forms

5.1 Introduction

The Forms package provides the tools to create and manipulate self-describing data objects, e.g., forms. Forms have sufficient expressiveness, flexibility and efficiency to describe all data exchanged between the different TIB™ applications, and also between the main software modules of each application.

The Forms package provides its clients with one data abstraction. Hence, the software that uses the Forms package deal with only one data abstraction, as opposed to a data abstraction for each different type of data that is exchanged. Using forms as the only way to exchange user data, facilitates (i) the integration of new software modules that communicate with other software modules, and (ii) modular enhancement of existing data formats without the need to modify the underlying code. This results in software that is easier to understand, extend, and maintain.

Forms are the principal shared objects in the TIB™ communication infrastructure and applications; consequently, one of the most important abstractions in the TIB™.

The primary objective in designing the forms package were:

Extensibility—It is desirable to be able to change the definition of a form class without recompiling the application, and to be able introduce new classes of forms into the system.

Maintainability—Form-class definition changes may affect many workstations; such changes must be propagated systematically.

Expressiveness—Forms must be capable of describing complex objects; therefore, the form package should support many basic types such as integer, real, string, etc. and also sequences of these types.

Efficiency—Forms should be the most common object used for sending information between processes-both for processes on the same workstation and for processes on different workstations. Hence, forms should be designed to allow the communication infrastructure to send information efficiently.

Note that our use of the term "form" differs from the standard use of the term in database systems and so-called "forms management systems." In those systems, a "form" is a format for displaying a database or file record. (Typically, in such systems, a user brings up a form and paints a database record into the form.)

Our notion of a form is more fundamental, akin to such basic notions as record or array. Our notion takes its meaning from the original meaning of the Latin root word forma. Borrowing from Webster: "The shape and structure of something as distinguished from its material". Forms can be instantiated, operated on, passed as arguments, sent on a network, stored in files and databases. Their contents can also be displayed in many different formats. "templates" can be used to specify how a form is to be displayed. A single form (more precisely, a form class) can have many "templates" since it may need to be displayed in many different ways. Different kinds of users may, for example, desire different formats for displaying a form.

5.2 Description

Forms are self-describing data objects. Each form contains a reference to its formclass, which completely describes the form. Forms also contains metadata that enables the form package to perform most operations without accessing the related formclass definition.

Each form is a member of a specific form class. All forms within a class have the same fields and field's labels (in fact, all defining attributes are identical among the forms of a specific class). Each form class is named and two classes are considered to be distinct if they have distinct names (even though the classes may have identical definitions). Although the forms software does not assign any special meaning or processing support to particular form names, the applications using it might. (In fact, it is expected that certain form naming conventions will be established.)

There are two main classification of forms: primitive versus constructed forms, and fixed length versus variable size forms.

Primitive forms are used to represent primitive data types such as integers, float, strings, etc. Primitive forms contain metadata, in the form header information header and the data of the appropriate type, such as integer, string, etc.

Constructed forms contain sub-forms. A constructed form contains other forms, which in turn can contain subforms.

Fixed length forms are simply forms of a fixed length, e.g., all the forms of a fixed length class occupy the same number of bytes. An example for a fixed length primitive form is the integer form class; integer forms always take 6 bytes, (2 bytes for the form header and 4 bytes for the integer data).

Variable size forms contain variable size data: variable size, primitive forms contain variable size data, such as variable length string; variable size, constructed forms contain a variable number of subforms of a single class. Such forms are similar to an array of elements of the same type.

5.3 Class Identifiers

When a class is defined it is assigned an identifier. This identifier is part of each of the class's form instance, and is used to identify the form's class. This identifier is in addition to its name. Class identifiers must be unique within their context of use. Class identifiers are 2 bytes long; bit 15 is set if the class is fixed length and cleared otherwise; bit 14 is set if the class is primitive and cleared otherwise;

5.4 Assignment Semantics

To assign and retrieve values of a form (or a form sequence), "copy" semantics is used. Assigning a value to a form (form field or a sequence element) copies the value of the form to the assigned location-it does not point to the given value.

Clients that are interested in pointer semantics should use forms of the basic type Form Pointer and the function Form_set_data_pointer. Forms of type Form Pointer contain only a pointer to a form; hence, pointer semantics is used for assignment. Note that the C programming language supports pointer semantics for array assignment.

5.5 Referencing a Form Field

A sub-form or field of a constructed form can be accessed by its field name or by its field identifier (the latter is generated by the Forms package). The name of a subform that is not a direct descendent of a given form is the path name of all the fields that contain the requested subform, separated by dot. Note that this is similar to the naming convention of the C language records.

A field identifier can be retrieved given the field's name and using the function Form-class_get_field_id. The direct fields of a form can be traversed by using Form_field_id_ first to get the identifier of the first field, and then by subsequently calling Form_field_id_next to get the identifiers of each of the next fields.

Accessing a field by its name is convenient; accessing it by its identifier is fast. Most of the Forms package function references a form field by the field's identifier and not by the field's name.

5.6 Form-class Definition Language

Form classes are specified using the "form-class definition language," which is illustrated below. Even complex forms can be described within the simple language features depicted below. However, the big attraction of a formal language is that it provides an extensional framework: by adding new language constructs the descriptive power of the language can be greatly enhanced without rendering previous descriptions incompatible.

A specification of a form class includes the specification of some class attributes, such as the class name, and a list of specifications for each of the class's fields. Three examples are now illustrated:

```
{
short {
        IS_FIXED                true;
        IS_PRIMITIVE            true;
        DATA_SIZE               2;
        DATA_TYPE               9;
        }
short_array {                   # A variable size class of shorts.
        IS_FIXED                false;
        FIELDS {
        {
            FIELD_CLASS_NAME short;
        }
        }}
example_class {
        IS_FIXED                true;
        FIELDS {
        first {
            FIELD_CLASS_NAME short;
        }
        second {
            FIELD_CLASS_NAME short_array;
        }
        third {
            FIELD_CLASS_NAME string_30;
        }
        fourth {
            FIELD_CLASS_NAME integer;
        }
        }
}}
```

To specify a class, the class's name, a statement of fixed or variable size, and a list of fields must be given. For primitive classes the data type and size must also be specified. All the other attributes may be left unspecified, and defaults will be applied. To define a class field, either the field class name or id must be specify.

The form-class attributes that can be specified are:

The class name.

CLASS_ID—The unique short integer identifier of the class. Defaults to a package specified value.

IS_FIXED—Specifies whether its a fixed or variable size class. Expects a boolean value. This is a required attribute.

IS_PRIMITIVE—Specifies whether its a primitive or constructed class. Expects a boolean value. Defaults to False.

FIELDS_NUM—An integer specifying the initial number of fields in the form. Defaults to the number of specified fields.

DATA_TYPE—An integer, specified by the clients, that indicates what is the type of the data. Used mainly in defining primitive classes. It does not have default value.

DATA_SIZE—The size of the forms data portion. Used mainly in defining primitive classes. It does not have default value.

FIELDS—Indicates the beginning of the class's fields definitions.

The field attributes that can be specified are:

The class field name.

FIELD CLASS ID—The class id for the forms to reside in the field. Note that the class name can be used for the same purpose.

FIELD_CLASS_NAME—The class name for the forms to reside in the field.

Here is an example of the definition of three classes:

Note that variable length forms contains fields of a single class. "integer" and "string_30", used in the above examples, are two primitive classes that are defined within the Formclass package itself.

5.7 Form Classes are Forms

Form classes are implemented as forms. This means functions that accept forms as an argument also accept form classes. Some of the more useful functions on form classes are:

Form_pack, Form_unpack—Can be used to pack and unpack form classes.

Form_copy—Can be used to copy form classes.

Form_show—Can be used to print form classes.

5.8 Types typedef Formclass

A form-class handle.

typedef Formclass_id

A form-class identifier.

typedef Formclass_attr

A form-class attribute type. Supported attributes are:

FORMCLASS_SIZE—The size of the class form instances.

FORMCLASS_NAME—The class name.

FORMCLASS_ID—A two byte long unique identifier.

FORMCLASS_FIELDS_NUM—The number of (direct) fields in the class. This is applicable only for fixed length classes. The number of fields in a variable length class is different for each instance; hence, is kept in each form instance.

FORMCLASS_INSTANCES_NUM—The number of form instances of the given class.

FORMCLASS_IS_FIXED—True if its a fixed length form, False if its a variable length form.

FORMCLASS_IS_PRIMITIVE—True if its a form of primitive type, False if its a constructed form, i.e. the form has sub forms.

FORMCLASS_DATA_TYPE—This field value is assigned by the user of the forms a to identify the data type of primitive forms. In our current application we use the types constants as defined by the enumerated type Form_data_type, in the file forms.h.

FORMCLASS DATA SIZE—This field contains the data size, in bytes, of primitive forms. For instance, the data size of the primitive class Short is two. Because it contains the C type short, which is kept in two bytes.

typedef Formclass_field_attr

A form-class field attribute type. Supported form class field attributes are:

FORMCLASS_FIELD_NAME—The name of the class field.

FORMCLASS_FIELD_CLASS_ID—The class id of the field's form.

typedef Form

A form handle.

typedef Form_field_id

An identifier for a form's field. It can identifies fields in any level of a form. A field identifier can be retrieved form a field name, using the function Form-class_get_field_name. A form_field_id is manipulated by the functions:

Form_field_id_first and Form_field_id_next.

typedef Form_attr

A form attribute type. Supported form attributes are:

FORM_CLASS_ID—The form's class identifier.

FORM_DATA_SIZE—The size of the form's data. Available only for constructed, not primitive, forms or for primitive forms that are of variable size. For fixed length primitive forms this attribute is available via the form class.

FORM_FIELDS_NUM—The number of fields in the given form. Available only for constructed, not primitive forms. For primitive forms this attribute is available via the form class.

typedef Form_data

The type of the data that is kept in primitive forms.

typedef Form_pack_format

Describes the possible form packing types. Supported packing formats are:

FORM_PACK_LIGHT—Light packing, used mainly for inter process communication between processes on the same machine. It is more efficient then other types of packing. Light packing consists of serializing the given form, but it does not translates the form data into machine independent format.

FORM_PACK_XDR—Serialize the form while translating the data into a machine-independent format. The machine-independent format used is Sun's XDR.

5.9 Procedural Interface to the Forms-class Package

The formclass package is responsible for creating and manipulating forms classes. The forms package uses these descriptions to create and manipulate instances of given form classes. An instance of a form class is called, not surprisingly, a form.

Formclass_create

Create a class handle according to the given argument list. If the attribute CLASS_CFILE is specified it should be followed by a cfile handle and a path_name. In that case formclass_create locates the specification for the form class in the specified configuration file. The specification is compiled into an internal data structure for use by the forms package.

Formclass_create returns a pointer to the class data structure. If there are syntax errors in the class description file the function sets the error message flag and returns NULL.

Formclass_destroy

The class description specified by the given class handle is dismantled and the storage is reclaimed.

If there are live instances of the class then the class is not destroyed and the error value is updated to "FORMCLASS_ERR_NON_ZERO_INSTANCES_NUM".

Formclass_get

Given a handle to a form class and an attribute of a class (e.g. one of the attributes of the type Formclass_attr) Formclass_get returns the value of the attribute. Given an unknown attribute the error value is updated to "FORMCLASS_ERR_UNKNOWN_ATTRI-BUTE".

Formclass_get_handle_by_id

Given a forms-class id, Formclass_get_handle_by_id returns the handle to the appropriate class descriptor. If the requested class id is not known Form-class_get_handle_by_id returns NULL, but does not set the error flag.

Formclass_get_handle_by_name

Given a forms-class name, Formclass_get_handle_by_name returns the handle to the appropriate class descriptor. If the requested class name is not known Formclass_get_handle_by_name returns NULL, but does not set the error flag.

Formclass_get_field_id

Given a handle to a form class and a field name this function returns the form id, which is used for a fast access to the form. If the given field name does not exist, it updated the error variable to FORMCLASS_ERR_UNKNOWN_FIELD_NAME.

Formclass_field_get

Returns the value of the requested field's attribute. If an illegal id is given this procedure, it updated the error variable to FORMCLASS_ERR_UNKNOWN_FIELD_ID.

Formclass_iserr

Returns TRUE if Formclass error flag is turned on, FALSE otherwise.

Formclass_errno

Returns the formclass error number. If no error, it returns FORMCLASS_OK. For a list of supported error values see the file formclass.h.

5.10 The Forms Package

Form_create

Generate a form (i.e., an instance) of the form class specified by the parameter and return a handle to the created form.

Form_destroy

The specified form is "destroyed" by reclaiming its storage.

Form_get

Given a handle to a form and a valid attribute (e.g. one of the values of the enumerated type Form_attr) Form_get returns the value of the requested attribute.

The attribute FORM_DATA_SIZE is supported only for variable size forms. For fixed size form this information is kept in the class description and is not kept with each form instance.

Requiring the FORM_DATA_SIZE from a fixed length form will set the error flag to FORM_ERR_NO_SIZE_ATTR_FOR_FIXED_LENGTH_FORM.

The attribute FORM_FIELDS_NUM is supported only for constructed forms. Requiring the FORM_FIELDS_NUM from a primitive form will set the error flag to FORM_ERR_ILLEGAL_ATTR_FOR_PRIMITIVE_FORM.

If the given attribute is not known the error flag is set to FORM_ERR_UNKNOWN_ATTR. When the error flag is set differently, then FORM_OK Form_get returns NULL.

Form_set_data

Sets the form's data value to the given value. The given data argument is assumed to be a pointer to the data, e.g., a pointer to an integer or a pointer to a date structure. However for strings we expect a pointer to a character.

Note that we use Copy semantics for assignments.

Form_get_data

Return a pointer to form's data portion. In case of a form of a primitive class the data is the an actual value of the form's type. If the form is not of a primitive class, i.e., it has a non zero number of fields, then the form's value is a handle to the form's sequence of fields.

Warning, the returned handle points to the form's data structure and should not be altered. If the returned value is to be modified is should be copied to a private memory.

Form_set_data_pointer

Given a variable size form, Form_set_data_pointer assigns the given pointer to the points to the forms data portion. Form_set_data_pointer provide a copy operation with pointer semantics, as opposed to copy semantics.

If the given form is a fixed length form then the error flag is set to FORM_ERR_CANT_ASSIGN_POINTER_TO_FIXED_FORM.

Form_field_set_data

This is a convenient routine that is equal to calling Form_field_get and then using the retrieved form to call Form_set_data. More precisely: form_ field_set_data(form, field_id, form_data, size) == form_set_data(form_field_get(form, field_id), form_data, size), plus some error checking.

Form_field_get_data

Note that we use Copy semantics for assignments.

This is a convenient routine that is equal to calling Form_field_get and then using the retrieved form to call Form_get_data. More precisely: form_field_get_data(form, field_id, form_data, size) == form_get_data(form_field_get(form, field_id), form_data, size) plus some error checking.
Warning, the returned handle points to the form's data structure and should not be altered. If the returned value is to be modified is should be copied to a private memory.

form_field_id_first

Form_field_id_first sets the given field_id to identify the first direct field of the given form handle.

Note that the memory for the given field_id should be allocated (and freed) by the clients of the forms package and not by the forms package.

form_field_id_next

Form_field_id_first sets the given field_id to identify the next direct field of the given form handle. Calls to Form_field_id_next must be preceded with a call to Form_field_id_first.

Note that the memory for the given field_id should be allocated (and freed) by the clients of the forms package and not by the forms package.

Form_field_set

Sets the given form or form sequence as the given form field value. Note that we use Copy semantics for assignments.

When a nonexistent field id is given then the error flag is set to FORM_ERR_ILLEGAL_ID.

Form_field_get

Return's a handle to the value of the requested field. The returned value is either a handle to a form or to a form sequence.

Warning, the returned handle points to the form's data structure and should not be altered. If the returned value is to be modified is should be copied to a private memory, using the Form_copy function.

When a nonexistent field id is given, then the error flag is set to FORM_ERR_ILLEGAL_ID and Form_field_get returns NULL.

Form_field_append

Form_field_append appends the given, append_form argument to the end of the base_form form sequence. Form_field_append returns the id of the appended new field.

Form_field_delete

Form_field_delete deletes the given field from the given base_form.

If a non existing field id is given then the error flag is set to FORM_ERR_ILLEGAL_ID and Form_field_delete returns NULL.

Form_pack

Form_pack returns a pointer to a byte stream that contains the packed form, packed according to the requested format and type.

If the required packed type is FORM_PACK_LIGHT then Form_pack serializes the form, but the forms data is not translated to a machine-independent representation. Hence a lightly packaged form is suitable to transmit between processes on the same machine.
If the required packed type is FORM_PACK_XDR then Form_pack serializes the form and also translates the form representation to a machine-independent representation, which is Sun's XDR. Hence form packed by an XDR format are suitable for transmitting on a network across machine boundaries.
Formclass.h. are implemented as forms, hence Form_pack can be used to pack form classes as well as forms.

Form_unpack

Given an external representation of the form, create a form instance according to the given class and unpack the external representation into the instance.

Form classes are implemented as forms, hence Form_unpack can be used to unpack form classes as well as forms.

Form_copy

Copy the values of the source form into the destination form. If the forms are of different classes no copying is performed and the error value is updated to FORM_ERR_ILLEGAL_CLASS.

Formclasses are implemented as forms, hence Form_copy can be used to copy form classes as well as forms.

Form_show

Return an ASCII string containing the list of field names and associated values for indicated fields. The string is suitable for displaying on a terminal or printing (e.g., it will contain new-line characters). The returned string is allocated by the function and need to be freed by the user. (This is function is very useful in debugging.)

Formclasses are implemented as forms, hence Form_show_can be used to print form classes as well as forms.

Form_iserr

Returns TRUE if the error flag is set, FALSE otherwise.

Form_errno

Returns the formclass error number. If no error, it returns FORMCLASS_OK. The possible error values are defined in the file forms.h.

GLOSSARY

There follows a list of definitions of some of the words and phrases used to describe the invention.

Access Procedure: a broader term than service discipline or service protocol because it encompasses more than a communications protocol to access data from a particular server, service, application. It includes any procedure by which the information requested on a particular subject may be accessed. For example, if the subject request is "Please give me the time of date", the access procedure to which this request is mapped on the service layer could be a call to the operating system on the computer of the user that initiated the request. An access procedure could also involve a call to a utility program.

Application: A software program that runs on a computer other than the operating system programs.

Architectural Decoupling: A property of a system using the teachings of the invention. This property is inherently provided by the function of the information layer in performing subject-based addressing services in mapping subjects to services and service disciplines through which information on these subjects may be obtained. Subject-based addressing eliminates the need for the data consuming processes to know the network architecture and where on the network data on a particular subject may be found.

Attribute of a Form Class: A property of form class such as whether the class is primitive or constructed. Size is another attribute.

Class: A definition of a group of forms wherein all forms in the class have the same format and the same semantics.

Class/Class Descriptor/Class Definition: A definition of the structure and organization of a particular group of data records or "forms" all of which have the same internal representation, the same organization and the same semantic information. A class descriptor is a data record or "object" in memory that stores the data which defines all these parameters of the class definition. The Class is the name of the group of forms and the Class Definition is the information about the group's common characteristics. Classes can be either primitive or constructed. A primitive class contains a class name that uniquely identifies the class (this name has associated with it a class number or class_id) and a specification of the representation of a single data value. The specification of the representation uses well known primitives that the host computer and client applications understand such as string_20 ASCII, floating point, integer, string_20 EBCDIC etc. A constructed class definition includes a unique name and defines by name and content multiple fields that are found in this kind of form. The class definition specifies the organization and semantics or the form by specifying field names. The field names give meaning to the fields. Each field is specified by giving a field name and the form class of its data since each field is itself a form. A field can be a list of forms of the same class instead of a single form. A constructed class definition contains no actual data although a class descriptor does in the form of data that defines the organization and semantics of this kind of form. All actual data that define instances of forms is stored in forms of primitive classes and the type of data stored in primitive classes is specified in the class definition of the primitive class. For example, the primitive class named "Age" has one field of type integer_3 which is defined in the class definition for the age class of forms. Instances of forms of this class contain 3 digit integer values.

Class Data Structure: All the data stored in a class manager regarding a particular class. The class descriptor is the most important part of this data structure, but there may be more information also.

Class Definition: The specification of a form class.

Class Descriptor: A memory object which stores the form-class definition. In the class manager, it is stored as a form. On disk, it is stored as an ASCII string. Basically, it is a particular representation or format for a class definition. It can be an ASCII file or a form type of representation. When the class manager does not have a class descriptor it needs, it asks the foreign application that created the class definition for the class descriptor. It then receives a class descriptor in the format of a form as generated by the foreign application. Alternatively, the class manager searches a file or files identified to it by the application requesting the semantic-dependent operation or identified in records maintained by the class manager. The class definitions stored in these files are in ASCII text format. The class manager then converts the ASCII text so found to a class descriptor in the format of a native form by parsing the ASCII text into the various field names and specifications for the contents of each field.

Client Application: a data consuming or data publishing process, i.e., a computer program which is running, other than an operating system program that is linked to the communication interface according to the teachings of the invention.

Computer NetWork: A data pathway between multiple computers by hardware connection such as a local or wide area network or between multiple processes running on the same computer through facilities provided by the operating system or other software programs and/or shared memory including a Unix pipe between processes.

Configuration Decoupling: The property of a computer system/network implementing the teachings of the invention which is inherently provided by the distributed communication layer. This layer, by encapsulating the detailed protocols of how to set up and destroy communication links on a particular configuration for a computer network, frees client processes, whether data publishers or data consumers from the need to know these details.

Configuration File: A file that stores data that describes the properties and attributes or parameters of the various software components, records and forms in use.

Constructed Field: A field which contains another form or data record.

Consumer: a client or consumer application or end user which is requesting data.

Data Distribution Decoupling: The function of the communication interface software according to the teachings of the invention which frees client applications of the necessity to know and provide the network addresses for servers providing desired services.

Decoupling: Freeing a process, software module or application from the need to know the communication protocols, data formats and locations of all other processes, computers and networks with which data is to be interchanged.

Distributed Communication Layer: the portion of the apparatus and method according to the teachings of the invention which maps the access procedure identified by the service layer to a particular network or transparent layer protocol engine and sets up the required communication channel to the identified service using the selected network protocol engine.

Field: One component in an instance of a form which may have one or more components each named differently and each meaning a different thing. Fields are "primitive" if they contain actual data and are "constructed" if they contain other forms, i.e., groupings of other fields. A data record or form which has at least one field which contains another form is said to be "nested". The second form recorded in the constructed field of a first form has its own fields which may also be primitive or constructed. Thus, infinitely complex layers of nesting may occur.

Foreign: A computer or software process which uses a different format of data record than the format data record of another computer or software process.

Form: A data record or data object which is self-describing in its structure by virtue of inclusion of fields containing class descriptor numbers which correspond to class descriptors, or class definitions. These class descriptors describe a class of form the instances of which all have the same internal representation, the same organization and the same semantic information. This means that all instances, i.e., occurrences, of forms of this class have the same number of fields of the same name and the data in corresponding fields have the same representation and each corresponding field means the same thing. Forms can be either primitive or constructed. A form is primitive if it stores only a single unit of data. A form is constructed if it has multiple internal components called fields. Each field is itself a form which may be either primitive or constructed. Each field may store data or the class_id, i.e., the class number, of another form.

Format Operation: An operation to convert a form from one format to another format.

Format or Type: The data representation and data organization of a structural data record, i.e., form.

Handle: A pointer to an object, record, file, class descriptor, form etc. This pointer essentially defines an access path to the object. Absolute, relative and offset addresses are examples of handles.

ID: A unique identifier for a form, record, class, memory object etc. The class numbers assigned the classes in this patent specification are examples of ID's.

Information Layer: the portions of the apparatus and method according to the teachings of the invention which performs subject based addressing by mapping information requests on particular subjects to the names of services that supply information on the requested subject and the service disciplines used to communicate with these services.

Interface: A library of software programs or modules which can be invoked by an application or another module of the interface which provide support functions for carrying out some task. In the case of the invention at hand, the communication interface provides a library of programs which implement the desired decoupling between foreign processes and computers to allow simplified programming of applications for exchanging data with foreign processes and computers.

Interface Card: The electronic circuit that makes a physical connection to the network at a node and is driven by transparent layer protocol programs in the operating system and network and data-link protocol programs on the interface card to send and receive data on the network.

Native Format/Form: The format of a form or the form structure native to an application and its host computer.

Nested: A data structure comprised of data records having multiple fields each of which may contain other data records themselves containing multiple fields.

Network Protocol Engine: a software and hardware combination that provides a facility whereby communication may be performed over a network using a particular protocol.

Node: Any computer, server or terminal coupled to the computer network.

Primitive Field: A field of a form or data record which stores actual data.

Process: An instance of a software program or module in execution on a computer.

Semantic-Dependent Operation: An operation requiring access to at least the semantic information of the class definition for a particular form to supply data from that form to some requesting process.

Semantic Information: With respect to forms, the names and meanings of the various fields in a form.

Server: A computer running a data producer process to do something such as supply files stored in bulk storage or raw data from an information source such as Telerate to a requesting process even if the process is running on the same computer which is running the data producer process.

Server Process: An application process that supplies the functions of data specified by a particular service, such as Telerate, Dow Jones News Service, etc.

Service: A meaningful set of functions or data usually in the form of a process running on a server which can be exported for use by client applications. In other words, a service is a general class of applications which do a particular thing, e.g., applications supplying Dow Jones News information. Quotron datafeed or a trade ticket router. An application will typically export only one service, although it can export many different services.

Service Discipline or Service Protocol: A program or software module implementing a communication protocol for communication with a particular service and including routines by which to select one of several servers that supplies a service in addition to protocols for communicating with the service and advising the communication layer which server was selected and requesting that a communication link be set up.

Service Access Protocol: A subset of the associated service discipline that encapsulates a communication protocol for communicating with a service.

Service Instance: A process running on a particular computer and which is capable of providing the specified service (also sometimes called a server process). For a given service, several service instances may be concurrently providing the service so as to improve performance or to provide fault tolerance. The distributed communication component of the TIB™ communication software implements "fault-tolerant" communication by providing automatic switchover from a failed service instance to an operational one providing the same service.

Service Layer: the portion of apparatus and method according to the teachings of the invention that maps data received from the information layer to the access procedure to be used to access the service or other source for the requested information to provide service decoupling.

Service Decoupling: The function of the service layer of the communication interface software according to the teachings of the invention which frees client applications of the necessity to know and be able to implement the particular communication protocols necessary to access data from or otherwise communicate with services which supply data on a particular subject.

Service Record: A record containing fields describing the important characteristics of an application providing the specified service.

Subject Domain: A set of subject categories (see also subject space).

Subject Space: A hierarchical set of subject categories.

Subscribe Request: A request for data regarding a particular subject which does not specify the source server or servers, process or processes or the location of same from which the data regarding this subject may be obtained.

Transport Layer: A layer of the standard ISO model for networks between computers to which the communication interface of the invention is linked.

Transport Protocol: The particular communication protocol or discipline implemented on a particular network or group of networks coupled by gateways or other inter-network routing.

Appendix A

Appendix A, which can be found in the application file, is the complete run time collection of C language source code programs that embody the invention. This code runs in the Sun Microsystems OS 4.1 environment on Sun 4 machines such as SPARC 1 and the SPARC 370 and 470 servers.

TIB Build

TIB may be built on Sun Unix workstations running Sun OS 4.1. The C compiler distributed by Sun is used for compilation. Also required are the X11R3 (or X11R4) libraries. TIB was built using the "gmake" utility (distributed by the Free Software Foundation in Cambridge, Mass.) Each directory which must be built contains gmake file named GNUmakefile. To build the API, three invocations of gmake should be performed on each directory containing a GNUmakefile. The first pass directs gmake to build "include files" by running 'gmake EXPORT-INCS". The second pass directs gmake to build the TIB libraries by running 'gmake EXPORT-LIBS'. The last pass through the directories directs gmake to build the TIB API libraries by running 'gmake EXPORT-BINS'.

Several gmake support files exist, and a directory should be created to hold these files. The environment variable, $MINCLUDE, should be set to reference this directory before performing the build.

What is claimed is:

1. In a distributed computing environment including one or more computers coupled together by one or more networks, said one or more computers having in execution thereon one or more subscriber applications each of which has the capability of making a subscription request requesting that data on one or more subjects be sent to said subscriber application whenever data on said subject becomes available until said subscription is canceled, and said one or more computers having in execution thereon one or more service applications, each of which is capable of transmitting over said one or more networks data on one or more subjects, an apparatus comprising:

intermediary software controlling said one or more computers and coupled to said one or more networks and said one or more subscriber and service applications, so as to logically decouple said one or more subscriber applications from said service applications in the sense of performing all necessary functions to get data requested by subject by said subscriber applications from one or more service applications that supply data on the requested subject to all computers on which a subscriber application is in execution which has an open subscription to the subject of said data and from each such computer to the subscribing applications themselves and delivering said data only to said computers on which there is in execution a subscriber application having an open subscription to the subject of said data, said logical decoupling also implemented by said intermediary software by eliminating the need to have computer code in any said service application which outputs any data, other than the subject itself, which controls where in said distributed computing environment data published by said service application in execution on one or more of said computers is distributed or which identifies or locates any subscriber application or computer in said distributed computing environment to which data published by any said service application is to be distributed, and by eliminating the need for any subscriber application to include computer code which identifies any particular service application from which data is to be sought or which can find a service application which can supply data on a subject desired by said subscriber application, said intermediary software for controlling said one or more computers so as to automatically set up a communication path through said network between service applications which publish data on a subject and all and only computers having in execution thereon subscriber applications having an open subscription to the subject of said data.

2. An apparatus for use in a distributed computing system comprised of one or more computers some of which may be clients and some of which may be servers and some of which may be both clients and servers, all said computers coupled by a network or data path, said apparatus for interfacing at least one application process in execution on at least one client computer having an operating system embodying a transport layer communication protocol and a network interface circuit card coupling the client computer to said network to which is coupled at least one server computer having an operating system embodying a transport layer protocol and execution of which is controlled by at least one service process, such that said at least one application process requesting data on a subject can be selectively linked to at least one service process which is capable of supplying data on said subject using a subscription paradigm, and wherein each said at least one application process is capable of issuing subscription requests requesting an ongoing flow of data on the subject named in each said subscription request whenever said data is published, comprising:

communication means including at least one protocol engine for execution on each of said host and server computers and coupled to said transport layer communication protocols of said host and server computers, each protocol engine encapsulating a communication protocol providing reliability or efficiency enhancing functions not supplied by said transpod layer communication protocol, said protocol engines for exchanging data with each other over said network, said communication means for receiving a link request to set up a subscription-based data communication link to a selected server computer and for selecting and invoking selected ones of said protocol engines encapsulating a desired communication protocol and for invoking said transport layer communication protocol to physically establish said data communication link;

service means for processing subscription requests, said service means including at least two service discipline(s) including a consumer side service discipline program for controlling one or more of said computers so as to communicate with said at least one application process and a publisher side service discipline program for controlling one or more of said computers so as to communicate with said at least one service process and which is capable of receiving data published on a subject by said service process and distributing said published data to only those computers having in execution thereon an application process having an open subscription to the subject of said data, said data published by said service process containing no data indicating where said data is to be sent within said distributed computing system, other than the subject of the published data itself, said service means for transmitting said data to all application processes which have issued subscription requests naming the subject of said data as being of interest, and wherein at least said consumer side service discipline encapsulates a communication protocol for communicating to at least a selected one of said services via the publisher side service discipline coupled thereto, said service means for receiving a subscription link request requesting establishment of a subscription communication link with one or more of said service processes named in said subscription communication link which publishes data on a particular subject and for generating and transmitting to said communication means said link request requesting the establishment by said communication means of said subscription-based data communication link with the service identified in said subscription link request, and for sending a subscription registration message to said publisher side service discipline coupled to said one or more service processes requesting that all data on said subject, whenever published, be sent to each said application process(es) which has issued a subscription request on the subject so long as said subscription has not been canceled, said publisher side service discipline being selectively coupled to said service process for registering said subscription in a subscription list identifying at least all application processes that have active subscriptions and the subjects thereof, at least one of said service disciplines being coupled to each said application and services process for which an active subscription and communication link have been established and cooperating with each said application process that issued a subscription request and at least one said service process that is capable of supplying data on the subject so as to forward data published by said service process(es) on the subject of an active subscription to all said application processes having an active subscription on said subject, said service means for filtering said published data by subject on the service side of the data communication link such that data published by said service process which does not correspond to the subject of any active subscription is not transmitted over the network but such that data having a subject matching the subject of an active subscription reaches all application processes which have active subscriptions on the subject; and information means for controlling one or more computers so as to present a programmatic interface at least to said one or more application processes and said at least one service processes such said one or more application processes can open a subscription to a subject simply by passing a subscribe request to said programmatic interface and passing a subject thereto in said subscription request and such that a service process can publish data on a subject to all said application processes having an open subscription to said subject simply by invoking a publish function of said programmatic interface and passing the data to be published thereto along with a subject of said data, said information means for receiving said subscribe request(s) from said one or more application process(es), each said subscribe request containing at least a subject and the identity of a callback routine for said application process, and, for each said subscribe request, mapping said subject contained therein to one or more of said service processes which can supply data on said subject and at least a selected one of said service disciplines which encapsulates a communication protocol capable of communicating with said selected service or services, and for transmitting the subject of said subscribe request to said service means along with data identifying and/or giving the address in said distributed computing system of at least one service process with which subscription based data communication links are to be established.

3. The apparatus of claim 2 wherein data transmitted between said application process and said service process is transmitted over said data path or network as a data message comprising a plurality of sequential packets, each of which has a header and error corrections bits as part of said packet, and wherein said communication means further comprises:

a memory;

means for adding reliability enhancing sequence numbers to said packet headers prior to transmission;

means for transmitting over said data path or network the packets, error correction bits and sequence numbers which comprise a complete data message;

means for saving said packets in said memory with said sequence numbers and error correction bits in case some or all of the packets need to be retransmitted;

means for transmitting said packets;

means for receiving said packets and checking said reliability sequence numbers to determine that all packets have arrived and using said error correction bits to determine if any of said packets were garbled during transmission, and for requesting retransmission of any missing or garbled packets, or acknowledging that all packets were properly received; and means for retransmitting any missing or garbled packets and for flushing any packets no longer needed from said memory.

4. In a distributed computing environment including at least one data consuming process in execution on one or more computers and at least one data producing process in execution on one or more computers, said one or more computers and said data consuming and data producing processes coupled by at least one data path and/or network, an apparatus comprising:

one or more computers in said distributed computing environment processing of which is controlled by one or more subject based addressing programs, said one or more subject based addressing programs for controlling said one or more computers to receive a subscription request from one or more data consuming processes to locate and access data on a specified subject, and for controlling said one or more computers to automatically locate at least one data producing process which produces data on said subject and for controlling said one or more computers to automatically generate each of said one or more link requests requesting that one or more subscription communication links be established over said data path between at least one of said data producing processes which supply data on the subject of said subscription request and at least one of said data consuming processes which made subscription requests for data on said subject; and one or more computers in said distributed computing environment controlled by one or more communication programs to receive said link requests from said one or more computers controlled by said subject based addressing programs, and for controlling said one or more computers so as to automatically establish said one or more subscription communication links over said data path, each of said one or more subscription communication links being established using a communication protocol appropriate for communication with the data producing process with which said subscription communication link is established, said one or more subscription communication links being established by controlling said one or more computers controlled by said one or more communication programs such that there is no need for said one or more computers controlled by said one or more communication programs to receive any address or address related data, other than the subject itself of the subscription request, from any data consuming process indicating where in said distributed computing environment a data producing process which is publishing data on the subject may be found and by controlling said one or more computers controlled by said one or more communication programs such that there is no need to receive any data from any data producing process, other than the subject itself of the data published by said data producing process, indicating or controlling where the data published by the data producing process is to be sent in said distributed computing environment, said one or more communication programs also for controlling said one or more computers so as to automatically transport data published on the subjects of any active subscription(s) to all but only said one or more computers processing of which is controlled by a data consuming processes which issued a subscription request requesting data on said subject and for controlling said one or more computers so as to automatically route said data published on a subject for which there is an active subscription to all said one or more data consuming processes having an active subscription on the subject of said data until said subscription(s) is canceled.

5. The apparatus of claim 4 wherein said subject based addressing program includes directory services means for storing data identifying which data producing processes supply data on which subjects and for searching said data in response to receipt of a subscription request and returning any data located during said search identifying or giving the address in said distributed computing environment of one or more data producing processes which can supply data on the subject of said subscription request to said one or more computers controlled by said one or more subject based addressing programs for use in generating said one or more link requests.

6. The apparatus of claim 4 wherein each said subject can have multiple parts which are arranged into a subject space containing 30 or more multiple part subjects, and wherein said subject space is arranged hierarchically based upon said multiple parts of said subjects, and wherein said one or more computers controlled by said one or more subject based addressing programs include means for locating all data producing processes which publish data having a subject which satisfies all parts of said multiple part subject.

7. The apparatus of claim 4 wherein said subject contained within said subscription request can have multiple pads, and wherein each said multiple part subject can include empty strings or other wild card notations, and wherein said one or more computers controlled by said one or more subject based addressing programs includes means for locating all data producing processes which supply data having a subject which satisfies all parts of said multiple part subject which are not empty strings or wild card notations, and wherein no data producing process controlling any of said one or more computers so as to publish data on one or more subjects includes any software routine, program or data the content of which is dependent upon the existence or location in said distributed computing environment of any data consuming process which can issue subscription request or the purpose of which is to directly or indirectly locate any data consuming process which can issue subscription request, and wherein no data producing process controlling any of said one or more computers so as to publish data on one or more subjects includes any software routine, program or subroutine which functions to assist in any way, other than outputting the subject of published data, in routing data between any said data producing process which controls said one or more computers so as to publish data and any data consuming process controlling one or more computers, and wherein no data consuming process controlling one or more computers includes any software routine, program or the content of which is dependent upon the existence or location of any data producing process or the purpose of which is to control one or more of said computers so as to locate any data producing process other than by outputting the subject itself of the subscription request.

8. The apparatus of claim 6 wherein said multiple parts of said subject are hierarchically arranged, and wherein there are at least 30 data producing and data consuming processes controlling processing by one or more of said computers in said distributed computing environment.

9. The apparatus of claim 7 wherein said multiple pads of said subject are hierarchically arranged.

10. The apparatus of claim 5 wherein said one or more communication programs include means coupled to each of said one or more computers under control of one or more of said data producing processes for keeping a subscription list of all of said one or more data consuming processes which have requested subscriptions and the subjects of said subscriptions and for filtering data published by said one or more computers under control of said one or more data publishing processes such that only data having a subject which matches the subject of an active subscription is transmitted over said network or data path.

11. The apparatus of claim 6 wherein each said computer under control of one of said communication programs further comprise means coupled to each data consuming process and each data producing process via the one or more computers controlled thereby for keeping a list indicating for each subject whether there are or are not active subscriptions for that subject, and wherein each said computer under control of one of said communication programs further comprises means for checking said list each time a data message on any subject is published by one or more computers under control of one or more of said data producing processes and for broadcasting over said data path or network each data message published by one or more computers under control of any data producing process on a subject for which there is at least one active subscription indicated on said list, and each said computer under control of at least one of said communication programs further comprising a communication daemon means for controlling execution by each said computer by multitasking so as to cause each said computer under control of at least one of said communications means to filter incoming data messages by subject so that data messages on any subject for which there is an active subscription entered by a data consuming process controlling processing in a multitasking environment on one of said computers on which a communication daemon means is also controlling execution of said computer on a multitasking basis are automatically sent to all data consuming processes in execution on said computer that requested said data and all other data messages on subjects for which there are no active subscriptions by any data consuming process controlling execution of said computer on a multitasking basis are discarded.

12. The apparatus of claim 8 wherein said one or more computers under control of said one or more communication programs further comprises means coupled to each data consuming process for filtering incoming data by subject so that only data on the requested subject reaches the data consuming process which requested said data.

13. The apparatus of claim 4 further comprising a distributed communications component comprised of one or more computers controlled by one or more computer programs to receive instructions from said one or more computers controlled by one or more subject based addressing programs to establish communications with one or more computers controlled by one or more data publishing computer programs, said distributed communications component for shielding said application and data publishing computer programs from the need to have routines or computer instructions therein to control said one or more computers so as to be able to know the physical distribution of other computers and computer programs in said distributed system and the communication processes so as to be able to communicate with said other computers and computer programs thereby insulating said application and data publishing computer programs from having dependencies on various characteristics of said distributed system designed into the computer programming instructions of said application and data publishing computer programs which could render said application and data publishing computer programs obsolete when said characteristics of said distributed system change.

14. In a computing environment having one or more computers coupled by one or more data paths and/or one or more networks, and having one or more data producing processes which publish data messages on one or more subjects arranged into a subject space, and one or more data consuming processes which need data on one or more subjects, said one or more data producing processes and said one or more data consuming processes in execution on said one or more computers, a process comprising the steps of:

storing data encoding the subjects in said subject space in a memory or other means for storing data coupled to of one or more of said computers, and storing in said memory or said other means for storing data mapping data which maps the identity and/or the address in said computing environment of one or more of said data producing processes for execution on one or more of said computers in said distributed computing system which can supply data on a subject for one or more subjects in said subject space;

receiving a subscription request from one or more data consuming processes for data on a particular subject and automatically locating all data producing processes which can supply data messages on that subject by using the subject of said subscription request to search said mapping data to locate a data producing process which can supply data on that subject without any assistance from said one or more data consuming processes other than receipt of the subject of the subscription request, and generating a link request, said link request directly or indirectly identifying said at least one data producing process located by search of said mapping data which can supply data on the requested subject included in said subscription request, said link request requesting that a communication link be established between at least one of said data producing processes identified in said link request and all of said data consuming processes which requested data on said subject; and receiving said link request and automatically setting up a communications link with said at least one data producing process identified directly or indirectly in said link request, and directing data messages received from any said data producing process on said subject to all and only computers having their processing controlled by said data consuming processes which requested data on said subject without receiving any data from any said data producing process which publishes a data message, other than the subject of the data itself, which indicates or controls to which computers in said computing environment any said data message is to be sent, and wherein no data producing process needs to include any data or computer instructions the purpose of which is to identify or locate any said data consuming process other than to output the subject of the data message being published.

15. The process of claim 14 wherein said step of automatically setting up said communications link further comprises the step of sending a request for a subscription to said at least one data producing process identified in said link request, said subscription request identifying directly or indirectly the data consuming process or processes which requested data on said subject, and wherein said step of directing data messages published by said data producing process on each said subject includes the step of directing all data messages published by said at least one data producing process to all data consuming processes which have an active subscription for data on said subject, said directing of data messages on a subject to all data consuming processes having active subscriptions for data on said subject occurring continuously each time a data message on said subject is published but not transmitting any message on any subject to any computer in said communication environment not having in execution thereon a data consuming process having an active subscription to the subject of said message, but ceasing to direct data messages to any data consuming process which has canceled its subscription.

16. The process of claim 14 wherein the step of locating all data producing processes which can supply data messages on the subject of a subscription request includes the steps of passing the subject of said subscription request to said one or more computers controlled by said directory services program which causes said one or more computers controlled by said directory services program to search said mapping data in said data stored in said computer memory encoding said subject space to locate the subject of said subscription request and return data identifying and/or giving the address in said computing environment of at least one data producing process which can supply data on the subject if any such process exists, and wherein said data returned by said computer controlled by said directory services programs is used to generate said link request, and wherein the step of automatically setting up a communications link further comprises the step of making one or more subscription lists listing subjects for which there are active subscriptions, said one or more subscription lists directly or indirectly identifying the data consuming processes that initiated the active subscriptions, and wherein the step of directing data messages on a subject to all data consuming processes which requested data on said subject further comprises the steps of comparing the subject of each data message published by any data publishing process to the subjects having active subscriptions listed on said one or more subscription lists and directing any data message published on a subject for which there is an active subscription to all data consuming processes that requested data on the subject of said data message, but not allowing any data message published by said data producing processes which does not match the subject of at least one active subscription to be transmitted over said data path.

17. The process of claim 14 wherein data messages transmitted between said data producing processes and said data consuming processes, hereafter referred to as processes, are transmitted as self describing data objects, wherein each self describing data object is comprised of one or more fields each of which is either a primitive class form which stores data or a constructed class form which is comprised of other fields which themselves may be primitive or constructed class forms, each said constructed class form belonging to a class which has a corresponding class definition, said self describing data objects being organized into classes defined by class definitions, each class definition comprising a list of the fields by name and data representation type which are common to all self describing data objects of that class, each self describing data object including both data format information and actual data or field values for each said field, and further comprising the steps of:

automatically converting any self describing data objects to be transmitted from one process to another from the format of the transmitting process to the format necessary for transmission across said data path prior to transmission thereof, and then transmitting said self describing data object through said data path; and automatically converting any self describing data objects received after transmission through said data path which are bound for either a data consuming process or a data producing process, from the format used to transmit data across said data path to the format used by said receiving process.

18. The process of claim 17 wherein each said conversion step comprises the steps of:

receiving a format conversion call identifying the desired "from" format and the desired "to" format and identifying a specific self describing data object upon which the conversion is to be performed;

accessing a table storing identifiers of particular from-to format conversions;

locating the first field in said self describing data object which is a primitive class form;

using the format information stored in said self describing data object for the primitive field so located, looking up a "from" format in said table corresponding to the format of the primitive class field so located and determining the required "to" format for the conversion specified in said conversion call;

using a table storing pointers to appropriate conversion software routines for the desired from-to format conversion, looking up a from-to format conversion pointer using the "from" and "to" formats just determined and using said pointer to execute an appropriate software routine to perform the desired from-to format conversion;

locating the next field containing a primitive class form in the self describing data object identified in said conversion call and repeating the above steps to convert the data in the next primitive class form from the then existing "from" format to the desired "to" format and repeating this process until all fields containing primitive class forms have been so processed; and processing every field containing a constructed class form as defined above by searching the constructed class form until the first field is found containing a primitive class form and converting the format thereof using the steps defined above and repeating this process until all fields containing primitive class forms for all levels of nesting of fields containing constructed class forms have been converted to the desired "to" format.

19. The process of claim 14 wherein data transmitted between said data producing processes and said data consuming processes is transmitted as self describing data objects, each self describing data object comprised of one or more fields each of which is either a primitive class form which stores data or a constructed class form which is comprised of other fields which themselves may be primitive or constructed class forms, each said constructed class form belonging to a class which has a corresponding class definition, said self describing data objects being organized into classes defined by class definitions, each class definition comprising a list of the fields by name and data representation type which are common to all self describing data objects of that class, each self describing data object including both data format information and actual data or field values for each said field, for providing the capability for a data consuming or data producing process to obtain data from a particular field of a particular self describing data object generated by another process, comprising the steps of:

receiving in a Get-Field call from a process that desires particular data, said Get-Field call identifying the particular field name of the field of the self describing data object from which the data is to be obtained and the particular one of said self describing data objects from which data is to be obtained;

searching the class definition for said self describing data object from which data is to be obtained to locate said field name identified in said Get-Field call or some synonym thereof;

returning a relative address for said field identified in said Get-Field call, said relative address identifying where in instances of said class of said self describing data object identified in said Get-Field call said field named in said Get-Field call can be found;

accessing said self describing data object identified in said Get-Field call and retrieving the desired data using said relative address of the field in which the desired data is stored, and returning the desired data to the process which requested said data.

20. The process of claim 14 wherein the step of automatically setting up a communications link further comprises the steps of:

sending a subscription request message to a publisher side service discipline process which controls one or more of said computers so as to be coupled to receive data on the subject of said subscription request from a data producing process or processes which control the same said one or more computers having said publisher side service discipline process in execution thereon so as to publish data messages on said subject and with which communication links are to be set up on said subject;

recording all said subscription requests in a subscription table or list;

assigning a channel on said one or more data paths and/or one or more networks to each said subject for which there is an active subscription and recording said channel in said subscription table for each;

when a data message is published by any said data producing process, checking the subject thereof against the subjects of all active subscriptions in said subscription table or list to determine if there are any active subscriptions on the subject;

sending said data message published by any data producing process to all data consuming processes having active subscriptions to the subject of said data by a broadcast communication protocol by dividing said data message into one or more sequential packets suitable for transmission over said data path and/or network, each sequential packet having a header and adding to said header the channel number assigned to said subject and a sequence number indicating where said packet lies in the sequence of packets which, taken together, comprise the data message published by said data publishing process, and calculating error correction bits on data within each said packet and adding said error correction bits so calculated to each said packet;

storing all said packets in a retransmit memory;

sending messages to each data consuming process having an active subscription to the subject of said data informing each data consuming process of the channel on which said data will be broadcast;

broadcasting said data packets on said channel assigned to the subject of said data via said data path and/or network;

receiving said packets at the location of each computer in said computing environment and, at the location of each said computer, comparing the channel number of each said packet so received to the channel numbers recorded in said subscription table of all active subscriptions initiated by any data consuming process in execution at the location of said computer;

if the channel number of the received packets at any computer in said computing environment matches the channel number of any active subscription recorded in said subscription table of a data consuming process in execution on said computer, checking the sequence numbers of all packets received at the location of said computer in said computing environment to determine if all packets comprising the complete data message have been received and using said error correction bits to determine if each received packet has been correctly received, and repeating this process at the location of each said computer, and if the channel number of the received packets at any computer in said computing environment does not match the channel number recorded in said subscription table of a data consuming process in execution on said computer, discarding all said packets whose channel numbers do not match the channel number recorded in said subscription table of a data consuming process in execution on said computer;

if all packets have been successfully received, sending a message back to the process that transmitted the data that all packets have been successfully received, or, if any packet was not received or was not correctly received, sending a message to the process that transmitted the data requesting retransmission of any packets which were not received or which were not correctly received and which cannot be corrected at the receiving computer using said error correction bits;

retransmitting any packets that were not received or which were not correctly received to any computer in said computing environment that transmitted a message indicating one or more packets were not received or were not received correctly;

verifying that the newly transmitted packets have been received and have been correctly received; and reassembling said data packets into said data message at the location of any computer which received data packets having channel numbers matching the channel number of an active subscription entered by a data consuming process in execution on said computer, and passing said reassembled data message to the data consuming process or processes which requested data on the subject of said data message which is in execution on said computer.

21. The process of claim 14 wherein the step of setting up a communications link further comprises the steps of:

sending a subscription request message to a publisher side service discipline process which controls one or more of said computers so as to be coupled to receive data on the subject of said subscription request from a data producing process or processes which control the same said one or more computers having said publisher side service discipline process in execution thereon so as to publish data on the subject of said subscription request;

recording all said subscription requests in a subscription table and storing in said table the identities of all data consuming processes desiring data on each subject which is the subject of an active subscription;

assigning a channel on said one or more data paths and/or one or more networks to each said subject for which there is an active subscription and recording said channel in said subscription table for each said subscription recorded therein;

when data is published by any said data producing process with which a communication link has been established, checking the subject thereof against the subjects of all active subscriptions in said subscription table to determine how many data consuming processes have active subscriptions on the subject;

comparing the number of said data consuming processes to a predetermined threshold, and determining whether it would be more efficient to transmit the data to all data consuming processes having active subscriptions on said subject using a point-to-point communication protocol by sending the same data multiple times over said one or more data paths and/or one or more networks, one said point to point communication being addressed to each data consuming processes having an active subscription to the subject of said data or by broadcasting said data on a predetermined channel on said one or more data paths and/or one or more networks;

sending said data to all data consuming processes having active subscriptions to the subject of said data by said point-to-point communication protocol if said point-to-point communication protocol is most efficient;

sending said data to all data consuming processes having active subscriptions to the subject of said data by a broadcast communication protocol if said broadcast communication protocol is most efficient;

if said broadcast communication protocol is selected, dividing said data into one or more sequential packets suitable for transmission over a data path, each with a header and adding to said header the channel number assigned to said subject and a sequence number indicating where in the sequence of packets which, taken together, comprise the data message published by said data publishing process, and calculating error correction bits on each packet and adding said error correction bits to each said packet;

storing all said packets in a retransmit memory;

sending messages to each data consuming process having an active subscription to the subject of said data informing each data consuming process of the channel on which said data will be broadcast;

broadcasting on said one or more data paths and/or said one or more networks said data packets via said channel on said one or more data paths and/or one or more networks assigned to the subject of said data;

receiving said packets at each said computer in said computing environment and, at each said computer, comparing the channel number of each said packet to the channel numbers of all active subscriptions listed in said subscription table entered by a data consuming process in execution on said computer;

if the channel number of packets received at a computer in said computing environment matches the channel number of any active subscription listed in said subscription table entered by a data consuming process in execution on said computer, checking the sequence numbers of all packets received to determine if all packets have been received and using said error correction bits to determine if each packet has been correctly received and to correct any errors which can be corrected at the receiving computer using said error correction bits, and if the channel number of packets received at a computer in said computing environment does not match the channel number of any active subscription listed in said subscription table entered by a data consuming process in execution on said computer, discarding all such packets;

sending a message back to the process that transmitted said packets that all packets have been successfully received, or, if any packet was not received or was not correctly received, sending a message to the process that transmitted said packets requesting retransmission of any packets which were not received or which were not correctly received;

retransmitting any packets that were not received or which were not correctly received;

verifying that the newly transmitted packets have been received and have been correctly received; and reassembling said data packets into a data message and passing the data packets to the data consuming process or processes which requested data on the subject.

22. The process of claim 17 wherein the step of setting up a communications link further comprises the steps of:

sending a subscription request message to a publisher side service discipline process which controls one or more of said computers so as to be coupled to receive data on the subject of said subscription request from a data producing process or processes with which communication links are to be set up on said subject and which control the same said one or more computers having said publisher side service discipline process in execution thereon;

recording all said subscription requests in a subscription table and storing in said table the identities or addresses of all data consuming processes desiring data on each subject which is the subject of an active subscription;

assigning a channel on said one or more data paths and/or one or more networks to each said subject for which there is an active subscription and recording said channel in said subscription table for each said subscription recorded therein;

when data is published by any said data producing process with which a communication link has been established, checking the subject thereof against the subjects of all active subscriptions in said subscription table to determine how many data consuming processes have active subscriptions on the subject;

comparing the number of said data consuming processes to a predetermined threshold, and determining whether it would be more efficient to transmit the data to all data consuming processes having active subscriptions on said subject using a point-to-point communication protocol by sending the same data multiple times over said one or more data paths and/or one or more networks, one said point to point communication being addressed to each data consuming processes having an active subscription to the subject of said data message or by broadcasting said data message on a predetermined channel on said one or more data paths and/or one or more networks and sending a message to all data consuming processes having active subscriptions on said subject to listen for data on the subject of said active subscriptions on said predetermined channel on said one or more data paths and/or one or more networks;

sending said data message to all data consuming processes having active subscriptions to the subject of said data by said point-to-point communication protocol if said point-to-point communication protocol is most efficient;

sending said data message to all data consuming processes having active subscriptions to the subject of said data message by a broadcast communication protocol if said broadcast communication protocol is most efficient;

if said broadcast communication protocol is selected, dividing said data message into one or more sequential packets suitable for transmission over a data path, each with a header and adding to said header the channel number assigned to said subject and a sequence number indicating where in the sequence of packets which, taken together, comprise the data published by said data publishing process, and calculating error correction bits and adding said error correction bits to each said packet;

storing all said packets in a retransmit memory;

broadcasting on said one or more data paths and/or said one or more networks said data packets on said channel on said one or more data paths and/or one or more networks assigned to the subject of said data;

receiving said packets at each said computer in said computing environment and, at each said computer, comparing the channel number to the channel numbers of all active subscriptions listed in said subscription table entered by a data consuming process in execution on said computer;

if the channel number of packets received at a computer in said computing environment of a packet matches the channel number of any active subscription, listed in said subscription table entered by a data consuming process in execution on said computer, checking the sequence numbers of all packets received to determine if all packets have been received and using said error correction bits to determine if each packet has been correctly received and to correct any errors which can be corrected at the receiving computer using said error correction bits, and if the channel number of packets received at a computer in said computing environment does not match the channel number of any active subscription listed in said subscription table entered by a data consuming process in execution on said computer, discarding all such packets;

sending a message back to the data producing process that all packets have been successfully received, or, if any packet was not received or was not correctly received, sending a message to the data producing process that published the data requesting retransmission of any packets which were not received or which were not correctly received;

retransmitting any packets that were not received or which were not correctly received;

verifying that the newly transmitted packets have been received and have been correctly received; and reassembling the data packets into the original data message and passing the data message to the data consuming process or processes which requested data on the subject.

23. An apparatus for obtaining data requested by one or more data consuming processes in execution on one or more computers from one or more service instances in execution on one or more hosts or server computers, comprising:

one or more networks or other data paths for transporting data between processes running at various locations or addresses on said network(s), said transport of data being carried out on one or more appropriate communication paths through said network(s) or other data path(s), and according to one or more appropriate communication mechanisms or transport protocols;

one or more host and/or server computers coupled to said network(s), each having one or more network addresses, each host and/or server computer having an operating system and one or more other process(es), data consuming process(es) or service instance(s) in execution thereon, each of said operating system(s), process(es), data consuming process(es) or service instance(s) being programmed in any selected programming language, each said host and/or server computer having any selected machine architecture or type including any appropriate machine instruction set and any appropriate data representation format or type, each of said operating system(s), process(es) and/or service instance(s) having one or more appropriate communication, access and/or invocation protocol(s);

one or more computers having in execution thereon one or more data location and access programs which control processing by said one or more computers, said data location and access programs being coupled to said one or more data consuming process(es) and said one or more other process(es) and/or service instance(s), for receiving one or more requests for desired data from said one or more data consuming processes, said request defining the identity of the desired data by an identifier comprising one or more parts, said desired data having certain access requirements including but not limited to the particular communication path(s) through said network(s) or other data path(s) to said desired data, the transport protocol or protocols along said communication path(s) through said network(s) or other data path(s) to said desired data, the network address(es) of the host(s) and/or server computer(s) on which the process(es) publishing the desired data is or were in execution, the machine architecture(s) or type(s) or operating system(s) or the data representation format or type of the host(s) and/or server computer(s) upon which the process(es) publishing the desired data is or were in execution, the particular process(es) and/or service instance(s) or the programming language(s) of the particular process(es) and/or service instance(s) which is or were publishing said desired data, and the communication, access or invocation protocol(s) which must be invoked to communicate, access or invoke said process(es) or service instance(s) which is or were publishing said desired data or the transport protocol(s) or operating system or systems in execution on any of said host or server computers involved in accessing and transporting said desired data from the process(es) which publish or distribute said desired data to the data consuming process which requested said data, all of said access requirements uniquely defining the attributes of a communication mechanism between said data consuming process(es) desiring said data and said desired data itself, said request for said desired data and said data consuming process which made said request being independent of one or more of said access requirements or attributes including at least the identity and/or location of said one or more particular process(es) and/or service instance(s) that publish or distribute said requested data and said communication, access or invocation protocol or protocols needed to communicate with said one or more process(es) and/or service instance(s) that publish or distribute said requested data as well as the location or address of the one or more computer(s) being controlled by said one or more processes and/or service instance(s) that publish or distribute said requested data, said independence meaning that the data consuming process which requested said desired data need include no program, code or data the purpose of which is to satisfy any of said access requirements, said one or more computers processing of which is controlled by said one or more data location and access programs being controlled thereby so as to automatically satisfy all said access requirements so as to establish a communication path(s) to said desired data, access said data and return said data to said data consuming process(es) that requested said data, and wherein said one or more process(es) and/or service instance(s) that publish or distribute said requested data also do not include any program, code or data the purpose of which is to satisfy any said access requirement, other than to output the subject itself of the data being published, or the purpose of which is to direct where said data is to be transmitted or to assist in any other way in satisfying any other of said access requirements.

24. The apparatus of claim 23 wherein said one or more data location and access programs include one or more data format decoupling programs coupled to said one or more computers having in execution thereon said one or more data location and access programs, said one or more data format decoupling programs for providing data representation independence such that data may be effectively obtained by said one or more data consuming process(es) which requested said data regardless of the particular data representation format(s) or type(s) used by said one or more data consuming process(es) and whatever process(es) or service instance(s) which publish the requested data.

25. The apparatus of claim 24 wherein said one or more data format decoupling programs further comprise means coupled to said one or more data consuming process(es) and said one or more process(es) and/or service instance(s) which publish the requested data for creating, manipulating, storing and transmitting self-describing data objects which include not only data but also data representation format information within each instance of a self describing data object.

26. The apparatus of claim 23 wherein said one or more data location and access programs include one or more service discipline programs for encapsulating appropriate software routines for communicating with one or more of said process(es) and/or service instance(s) which publish said requested data in the communication, access and/or invocation protocol(s) native thereto.

27. The apparatus of claim 24 wherein said one or more computers having in execution thereon said one or more data location and access programs for receiving said request(s) for desired data also are programmed to implement one or more service discipline means for encapsulating and executing appropriate software routines for controlling one or more computers so as to communicate with one or more of said process(es) and/or service instance(s) which publish said requested data using the communication, access and/or invocation protocol(s) native thereto, and wherein said self-describing data objects are organized into classes, each of which has common attributes and a unique class identifier, and wherein each self describing data object has one or more fields, each field being either primitive in that the field stores data or constructed in that the field stores data which is the class identifier of another class of self describing data objects and the data from an instance from said other class.

28. The apparatus of claim 23 wherein said one or more data location and access programs includes Subject-Addressed Subscription Service means for controlling said one or more computers to implement a programmatic interface to said one or more data consuming and data publishing processes, said programmatic interface implementing a subscribe function which can be invoked by a data consuming process by outputting a a subscription request requesting data by identifier only, said data and all updates thereto published under said particular identifier by one or more of said process(es) and/or service instance(s), and for automatically establishing a communication path between at least one of said data consuming processes which requested said data by identifier only and at least one of said processes and/or service instances which publish said requested data having said identifier until said subscription request is canceled, said programmatic interface also for controlling one or more computers having one or more service instances in execution thereon such that service instance(es) can publish data simply by invoking a publish function of said programmatic interface and outputting the data and the identifier of the data, and wherein said computer(s) controlled by said programmatic interface will use the identifier of said published data to automatically route the data to only those computers having in execution thereon a data consuming process having an open subscription to data having said identifier and to no other computer, said programmatic interface also controlling one or more computers such that when said process(es) and/or service instance(s) publish updates to said requested data with an identifier, said identifier is used to transmit said updates automatically to said one or more data consuming processes which requested said data for which said communication path(s) has or have been established and to only those computers having in execution thereon data consuming processes having open subscriptions to data having said identifier until said subscription is canceled.

29. The apparatus of claim 25 wherein said self-describing data objects are organized into classes, each of which has common attributes and a unique class identifier, and wherein each self-describing data object has one or more fields, each field being either primitive in that the field stores data or constructed in that the field stores data which comprises the class identifier of another class of self-describing data objects and the data from an instance from said other class.

30. The apparatus of claim 28 wherein said one or more data location and access programs further further comprises means, coupled to said one or more data consuming processes which requested said data and said one or more process(es) and/or service instance(s) which publish said requested data, for creating, manipulating, storing and transmitting said requested data as self-describing data objects which include not only data but also said data representation format or type information within each instance of a data object.

31. The apparatus of claim 30 wherein said self-describing data objects are organized into classes, each of which has common attributes and a unique class identifier, and wherein each self-describing data object has one or more fields, each field being either primitive in that the field stores data or constructed in that the field stores data which comprises the class identifier of another class of self-describing data objects and the data from an instance from said other class.

32. The apparatus of claim 28 wherein said one or more data location and access programs include one or more service discipline means, each for controlling one or more of said computers for communicating with one or more of said processes and/or service instances which publish said requested data in the communication, access or invocation protocol(s) native thereto.

33. The apparatus of claim 31 wherein said one or more data location and access programs include one or more programs which control said one or more computers to implement one or more service discipline means, each for communicating with one or more of said processes and/or service instances which publish said requested data in the communication, access or invocation protocol(s) native thereto.

34. The apparatus of claim 28 wherein said one or more computers having in execution thereon said one or more data location and access programs also are programmed to also implement means for establishing said communication path by listening for data messages from any source arriving at one or more network pod address(es) associated with said one or more data consuming processes which requested said data and filtering out all data messages other than data messages which have said identifier associated with said requested data, and passing all said messages having said identifier of said requested data to any said one or more computers having in execution thereon said one or more data consuming process(es) which issued said request(s) for said data and for which said communication path has been established.

35. The apparatus of claim 28 wherein said one or more data location and access programs include one or more programs to control one or more of said computers so as to implement subscription registration means for establishing said communication path by sending a subscription registration message to register said subscription for said desired data with the one or more computers having in execution thereon said one or more data location and access programs which are coupled to said process(es) and/or service instances which publish said requested data, said subscription registration message including the identifier of the requested data, and wherein said at least one process and/or service instance which publishes said requested data is coupled to said one or more computers implementing said subscription registration means and wherein said one or more computers having in execution thereon said one or more data location and access programs is also programmed to implement means for transmitting data published by said at least one process and/or service instance which has an identifier which matches the identifier for requested data which is the subject of any active subscription registration to all the data consuming process(es) which registered a subscription to data having said identifier.

36. The apparatus of claim 32 wherein each said computer programmed to implement said one or more service discipline means is also programmed to implement means for failure recovery so as to be able to maintain the flow of data to said one or more data consuming process(es) which requested said data despite failure of said communication path, host and/or server computer(s) or process(es) and/or service instance(s) which is publishing said requested data.

37. The apparatus of claim 28 wherein said Subject-Addressed Subscription Service means includes service discipline means for controlling said one or more computers to carey out communication of data over said communication path to fulfill said subscription request using a communication protocol which is appropriate for the one or more processes and/or service instances which are supplying said data, and wherein said one or more data location and access programs include one or more programs for controlling said one or more computers to implement one or more protocol engines, said protocol engines for establishing said communication path(s) using the appropriate network or communication path transport protocols for the communication path through which said requested data is obtained and for interfacing said service discipline means to said network or communication path transport protocols.

38. The apparatus of claim 25 wherein said one or more data location and access programs include means for implementing one or more service disciplines for controlling said one or more computers to communicate with service instances in the communication, access or invocation protocol native thereto, and wherein said one or more data location and access programs coupled to said one or more other process(es) and/or service instance(s) and said one or more data consuming process(es) include protocol engine means for controlling one or more computers to receive requests from said service disciplines to establish a communication path through which said requested data may be obtained, and assisting said one or more computers controlled by said service disciplines so as to establish said communication path(s) by interfacing said one or more computers controlled by said one or more service disciplines to the appropriate network or communication path transport protocols for the communication path through which said requested data is to be obtained.

39. The apparatus of claim 37 wherein said protocol engines include means for controlling said one or more computers to carry out a reliable broadcast communication protocol.

40. The apparatus of claim 39 wherein each said protocol engine controls said one or more computers so as to have different fault tolerance characteristics not already implemented by said transport protocols.

41. The apparatus of claim 38 wherein said one or more computers controlled by said protocol engine means is is controlled so as to carry out a reliable broadcast communication protocol if the number of subscribers to data having a particular identifier is greater than a programmable number and is controlled to carry out a point-to-point communication protocol it the number of subscribers is less than said programmable number.

42. The apparatus of claim 41 wherein each said a protocol engine controls said one or more computers so as to have different fault tolerance characteristics.

43. The apparatus of claim 23 or 28 wherein said requested data is transported over said communication path using one or more data messages, and wherein said one or more data location and access programs includes means for transporting said requested data over said communication path using a reliable communication protocol which insures that all data messages were received without error.

44. The apparatus of claim 23 or 28 wherein said one or more data location and access programs includes reliable broadcast transmit means coupled to said process(es) and/or service instance(s) which publish said requested data, said reliable broadcast transmit means for dividing data messages into packets for transmission on said network and adding sequence numbers to said packets, and for calculating error correction bits for each packet and adding said error correction bits to said packets, and for temporarily storing packets to be transmitted over said network in a retransmit memory, and for broadcasting said packets over said network or communication path, and wherein said one or more data location and access programs further comprise receive means coupled to said data consuming processes which requested said data for listening to a network address associated with at least one of said data consuming processes which requested said data and selecting incoming packets which comprise a complete data message of said requested data and checking the sequence numbers of incoming packets to insure that all data messages comprising said requested data have been received, and for using said error correction bits of each packet to detect and correct errors in said received packets, and, if any data message was not received or contains errors not correctable using said error correction bits, for sending a message back to said reliable broadcast transmit means requesting retransmission from said retransmit memory of any data messages not received or not received correctly.

45. The apparatus of claim 23 or 28 wherein said one or more data location and access programs further comprises an intelligent multicast program for controlling one or more computers so as to determine how many data consuming processes have open subscriptions to data with a particular identifier and for controlling said one or more computers to broadcast data messages having said identifier when the number of data consuming processes requesting said data is greater than or equal to a predetermined number, and for sending said data messages directly to the data consuming process or processes which requested said data by a point-to-point communication protocol when the number of said data consuming processes which requested said data is below said predetermined number, said predetermined number selected such that the most efficient means of transporting said data is used in terms of consumption of network or communication path bandwidth and consumption of computing resources.

46. The apparatus of claims 23 or 28 wherein said one or more computers having in execution thereon said one or more data location and access programs are controlled thereby so as to implement means for checking the identifier of said requested data and the identity or identities of said data consuming processes which requested said data against a list of authorized identifiers associated with each of said one or more data consuming processes which requested said data, and for blocking access by any data consuming process to any requested data having an identifier not on the list of authorized identifiers for said data consuming process.

47. The apparatus of claim 23 or 28 wherein said one or more computers having in execution thereon one or more data location and access programs are also programmed by said one or data location and access programs to implement means for switching communication paths through said network or other data communication path upon failure of the selected communication path or other interruptions in the flow of data so as to maintain the flow of data to all data consuming processes having open subscriptions.

48. An apparatus for use in a distributed computing environment, comprising:

one or more computers coupled by one or more data paths, said one or more computers having in execution thereon one or more application processes controlling processing of said one or more computers, and wherein at least one of said application processes is a data consumer process needing data on one or more subjects and capable of outputting a subscription request for each subject for which data is desired, each said subscription request including a subject for which data is requested but wherein no data consumer process needs to include any routine which controls one more of said computers so as to output any information, address data or address related data indicating where said data may be found in said distributed computing environment other than outputting the subscription request and the subject thereof, and wherein at least one of said application processes is a data publisher process which outputs data messages on various subjects but which does not need to include any routine the purpose of which is to output any address or address related data, other than the subject itself, which indicates where said data messages are to be transmitted in said distributed computing environment or in any other way assist in the distribution of said data;

one or more computers processing of which is controlled by one or more directory services programs or routines so as to, when given a subject, access and search a data file, said data file storing data records mapping data publisher processes to subjects, each said data record containing a subject and identity and/or address data specifying, directly or indirectly, the address in said distributed computing environment of one or more sources of data messages on said subject, each said source obtaining said data messages on said subject from one or more data publisher processes in said distributed computing environment which publish data on said subject, and wherein each source on any particular subject comprises one or more computers controlled by one or more computer programs so as to receive messages from a data publisher process on the subject corresponding to said source and re-transmit said data messages on the subject to only those data consumer processes which have open subscriptions for data messages on the subject, said one or more directory services programs or routines for controlling said one or more computers so as to return any data record in said data file identifying and/or giving the address in said distributed computing environment of one or more sources which can output data on said subject that was originally passed to said one or more computers on which said one or more directory services programs or routines are in execution;

one or more computers controlled by one or more mapping programs or routines so as to receive each said subscription request from a computer on which a data consumer process is in execution, said subscription request identifying only a particular subject for which a subscription is requested, said one or more mapping programs or routines for controlling said one or more computers so as to map the subject of said subscription request directly or indirectly to the identity and/or address in said distributed computing environment of one or more sources which can output data messages on said subject, said mapping carried out by said one or more computers controlled by said one or more mapping programs or routines by passing the subject of said subscription request to said one or more computers controlled by said at least one directory services program or routine so as to cause said one or more computers controlled by said one or more directory services programs or routines to search said data file for a data record(s) identifying and/or giving the address in said distributed computing environment of one or more sources which output data on said subject and controlling said one or more computers on which said one or more mapping programs or routines are in execution to receive said data records resulting from said search, said one or more mapping programs for controlling said one or more computers so as to output at least said identity or address data in a link request requesting the establishment of a subscription communication link with said one or more sources identified in said data records resulting from said search;

one or more computers controlled by one or more subscription registration and communication programs or routines so as to receive said identity and/or address data in said link request from said one or more computers controlled by said one or more mapping programs or routines, said link request corresponding to at least one subject and a corresponding subscription request, said subscription registration and communication programs or routines for controlling said one or more computers so as to automatically establish a communication link with at least one source which outputs data on the subject to which said link request pertains via at least one said data path and automatically send a subscription registration message to said at least one source identified in said link request so as to notify said source of an open subscription on said subject, each said subscription registration message directly or indirectly identifying and/or giving the address in said distributed computing environment of the data consumer process which issued said subscription request on said subject through the computer on which said data consumer process is in execution or some other process which controls one or more computers to receive data messages on the subject of said subscription request on behalf of said data consumer process which requested the data and pass the data messages only to said one or more computers controlled by said data consumer process which requested said data, said one or more subscription registration and communication programs also for controlling said one or more computers so as to receive data messages on said subject whenever said data messages on said subject are output by said source with which said subscription communication link has been established and pass said data messages to said one or more computers being controlled by said data consumer process which requested data on the subject until said subscription is canceled;

one or more computers under control by one or more data distribution programs or routines so as to implement said one or more sources which output data on the subject of each said subscription request, said sources being selectively coupled to said one or more computers under control of said data consumer processes and selectively coupled to said one or more computers under control of said data publisher processes, said one or more computers under control of said one or more data distribution programs or routines for receiving data messages published by said one or more data publisher processes on one or more subjects, and for receiving said subscription registration messages requesting subscriptions on one or more subjects and for automatically sending each said data message over said subscription communication link only to computers having in execution thereon data consumer processes having active subscriptions to the subject of said data message, said data distribution programs or routines controlling said one or more computers to so distribute published data without receiving any data from the data publisher process, other than the subject itself of each data message, indicating where each said data message on any subject is to be sent, and for automatically continuing to transmit each new data message received from a computer controlled by a data publisher process on any subject to only data consumer processes having an active subscription to the subject of each said new data message until said subscription is canceled, each said data distribution program(s) or routine(s) containing no routines, computer program, subroutine or other computer programming code the purpose of which is to receive any data from said data publisher process, other than the subject of a data message itself, which controls where in said distributed computing environment any said data message on any subject is to be sent.

49. A process for communicating data between at least one publishing process and at least one consumer process in execution on one or more computers in a distributed computing system, said publishing and consumer processes coupled by a data path, comprising:

storing data encoding a subject space and the subjects therein in a memory of one or more of said computers, and storing in said memory data mapping the identity and/or the address in said distributed computing system of one or more source computer processes for execution on one or more of said computers in said distributed computing system which can supply data on a subject for every subject in said subject space;

receiving at one or more computer processes in execution on one or more of said computers a subscription request from at least one consumer process, said subscription request specifying only the subject for which data is requested but not where data on said subject can be found in said distributed computing system and specifying a manner of returning data on the requested subject to said consumer process;

in one or more computer processes in execution on one or more of said computers, using the subject of said subscription request to automatically look up in said stored data encoding said subject space and the subjects therein, the identity and/or address in said distributed computing system of one or more source computer processes which can supply data on the subject specified in said subscription request, and automatically sending a subscription registration message to said source computer process specifying the subject for a subscription and specifying the manner of returning data on the specified subject to the consumer process which requested said data, said subscription registration message being sent to one or more subscription registration processes in execution on said one or more computers the function of which is to keep one or more subscription lists listing all active subscriptions on each subject;

receiving at said one or more source computer processes in execution on one or more of said computers one or more data messages from at least one publisher process which specify a subject and include data to be published on said subject but which do not specify where the data on said subject is to be sent within said distributed computing system other than by specifying the subject itself, and comparing the subject of each said data message to said one or more subscription lists kept by said one or more subscription registration processes and, if one or more active subscriptions exist for the subject of any particular data message, automatically sending all data messages on the subject and any subsequent data messages on the same subject to only those computers which have consumer processes in execution thereon having open subscriptions on the subject of said data messages, and for continuing to send each data message pertaining to a subject to only those computers having in execution thereon a consumer process having an active subscription for said subject until the subscription on said subject is canceled.

50. A distributed computing apparatus, comprising:

a plurality of 30 or more computers processing of which is controlled by a plurality of 30 or more programs or subroutines, said programs or subroutines in execution on one or more of said plurality of 30 or more computers, hereafter referred to as processes, said plurality of processes and said plurality of computers coupled by one or more data paths;

and wherein at least one of said computers has in execution thereon at least one of said processes which is a subscriber process which requests data on any subject in a hierarchically organized subject space having 30 or more subjects by issuing a subscription request requesting that a subscription be opened and naming the subject of the requested data and including data indicating how data on said subject is to be sent to said subscriber process, where no subscription request includes any data, other than the subject itself, indicating the identity or locations in said distributed computing environment of any publisher process which outputs data messages on the subject named in said subscription request;

and wherein at least one of said processes is a publisher process which publishes data messages on one or more subjects and which does not include any routine, computer code or subroutine the purpose of which is to receive any data, address or address related data the purpose of which is to control directly or indirectly where data being published by said publisher process is to be sent in said distributed computing environment or to send any data, address or address related data with said data messages being published, other than the subjects themselves of the data messages, which indicates or controls directly or indirectly where in said distributed computing apparatus to send any said data message;

one or more computers under control of one or more subject-based addressing programs or subroutines said one or more computers under control of said one or more subject-based addressing programs or subroutines being coupled to each said publisher process and each said subscriber process via said one or more data paths, said one or more subject-based addressing programs comprising one or more subscription handling routines for controlling execution on one or more of said computers so as to receive said subscription requests from said one or more subscriber processes and for keeping a list of active subscriptions of subjects for which there have been subscription requests made by one or more subscriber processes, and for automatically locating, for each active subscription, one or more computers coupled to or controlled by a process which can supply data on the subject of said subscription request, said one or more computers having their processing controlled by one or more programs which cause said one or more computers to supply data on the subject of each said subscription request, and said one or more computers under control of one or more subject-based addressing programs or subroutines for automatically establishing a data communication path for each said subscription request between the subscriber process which issued said subscription request and said one or more computers coupled to or controlled by said process that can supply data on the subject of said subscription request and automatically registering a subscription on the subject of said subscription request on said one or more computers coupled to or controlled by said process that can supply data on the subject so as to start a flow of data on said subject over said data communication path previously established, and said one or more subject-based addressing programs or subroutines for controlling said one or more computers so as to pass each data message received from said one or more computers coupled to or controlled by said process which can supply data on the subject of said subscription request only to computers under control of said one or more subscriber processes having an active subscription on the subject of each said data message.

51. The apparatus of claim 50 wherein said one or more computers controlled by said one or more subject-based addressing programs further comprise one or more computers controlled by one or more published message routing processes so as to receive data messages published by said one or more computers coupled to or controlled by said process which can supply data on the subject of each said subscription request, and, without receiving any data, command or request from any said publisher process controlling, assisting in controlling or indicating where each said data message is to be sent, for automatically and continuously sending each data message published on any said subject only to computers controlled by subscriber processes that have active subscriptions on the subject of said data message using the one or more data communication paths that have been opened for that subject and, wherein, for each said subscription request, said one or more computers controlled by one or more published message routing processes and said one or more subject-based addressing programs or subroutines automatically carry out one or more communication protocols and any necessary data format conversion operations that enable the computer controlled by a subscriber process which issued said subscription request on a subject to effectively communicate with the one or more computers coupled to or controlled by said process which can supply data on the subject of said subscription request.

52. A process for communicating data between software processes operating in one or more computers coupled by a data communication path, comprising:

storing data encoding a subject space and the subjects therein in a memory of one or more of said computers, and storing in said memory data mapping the identity and/or the address of one or more source processes for execution on one or more of said computers which can supply data on a subject for every subject in said subject space;

receiving a subscription request for information on a particular subject from a requesting software process and locating at least one suitable said source process for data on said subject by searching said data stored in said computer memory encoding said subject space using the subject of said subscription request as a search criteria; and automatically satisfying all access requirements including invoking and carrying out all necessary communication protocols and data format and representation conversions needed to set up a communication channel through said data communication path between said source process and said requesting software process such that a subscription is set up whereby current data on the requested subject and subsequent data updates on the requested subject flows through said communication channel only to computers being controlled by the requesting software process(es) and are converted automatically to the data format and representation used by said requesting software process(es) until said subscription request is canceled, all said access requirements being satisfied, communication protocols invoked and data format conversions being carried out automatically without the aid of any data from or processing by said source process or requesting process such that said requesting software process need only name the subject of the desired data and said source process need only output data on the requested subject and name the subject thereof with the necessary processing needed to get that data to the requesting software process and the configuration and/or operation of the data communication path being transparent to said source process.

53. A process for communicating data between software processes controlling processing of one or more computers coupled by a data communication path, one or more of said software processes being a consumer process that needs data and one or more of said software processes being a publisher process which publishes data on a subject, said publisher process, said consumer process and said data communication path having access requirements, comprising:

storing data encoding a subject space and the subjects therein in a memory of one or more of said computers, and storing in said memory data mapping the identity and/or the address of one or more publisher processes for execution on one or more of said computers which can supply data on a subject for every subject in said subject space;

receiving a subscription request for information on a particular subject from one or more consumer software processes where no consumer process needs to output any data or address information which specifies where the desired data can be found other than the subject itself, and locating at least one suitable publisher process which can publish data on said subject by searching said data stored in said computer memory encoding said subject space using the subject of said subscription request as a search criteria; and automatically satisfying all said access requirements including invoking and carrying out all necessary communication protocols needed to set up a communication channel through said data communication path between said publisher process and only said computers processing of which is controlled by consumer software processes having open subscriptions on the subject of said subscription request such that a subscription is set up whereby current data on the requested subject and subsequent data updates on the requested subject flow through said communication channel and are routed automatically to only computers processing of which is controlled by consumer software processes which requested data on the specified subject until said subscription request is canceled, all said access requirements being satisfied and communication protocols being invoked automatically without the aid of any data from or processing by said publisher process, other than by output of the subject itself, such that said publisher process need only output data on the requested subject and name the subject thereof with no need for said publisher process to have therein any software routine which knows the locations of consumer processes having open subscriptions to the subject or which is capable of finding the address of any said consumer process having an open subscription on the subject of the published data, with all the necessary processing needed to get the data published by said publisher process to all consumer software processes having open subscriptions on the subject of said published data by nonbroadcast communication processes being automatically performed by middleman software processes other than the publisher process or the consumer process or processes and wherein the configuration and operation and communication protocols of the data communication path and said middleman software processes are transparent to said publisher process and said consumer process or processes.

54. An apparatus comprising:

one or more computers having one or more software processes in execution thereon controlling operations of said one or more computers, at least one of said software processes being a consumer process that needs data on a subject and at least one of said software processes being a publisher process which publishes data on one or more subjects, one or more data paths coupled to said one or more computers and capable of carrying data between said consumer and publisher processes in execution on said one or more computers;

and wherein said one or more computers have intermediary software program(s) in execution thereon for controlling one or more of said computers to implement decoupled, subject based addressing whereby a consumer process can obtain data pertaining to a subject simply by entering a subscription request by invoking a subscribe function of an application programmatic interface, hereafter referred to as an API, implemented by said intermediary software program(s), said subscription request only naming the subject of the desired data and identifying a method for getting data on the requested subject back to the consumer process, and said intermediary software program(s) for controlling one or more computers to take the subject of said subscription request and automatically map said subject to the identity and/or address of one or more publisher processes which is/are capable of supplying data on said subject and wherein said intermediary software program(s) control one or more computers to automatically set up a data communication path for each said subscription request between said one or more publisher processes which publish data on the subject of said subscription request and only those computers being controlled by consumer processes having an open subscription to the subject of said subscription request, and wherein said API implemented by said intermediary software program(s) provides a publish function which can be invoked by a data publisher process when data on a subject is to be published thereby allowing a publisher process to have published data distributed to all consumer processes having open subscriptions to the subject of said published data simply by invoking said publish function, publishing said data and naming the subject thereof, and, when said publish function is invoked, said intermediary software program(s) receives the published data and automatically distributes said data only to computers controlled by consumer processes that have active subscriptions to the subject of the published data.

55. An apparatus comprising:

one or more computers having one or more software processes in execution thereon controlling operations of said one or more computers, at least one of said software processes being a consumer process that needs data on a subject and at least one of said software processes being a publisher process which publishes data on one or more subjects;

one or more data paths coupled to said one or more computers and capable of carrying data between said consumer and publisher processes in execution on said one or more computers;

and wherein said one or more computers have one or more intermediary software means in execution thereon for controlling one or more of said computers to implement decoupled, subject based addressing, said intermediary software means including one or more means for controlling said one or more computers to provide an application programmatic interface, hereafter referred to as an API, to each said consumer process, whereby each said consumer process can obtain data pertaining to a subject simply by entering a subscription request in the form of invoking a subscribe function of said API implemented by said intermediary software means, said subscription request naming the subject, and wherein said intermediary software means includes one or more mapping means for controlling said one or more computers to automatically map the subject of said subscription request to the identity and/or address of one or more publisher processes which is/are capable of supplying data on said subject, and wherein said intermediary software means includes one or more means for controlling said one or more computers to automatically establish a data communication path between all consumer processes having open subscriptions on a subject and one or more publisher processes which can publish data on the subject, and wherein said intermediary software means includes one or more means for implementing a publisher side API to provide a facility such that a data publisher process can invoke a publish function when data on a subject is to be published, and wherein said intermediary software means is also for controlling one or more computers to receive the published data when said publish function of said publisher side API is invoked and distribute said data automatically to only computers controlled by consumer processes that have active subscriptions to the subject of the published data and without the need for said publisher process to include any data or software routines that contains or output the addresses of any consumer process or which is designed to designate to which consumer processes said data is to be distributed or which is designed to locate any consumer process which has an open subscription to data on the subject of said published data or any other subject.

56. An apparatus for facilitating communication of data in a distributed system between two or more computer programs in execution on the same or different computers coupled by a data exchange medium, comprising:

a network comprised of at least one data transfer path, said network coupling said one or more computers by one or more data transfer paths;

at least one computer execution of which is controlled by one or more application computer programs, said application computer program controlling said one or more computers by issuing a subscription request for data on a subject named in said subscription request;

at least one computer execution of which is controlled by one or more data publishing computer programs which may or may not be the same as said application computer program, said data publishing computer program controlling execution on at least one said computer so as to output data on at least one subject;

one or more computers controlled by one or more subject based addressing programs so as to logically decouple said one or more application computer programs from said one or more data publishing computer programs by providing an application programmatic interface to said one or more application computer programs such that said one or more application computer programs need not have any routines therein to locate or communicate with any other computer or computer program to obtain data on a subject other than to issue said subscription request through said application programmatic interface to said one or more computers controlled by said subject based addressing program and said one or more computers controlled by said subject based addressing program will automatically locate a computer controlled by a data publishing computer program which publishes data on said subject and will obtain data on said subject and pass said subject to said application computer program which issued said subscription request thereby insulating said application computer programs from obsolescence when changes or substitutions occur in the one or more data publishing computer programs which controls said one or more computers to publish data requested by said one or more application computer programs, said subject based addressing programs also for controlling said one or more computers such that data published by one or more computers controlled by one or more data publishing computer programs that is on a subject for which there is no active subscription is filtered out by the one or more computers executing said one or more data publishing computer programs such that said data is never transmitted on said network, said subject based addressing programs also for controlling said one or more computers such that data published by said one or more computers executing said one or more data publishing computer programs that is on one or more subjects for which there are active subscriptions is transmitted only to computers controlled by said one or more application computer programs that issued subscription requests on the subject of said data, said subject based addressing programs also for controlling said one or more computers such that an application programmatic interface is presented to one or more said data publishing programs such that said one or more computers executing said data publishing programs can transmit data published on a subject for which there is an active subscription only to those computers execution of which is controlled by one or more application computer programs which requested said data by outputting said data and the subject thereof through said application programmatic interface to said one or more computers controlled by said one or more subject based addressing computer programs such that said one or more data publishing need not include any routines or computer program instructions designed to locate or communicate with any computer controlled by one or more application computer programs other than to output data and the subject thereof through said application programmatic interface thereby insulating said data publishing computer programs from obsolescence when changes or substitutions occur in the one or more application computer programs which controls said one or more computers to request data published by said one or more data publishing computer programs.

\* \* \* \* \*